Figure 1:
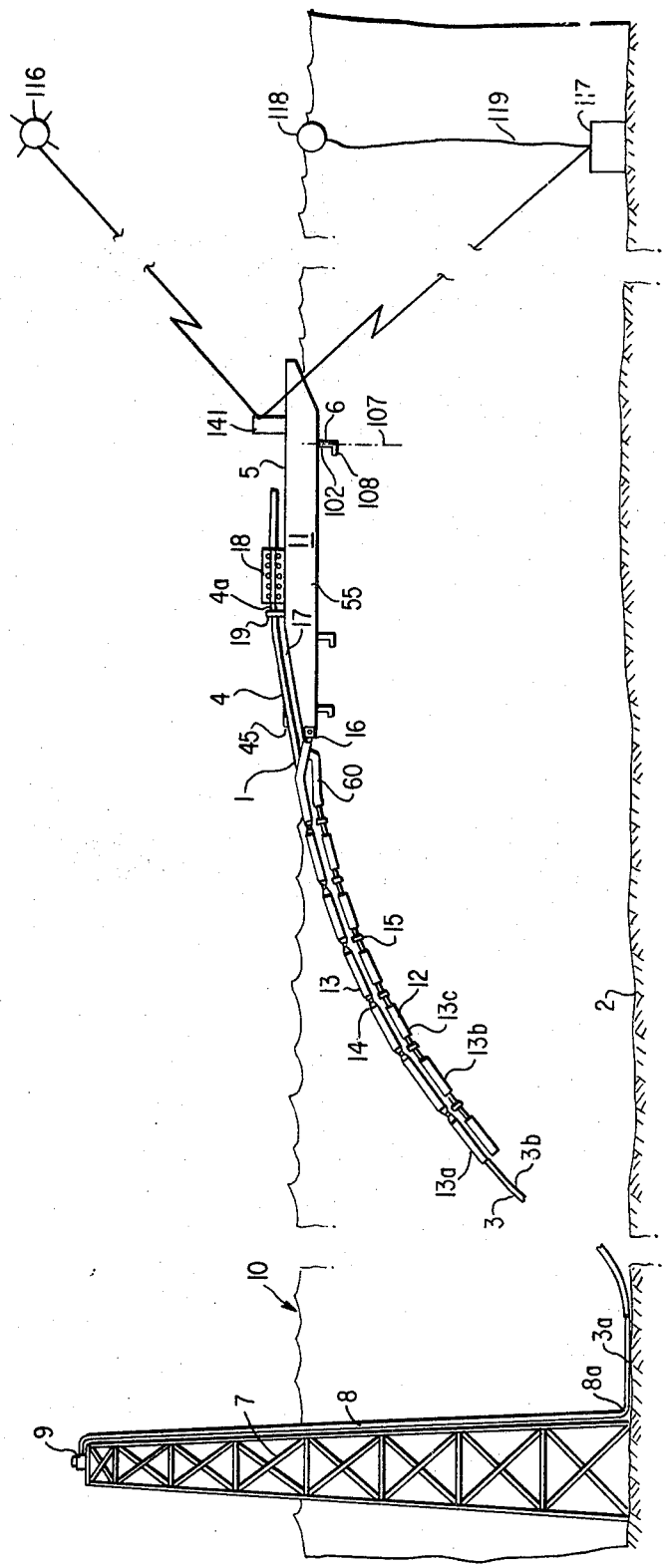

United States Patent
Jones et al.

[15] 3,668,878
[45] June 13, 1972

[54] METHOD AND APPARATUS FOR LAYING PIPELINES

[72] Inventors: Jerry J. Jones; Delbert L. Keenon; William A. Morgan; Joe C. Lochridge, all of Houston, Tex.

[73] Assignee: Brown & Root, Inc., Houston, Tex.

[22] Filed: April 9, 1969

[21] Appl. No.: 814,558

[52] U.S. Cl............................61/72.3, 114/144, 235/150.27
[51] Int. Cl.........................................F16l 1/00, B63h 25/42
[58] Field of Search.................61/72.3, 72.4, 72.1; 114/144, 114/0.5, 235, 195, 226

[56] References Cited

UNITED STATES PATENTS

| | | | |
|---|---|---|---|
| 3,390,532 | 7/1968 | Lawrence | 61/72.3 |
| 3,280,311 | 10/1966 | Shatto, Jr. et al | 114/144 |
| 3,546,888 | 12/1970 | Kolb et al. | 61/72.3 |
| 3,576,977 | 5/1971 | Kolb | 235/150.27 |

FOREIGN PATENTS OR APPLICATIONS 1,300,292    1962    France....................114/235

Primary Examiner—Jacob Shapiro
Attorney—Burns, Doane, Swecker & Mathis

[57] ABSTRACT

A method and apparatus for laying a pipeline on a submerged surface from a vessel which is provided with one or more vessel propulsion units. Tension and lateral force exerted on the pipeline from the floating vessel are detected. The deviation of the vessel from a desired pipelaying course is also detected.

The thrust effect of the vessel propulsion units is adjusted to insure that the desired tension is exerted on the pipeline. The vessel is also rotated to relieve lateral force interacting between the vessel and the pipeline. As a matter of subordinated priority, the thrust effect of the vessel propulsion units is adjusted in an effort to tend to restore the vessel to the desired or predetermined course and maintain the vessel on this course.

21 Claims, 24 Drawing Figures

INVENTORS
JERRY J. JONES
DELBERT L. KEENON
WILLIAM A. MORGAN
JOE C. LOCHRIDGE
BY
Burns, Doane, Benedict, Swecker & Mathis
ATTORNEYS

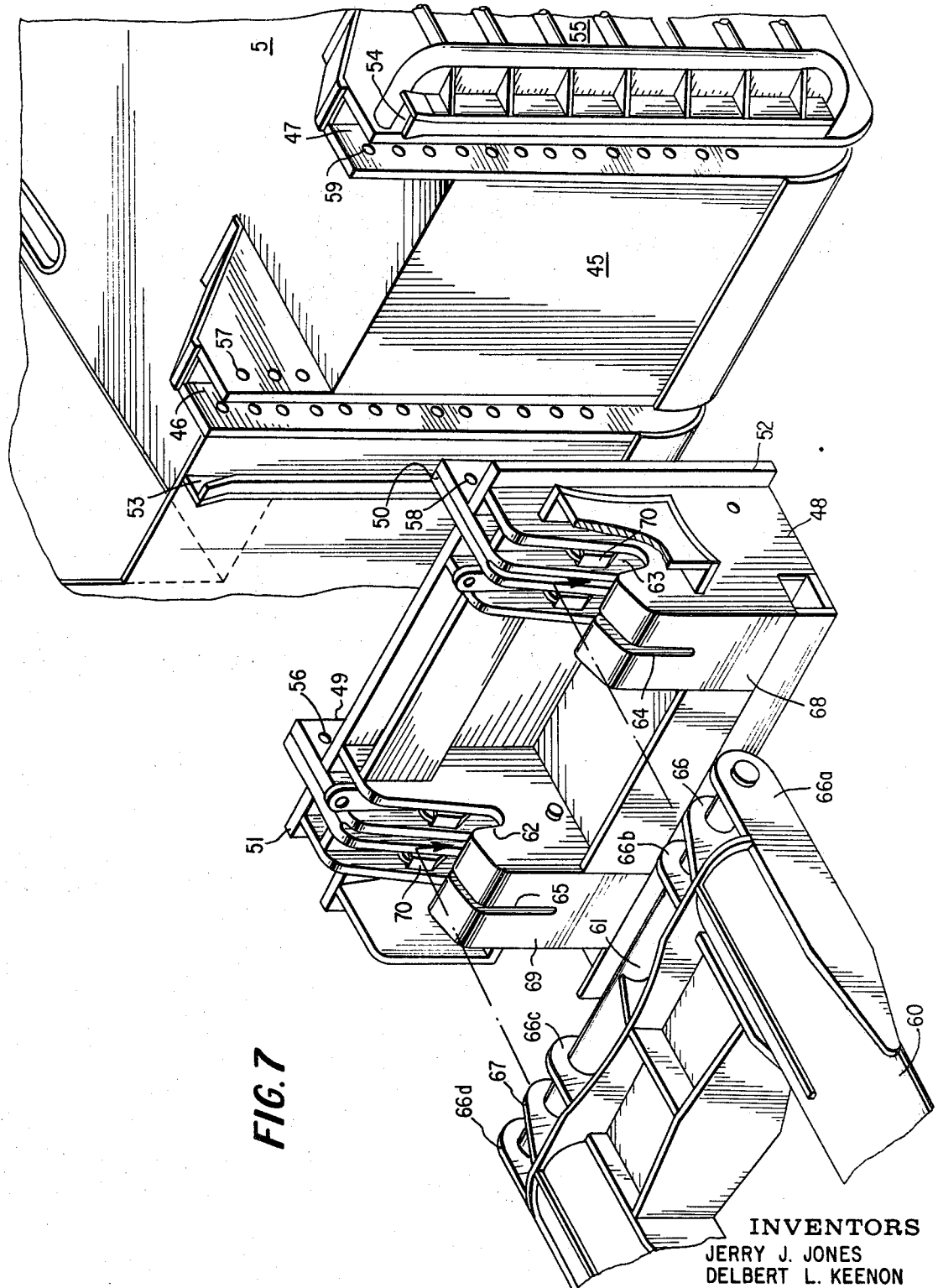

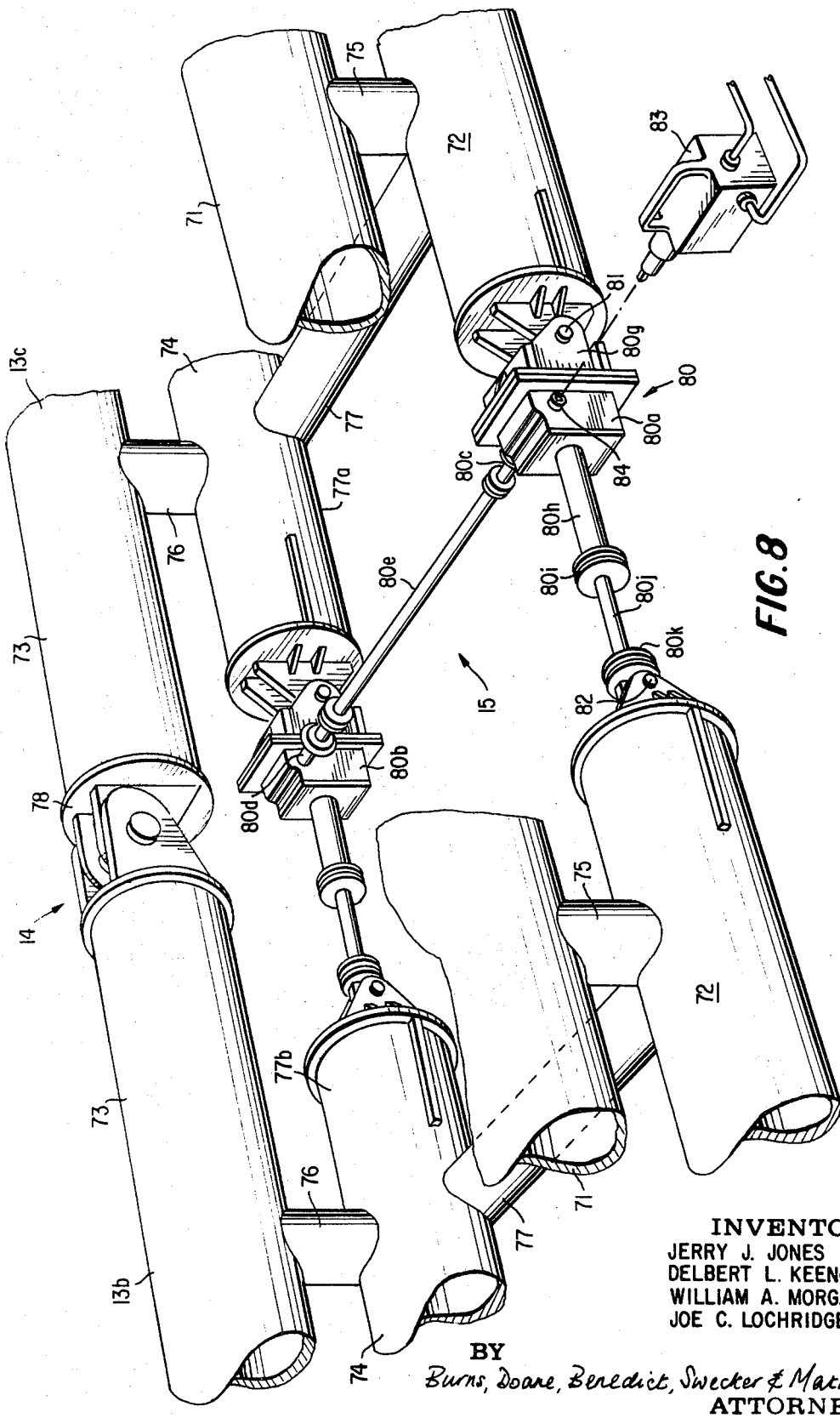

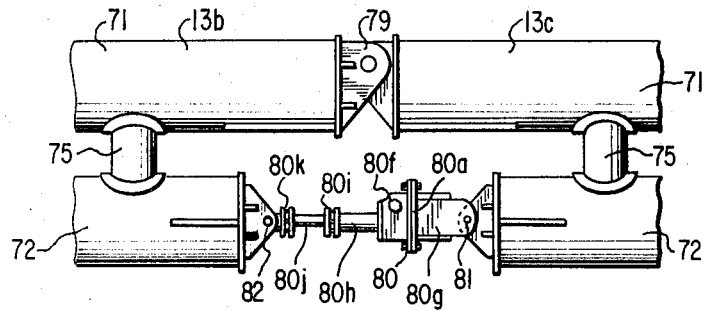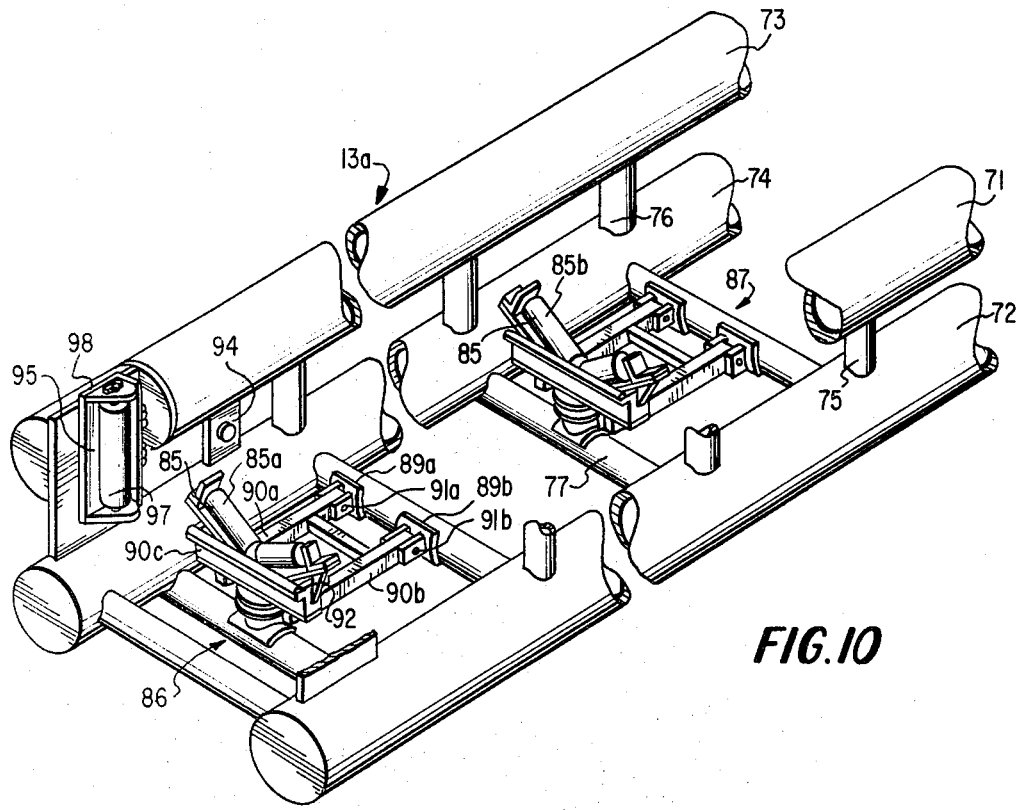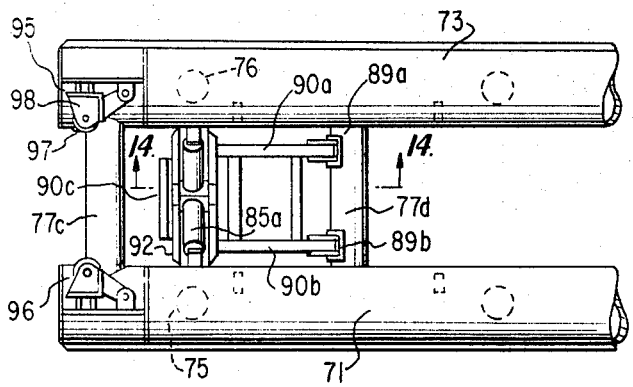

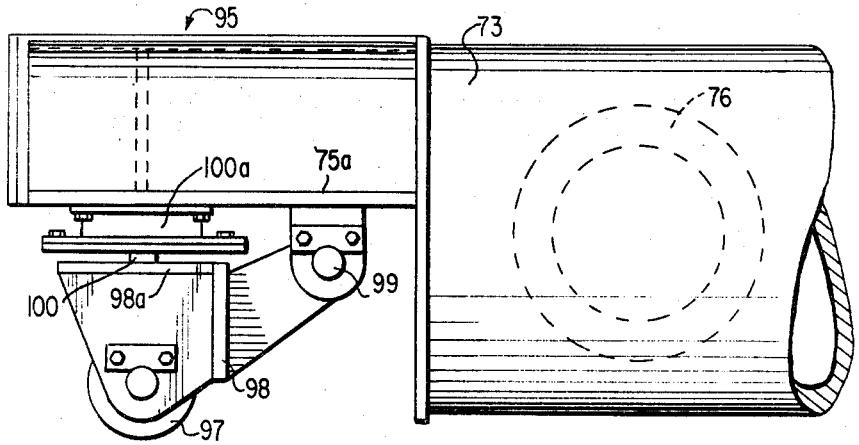
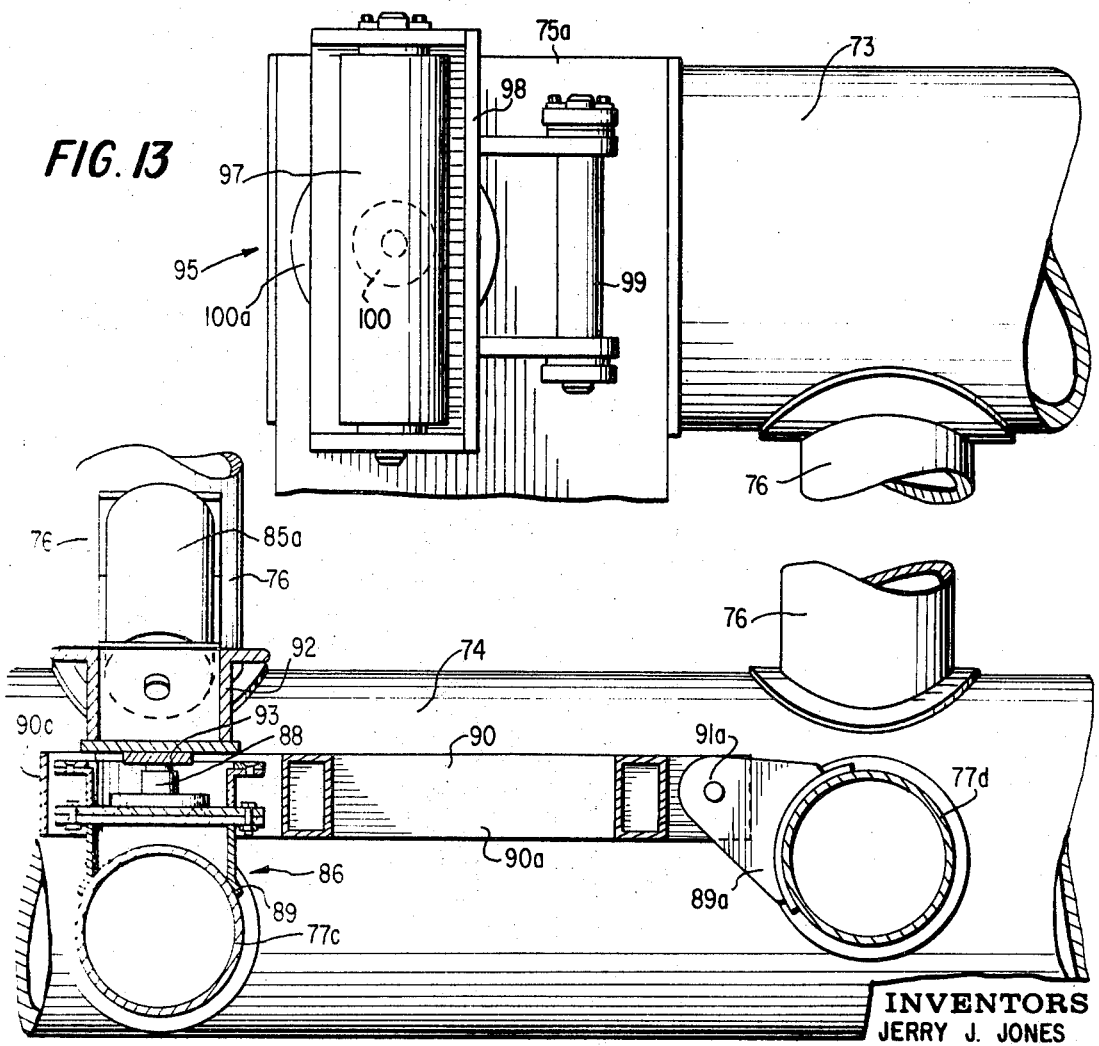

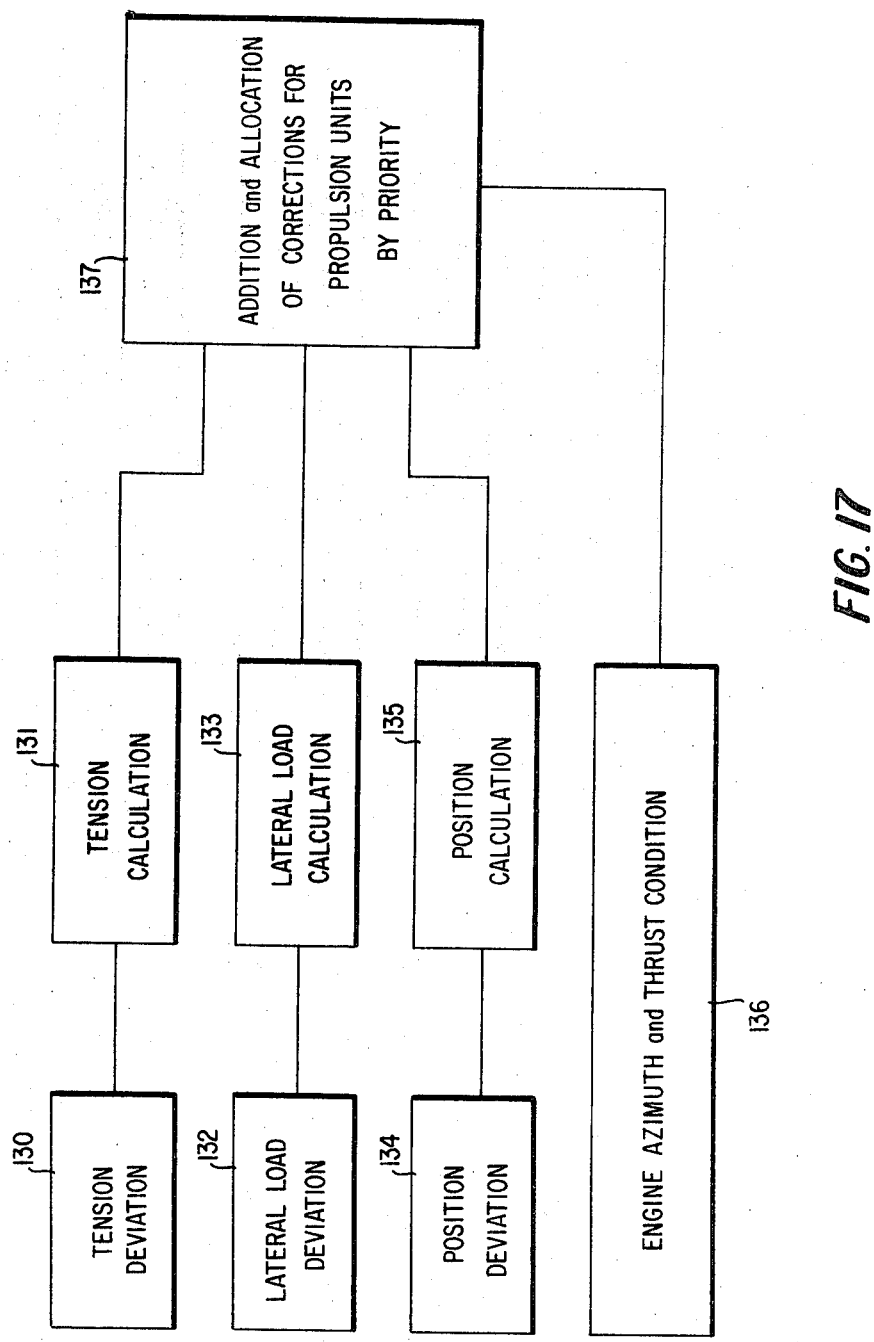

INVENTORS
JERRY J. JONES
DELBERT L. KEENON
WILLIAM A. MORGAN
JOE C. LOCHRIDGE

BY
Burns, Doane, Benedict, Swecker & Mathis
ATTORNEYS

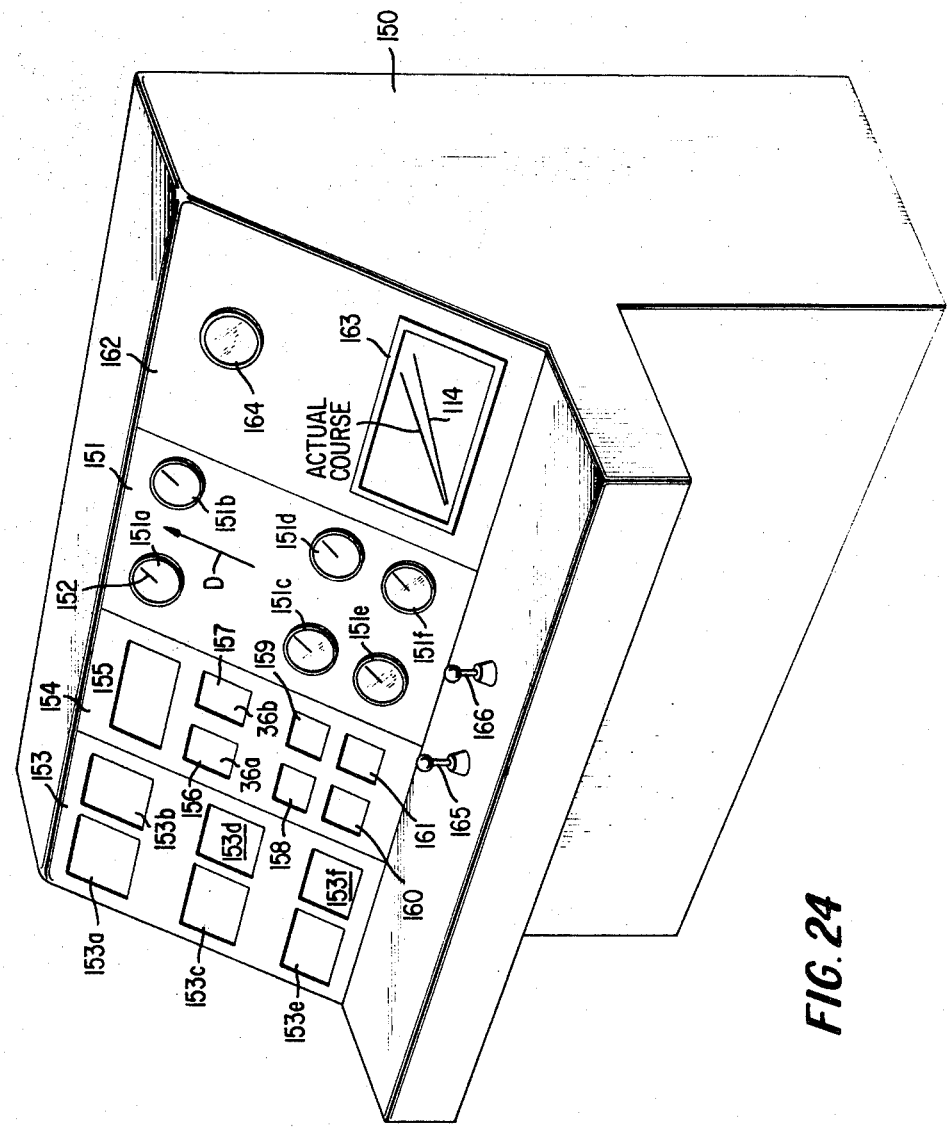

3,668,878

METHOD AND APPARATUS FOR LAYING PIPELINES

INDEX OF SPECIFICATION

| | Column |
|---|---|
| ABSTRACT OF DISCLOSURE | Front |
| GENERAL BACKGROUND | 1 |
| PRINCIPAL OBJECTS AND SUMMARY OF INVENTION | 4 |
| DRAWINGS | 6 |
| PRINCIPAL COMPONENTS OF THE PIPELAYING SYSTEM | 8 |
| SUMMARY OF STRUCTURAL DETAILS OF TENSIONING MECHANISM | 10 |
| SUMMARY OF PRINCIPAL DETAIL OF CLAMPING MECHANISM | 12 |
| TENSION MONITORING | 15 |
| COMPOSITE MODE OF OPERATION OF WHEEL-TYPE TENSION MECHANISM 18 AND CLAMPING MECHANISM 19 FOR PIPE FEEDING OPERATION | 15 |
| SUMMARY OF PRINCIPAL COMPONENTS OF HITCH MECHANISM | 17 |
| SUMMARY OF STRUCTURAL DETAILS OF STINGER AND CONNECTIONS BETWEEN STINGER SEGMENTS | 18 |
| SUMMARY OF PRINCIPAL DETAILS OF STINGER LOAD SENSING SYSTEM | 21 |
|    Vertical interaction | 21 |
|    Lateral Interaction | 23 |
|    Details and Variations in Interaction Monitoring | 23 |
| SUMMARY OF NATURE OF VESSEL PROPULSION SYSTEM | 24 |
| MONITORING OF VESSEL POSITION | 24 |
| CONDITION SENSING PROGRAM | 26 |
|    Moment or Lateral Force Monitoring | 27 |
|    Tension Monitoring | 27 |
|    Position Deviation Monitoring | 28 |
|    Stinger Profile and Pivot Condition Monitoring | 29 |
|    Mode of Condition Monitoring | 29 |
| DETERMINING OF THRUST CORRECTIONS | 29 |
|    Tension Deviation Calculation | 29 |
|    Turning Moment or Lateral Interaction Calculation | 31 |
|    Position Deviation Calculation | 34 |
| INTERACTION OF CORRECTIONS MINIMIZED | 36 |
|    Effect of Lateral Thrust, to Correct for Position Deviation, on Tension Correction | 36 |
|    Effect of Turning Moment on Lateral Interaction and Tension Deviation | 36 |
|    Effect of Tension and Position Deviation Corrections on Turning Moment | 37 |
| SUMMARY OF OVERALL CONTROL CONCEPT | 37 |
| COMPUTERIZED SYSTEM FOR EFFECTING TENSION, LATERAL INTERACTION, AND VESSEL POSITION CORRECTIONS | 40 |
|    Computer Control Format | 40 |
|    Computer Program Philosophy | 42 |
| STINGER CONTROL AUTOMATION | 46 |
| VESSEL AND PIPELINE SURVEILLANCE AND MANUAL CONTROL | 47 |
|    Vessel Surveillance | 48 |
|    Manual Control | 50 |
| SUMMARY OF PRINCIPAL ADVANTAGES AND OVERALL SCOPE OF INVENTION | 51 |

GENERAL BACKGROUND

In recent years, the continued exploitation of offshore oil and gas resources has required the laying of extensive pipeline networks for the purpose of collecting oil and gas from offshore wells and facilitating the transportation of the oil and gas to desired locations.

These offshore pipelaying operations are conducted on a world-wide basis. In many areas of the world, the pipelaying operations are conducted under extremely adverse environmental conditions. The effects of wind, waves, tide and currents, acting both on the pipelaying vessel and the pipeline being laid, tend to make it extremely difficult to lay a pipeline on a desired course while maintaining the stresses imposed on the pipeline during its laying within predetermined or acceptable stress limits.

In the past control has been maintained by utilizing winch operated anchor lines as a device for moving the pipelaying vessel forward, as pipelaying proceeds. With the pipelaying vessel under the control of the winch-operated anchor lines, an operator was able to maintain a reasonable degree of control over vessel position and rate of movement during the pipelaying operation.

However, technology has now developed to the point where offshore drilling operations are being conducted in waters of such a depth as to make it difficult, and even impossible, to effectively control vessel position and movement through an anchor line system.

Thus, pipelaying operations in waters of extreme depth, i.e., on the order of 200 fathoms or greater, may, of necessity, rely upon the thrust exerted on a pipelaying vessel by vessel propulsion units.

Such vessel propulsion units are well known and may assume a variety of forms. For example, the vessel propulsion units may comprise a plurality of fixedly positioned propeller or jet type vessel propulsion units disposed about the periphery of the hull. By varying the thrust level of individual propulsion units, desired changes in forward and lateral thrust exerted on the pipelaying vessel may be effected and desired turning moments may be imputed to the pipelaying vessel.

This control over the thrust effect exerted on a pipelaying vessel may be further enhanced by employing vessel propulsion units of the jet or propeller type which are movably mounted on the hull of the pipelaying vessel. With such movably mounted vessel propulsion units, both the level of thrust of the unit and the direction of thrust, i.e. azimuth, may be adjusted so as to make it possible for an operator or control system to adjust the thrust effect of an individual propulsion unit.

Vessel propulsion units of this general nature employed for the purpose of controlling vessel position are now known in the patent literature and described, for example, in such United States patents as: Wanzer, U.S. Pat. No. 2,987,027; Shatto, Jr. U.S. Pat. No. 3,176,645; Shatto, Jr. et al. U.S. Pat. No. 3,187,704; Berne U.S. Pat. No. 3,311,079; Goepfert et al. U.S. Pat. No. 3,214,921; Kolb et al. U.S. Pat. No. 3,145,683; Deal, Jr. et al. U.S. Pat. No. 3,228,368; and Cox et al. U.S. Pat. No. 3,331,212.

It has also been recognized, as a distinct advance in the pipelaying art, that the forces exerted on a pipeline in the direction of pipelaying may be monitored, with this monitoring being employed to control the thrust effect of vessel propulsion units. This concept is described, in a variety of formats, in Lawrence U.S. Pat. No. 3,472,034 assigned to the assignee of the present invention.

The maintenance of tension control over a pipeline being laid on a submerged surface is contemplated in this aforesaid Lawrence U.S. Pat. No. 3,472,034, with a particularly efficacious mechanism for controlling tension being described in a Lawrence U.S. Pat. No. 3,390,532, also assigned to the assignee of the present invention. The tensioning apparatus featured in the aforesaid Lawrence U.S. Pat. No. 3,390,532 is particularly desirable as it provides a mechanism operable to continuously impart tension to a pipeline, with tension being maintained regardless of whether the pipelaying vessel is stationary relative to the pipeline, moving forward relative to the pipeline, or moving rearwardly relative to the pipeline. This tensioning mechanism is uniquely advantageous in that it provides a system for imparting tension to a pipeline, which tension is not significantly, adversely affected by wave action which tends to induce movement of the vessel relative to the pipeline in both forward and reverse directions.

Another singularly effective technique for controlling the forces exerted on a pipeline during pipeline laying operations is described in a Rochelle et al. U.S. Pat. No. 3,507,126 assigned to the assignee of the present invention.

These prior advances in the pipelaying art notwithstanding, there remains a significant, and hitherto unfulfilled, need for a dynamic vessel positioning concept which is uniquely geared to pipelaying operations and which is operable to effectively coordinate the maintenance of pipeline stress and pipeline position as pipelaying proceeds.

This need requires a unique assignment of priorities, with respect to the correcting of pipeline stresses relative to the position of a pipelaying vessel. It also requires the provision of a concept for monitoring vessel position with unique accuracy as pipelaying proceeds in deep waters, out of contact with conventional, land-based navigation control means.

Of particular significance is the need for a dynamic vessel positioning system which, unlike those featured in the aforesaid Wanzer, Shatto Jr., Shatto Jr. et al., Goepfert, Kolb et al, Deal et al., and Cox et al. patents, adequately compensates for the unique "stop and go" nature of offshore pipeline laying operations.

This "stop and go" characteristic results form the present day reliance upon welding as a system for lengthening the pipeline. This welding is effected on the pipelaying vessel and entails the addition of pipe joints or segments to a portion of the pipeline which is supported or gripped on the pipelaying vessel. The welding of the segments is conducted in stages. In general, the welding operation involves the more or less fixed gripping of the pipeline on the vessel, while adding a pipe joint or segment to the free extremity of the pipeline supported on the vessel. As a first weld is applied to the newly added segment to attach it to the pipeline, welded joints between previously added segments are strengthened at various welding stations spaced longitudinally along the pipeline on the pipelaying vessel. Periodically, welded segments of the gripped upper portion of the pipeline are allowed to feed downwardly toward the submerged pipeline portion.

The gripping of the upper portion of the pipeline during the welding or pipeline lengthening operation may be such as to accommodate some movement between the pipeline and the vessel as a result of wave action. Gripping of this nature, for example, is described in the aforesaid Lawrence U.S. Pat. No. 3,390,532.

This wave action induced, relative movement between the pipeline and vessel obviously presents complications with respect to the conducting of the welding operation. In deep, offshore waters where the wave action may be especially severe, the wave action induced movement between the pipeline and vessel may well be of such a magnitude as to make it difficult, if not impossible, to weld segments to the pipeline without resorting to complex welding stations which would be movable relative to the vessel and with the pipeline so as to minimize relative movement between a welder and the pipeline itself. While it may be feasible in certain instances to provide welding platforms which are more or less fixedly connected with a pipeline, so as to be movable relative to the pipelaying vessel, such platforms would be expected to consume desired working space and complicate the overall pipelaying operation.

Alternatively, positive gripping may be employed, intermittent with pipe segment feeding, so as to affirmatively prevent movement of pipeline segments toward a submerged surface. Such a positive gripping arrangement is described in the aforesaid Lawrence U.S. Pat. No. 3,472,034. However, where such affirmative or positive gripping is employed, the action of waves, wind, tide, i.e. all environmental forces, acting on the pipelaying vessel may create a substantial problem in that these forces tend to produce significant changes in the level of tension imparted to the submerged portion of the pipeline from the gripped upper portion of the pipeline, fixedly secured on the pipelaying vessel.

Thus, the "stop and go" nature of modern day pipelaying techniques creates certain problems with respect to relative movement between the pipeline and vessel and certain problems with respect to variations in force exerted on the pipeline. In addition, the "stop and go" nature of offshore pipeline laying operations creates substantial problems with respect to the maintenance of the position of the pipelaying vessel on a desired course.

PRINCIPAL OBJECTS AND SUMMARY OF INVENTION

It is a principal object of the invention to provide methods and apparatus for laying pipelines in offshore locations, where the stresses within (or force imposed on) the pipeline resulting from the pipelaying operation are effectively monitored and sought to be maintained within desired stress or applied force limits, and, as a subordinated priority, the position of the pipeline laying vessel is sought to be maintained on a desired course.

It is also a principal object of the invention to provide methods and apparatus for effecting the laying of pipelines in offshore locations, which methods and apparatus effectively stabilize the upper portion of a pipeline gripped on a pipelaying vessel during segment welding or pipeline lengthening operations and concurrently insure that environmentally induced movement of the pipelaying vessel, transmitted to the stabilized upper portion of the pipeline, does not adversely affect the stresses in or forces acting on the pipeline.

It is another principal object of the invention to provide a unique pipeline feeding system by means of which a tensioning mechanism is employed to effect the feeding of pipeline segments from a pipelaying vessel without reliance upon the operation of vessel propulsion units.

Another object of the invention is to provide a composite system for imparting tension to a pipeline, in which composite system a pipeline gripping clamp is engaged with and freed from the pipeline under conditions so as to engender substantially no stress as a result of the engaging or disengaging operation.

Another object of the invention is to provide a technique for determining deviations in pipeline tension, lateral interaction between the pipeline and stinger, and deviations in the course of the pipelaying vessel, and for determining appropriate corrections to be applied by vessel propulsion units at a frequency pattern which permits of the simultaneous correction for multiple deviation conditions.

Another object of the invention is to provide methods and apparatus for conducting offshore pipeline laying operations where the operation of multiple, vessel propulsion units is controlled in a unique manner so as to tend to balance the operating loads of the vessel propulsion units.

It is also an object of the invention to provide methods and apparatus for determining the position of a pipelaying vessel, which methods and apparatus may employ an orbiting satellite as a means for determining vessel position, and wherein the satellite determined positions of the pipelaying vessel may be carried forward or extrapolated through reliance upon periodically repositioned navigation aids disposed generally along the pipelaying course.

A further object of the invention is to provide methods and apparatus for automating the control of a pipelaying vessel so as to properly and rapidly coordinate the corrections in vessel thrust required to maintain pipeline stresses and pipelaying vessel position within acceptable or predetermined limits.

It is also an object of the invention to provide a visual display of engine operating conditions which will facilitate manual superceding of a computer controlled, vessel propulsion system.

In describing the invention, reference will be made to a preferred embodiment.

This embodiment is characterized by a method of effecting the laying of a pipeline on a submerged surface from vessel means including a plurality of vessel propulsion units.

The method comprises the supporting of the pipeline from the floating vessel means so that an upper portion of the pipeline is supported from the floating vessel means and a generally submerged portion of the pipeline, connected with the upper portion extends downwardly to the submerged surface. At least periodically, at least an indication of a vector component of tension exerted on said pipeline from said floating vessel means is detected. At least periodically, at least an indication of a vector component of generally horizontally directed force interacting laterally between said floating vessel means and said pipeline and directed generally transversely of said pipeline is detected. At least periodically, at least an indication of the position of said floating vessel means relative to a desired course of movement of said floating vessel means is detected. In response to this detecting of tension and interacting laterally directed force and the detecting of floating vessel means position and digital processing of this data (which permits a manual input of information relating thereto during the pipelaying operation), the thrust effect of the vessel propulsion units is adjusted to tend to maintain tension exerted on said pipeline generally within a predetermined tension range. The thrust effect of the vessel propulsion units is also adjusted to effect a turning movement of the floating vessel means, tending to maintain the interacting laterally directed force generally within a predetermined force range. In addition, the thrust effect of the vessel propulsion units is adjusted to tend to maintain the position of the floating vessel means generally on a desired course.

In a preferred embodiment, the supporting of the upper portion of the pipeline is effected by periodically gripping the upper pipeline portion so as to substantially prevent a segment of the upper portion from moving downwardly toward the generally submerged portion. In this preferred embodiment, periodically and alternately with the gripping of the upper portion of the pipeline, a segment of the upper portion is fed generally toward the generally submerged pipeline portion, while concurrently imparting a series of longitudinally spaced tensioning forces to the upper portion of the pipeline. These imparted tensioning forces are operable to continuously bias the upper portion of the pipeline in a direction tending to impart tension to the generally submerged pipeline portion. This biasing remains continuously in effect, substantially independent of the rate of vessel means movement and substantially independent of the direction of relative movement between the floating vessel means and the generally submerged portion of the pipeline.

Also in this preferred embodiment, and during the gripping of the upper portion of the pipeline, the level of tension imparted from the floating vessel means to the generally submerged portion of the pipeline is maintained at a tension level substantially above that maintained during the aforesaid segment feeding. This increase in tension tends to maintain the level of tension imparted to the generally submerged portion of the pipeline, during the aforesaid gripping, generally within an acceptable tension range, i.e., above a predetermined minimum tension level. This increase in tension imparted to the pipeline is intended to accommodate deviations in pipeline tension resulting from wave action or other environmental influences acting on the floating vessel means, without substantially deviating from a predetermined tension range.

This high tension level during pipeline gripping also serves a unique pipeline segment feeding function. When segment feeding is to be effected, a clamp gripping the pipeline is released and a yieldable tensioning device, possibly of the wheel-type, assumes the tensioning load. By reducing the tension inducing bias of the yieldable tensioning device, pipeline segments may be fed toward the submerged surface without relying on vessel propulsion unit induced, forward motion of the vessel means. With the tension being initially at a high level, it may be reduced for the segment feeding function without reducing tension below an acceptable lower limit.

In the preferred embodiment, periodically, a generally direct indication of tension exerted on the submerged portion of the pipeline is detected. Periodically, an indication of a vector component of generally horizontally directed force interacting laterally between the floating vessel means and the pipeline is detected. Periodically, an indication of any lateral displacement of the floating vessel means relative to a desired course of movement id detected.

In the preferred embodiment this detecting of vessel means position is effected by periodically determining the location of the floating vessel means with reference to an orbiting satellite. In this preferred embodiment, the periodically determined floating vessel means positions, determined by reference to the orbiting satellite, are extrapolated forward with reference to a generally fixedly positioned navigation station. Periodically, this station is relocated along the course of vessel movement.

In the preferred embodiment, and in response to the detecting of tension and interacting laterally directed force, and the detecting of floating vessel means position, the forces applied upon, i.e. the stresses within, the pipeline are maintained within acceptable limits as a first priority. Thereafter, as a second priority, a position correction is applied to the floating vessel means.

In the preferred embodiment, these corrections are effected by adjusting the thrust effect of the vessel propulsion units so as to tend to maintain tension exerted on the generally submerged portion of the pipeline generally within a predetermined tension range. In addition, the thrust effect of the vessel propulsion units is adjusted to exert a turning moment on the floating vessel means tending to maintain the interacting laterally directed force within a predetermined force range. Secondly, the thrust effect of the vessel propulsion units is adjusted to tend to maintain the position of the floating vessel means on a desired course.

In the preferred embodiment of the invention, the adjusting of the thrust effect of the vessel propulsion units, in relation to the tension correction, is effected so as to tend to maintain the deviation in thrust level between the vessel propulsion units within a predetermined format. This format may entail certain allowable ratios in vessel propulsion unit load levels, certain allowable differences in speed of these units, etc. In this preferred embodiment, the adjusting effect of the vessel propulsion units, with reference to the interacting lateral force, is effected by adjusting the thrust effect of the pairs of vessel propulsion units so as to tend to minimize translation of the floating vessel means and preferably also so as to maintain the deviation in thrust level between the vessel propulsion units within a predetermined format. Further, in this preferred embodiment, the adjusting of the thrust effect of the vessel propulsion units with respect to the course or position correction is effected so as to tend to maintain the deviation in thrust level between the vessel propulsion units within a predetermined format.

The invention, of course, contemplates various unique combinations of apparatus means for implementing the individual and collective aspects of the foregoing methods.

The invention also contemplates a novel dynamic correction approach wherein the thrusts of vessel propulsion units are adjusted taking into account detecting deviation, environmental bias, and rate of deviation.

DRAWINGS

In describing the invention, reference will be made to a preferred embodiment shown in the appended drawings.

Figure 2:
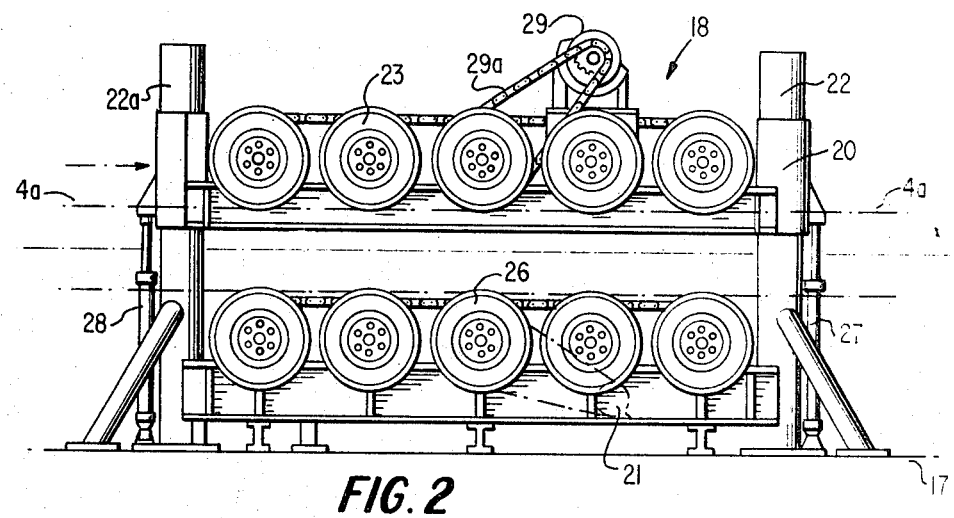
Figure 3:
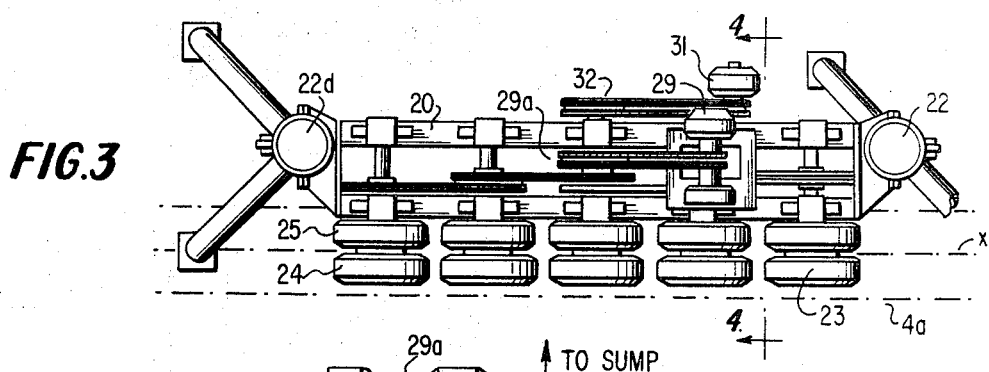
Figure 4:
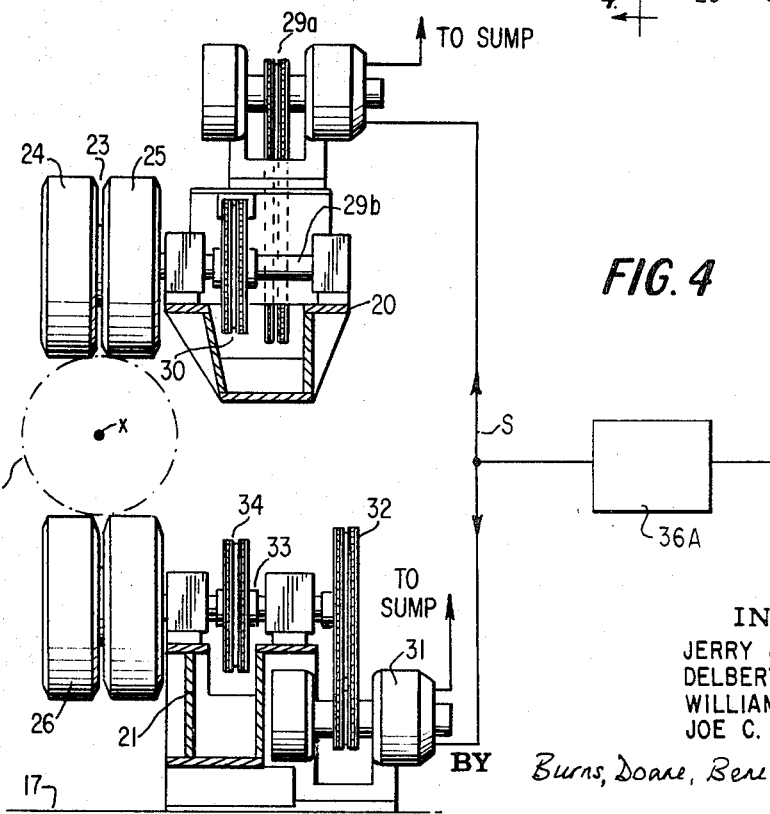
Figure 6:
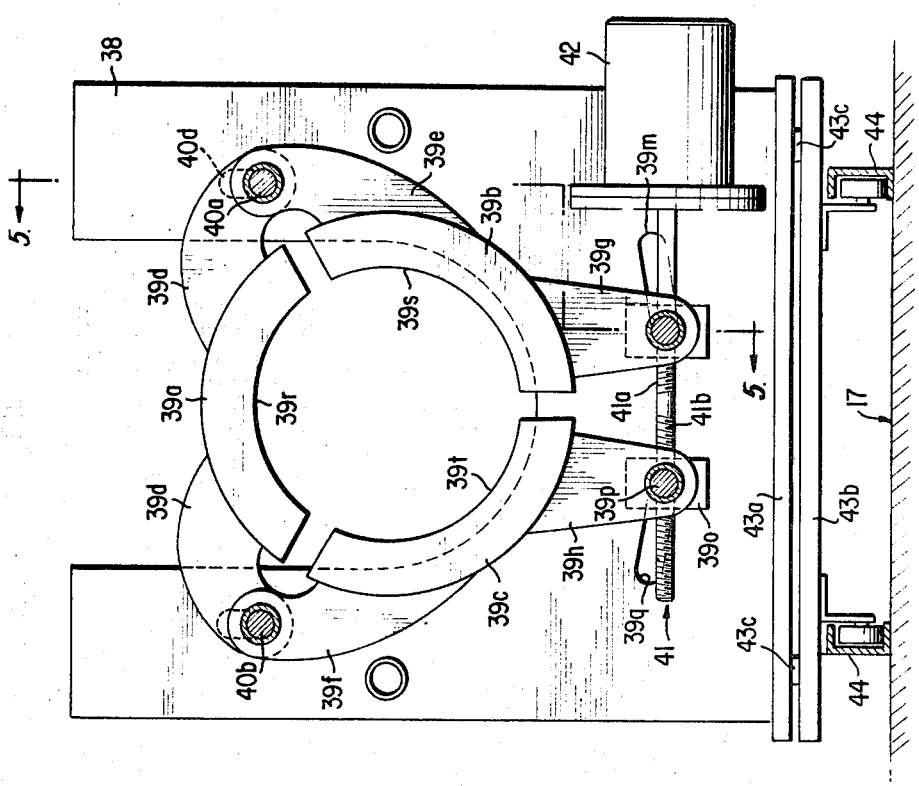
Figure 5:
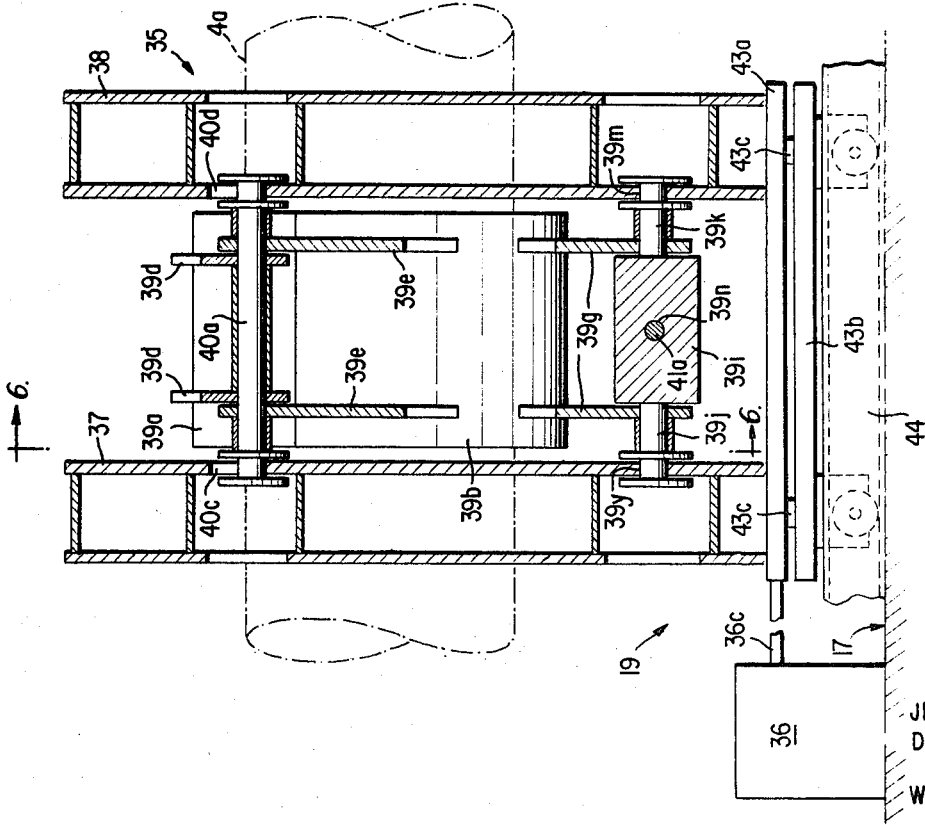
Figure 16:
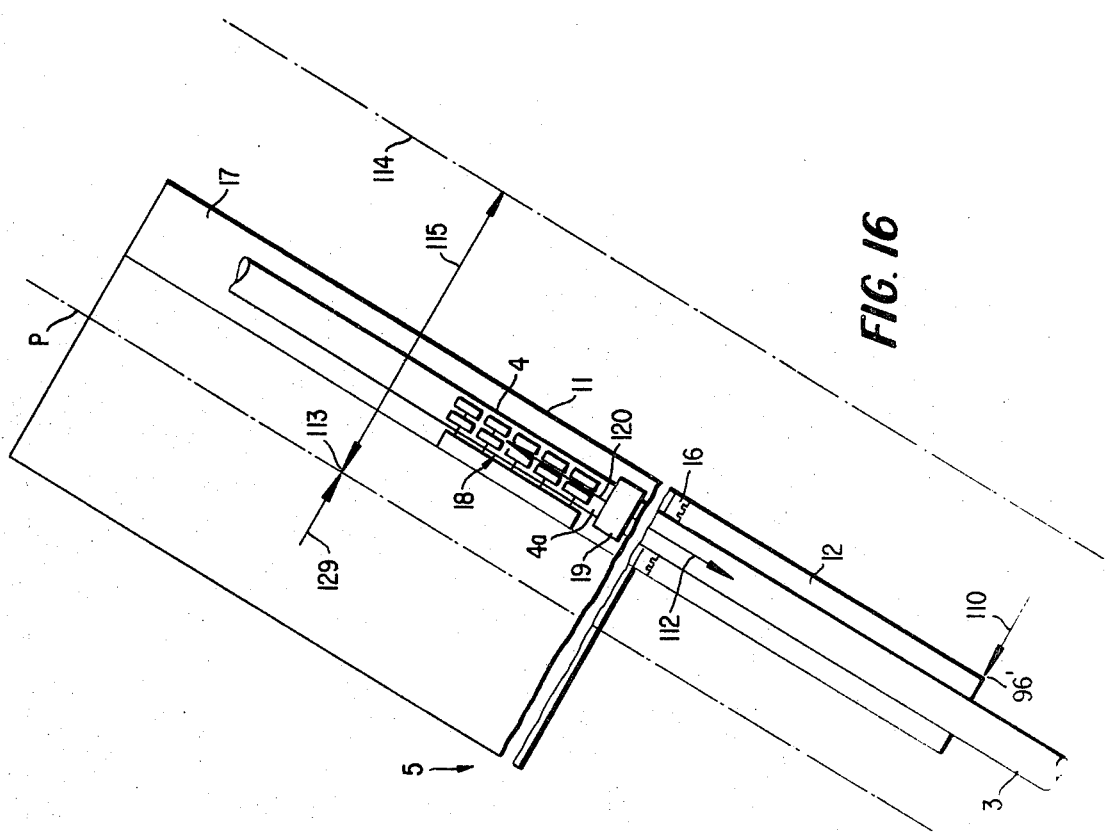
Figure 15:
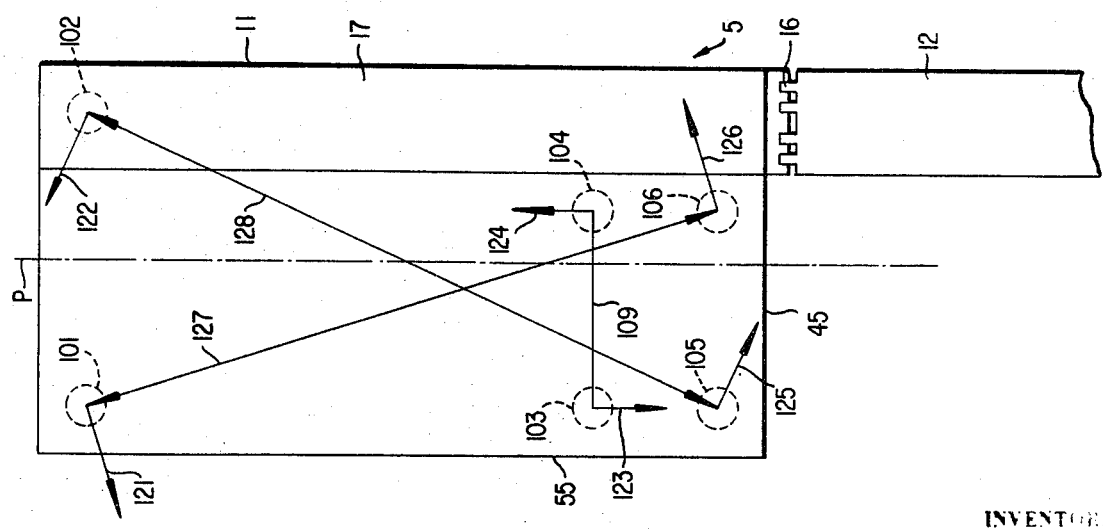
Figure 18:
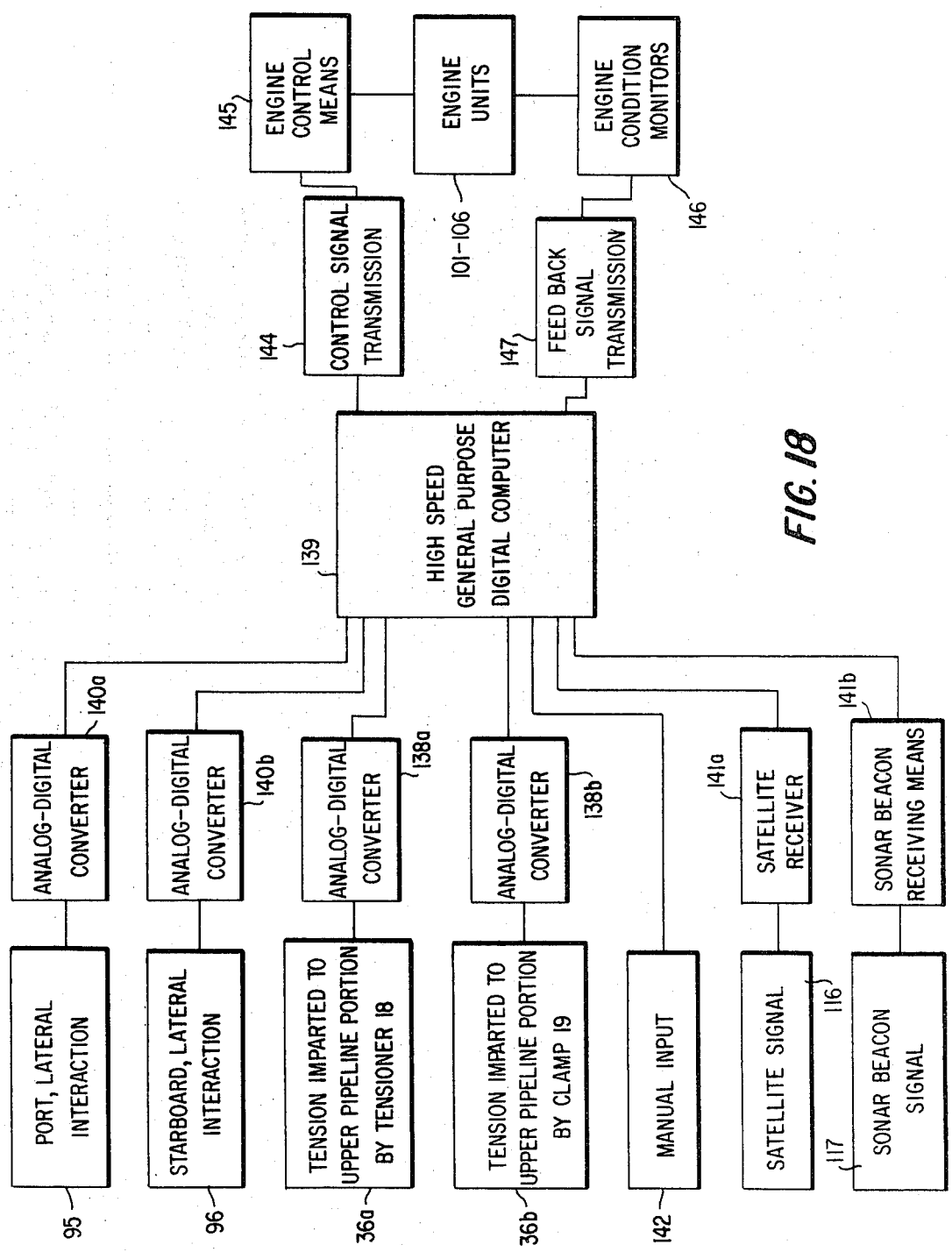
Figure 19:
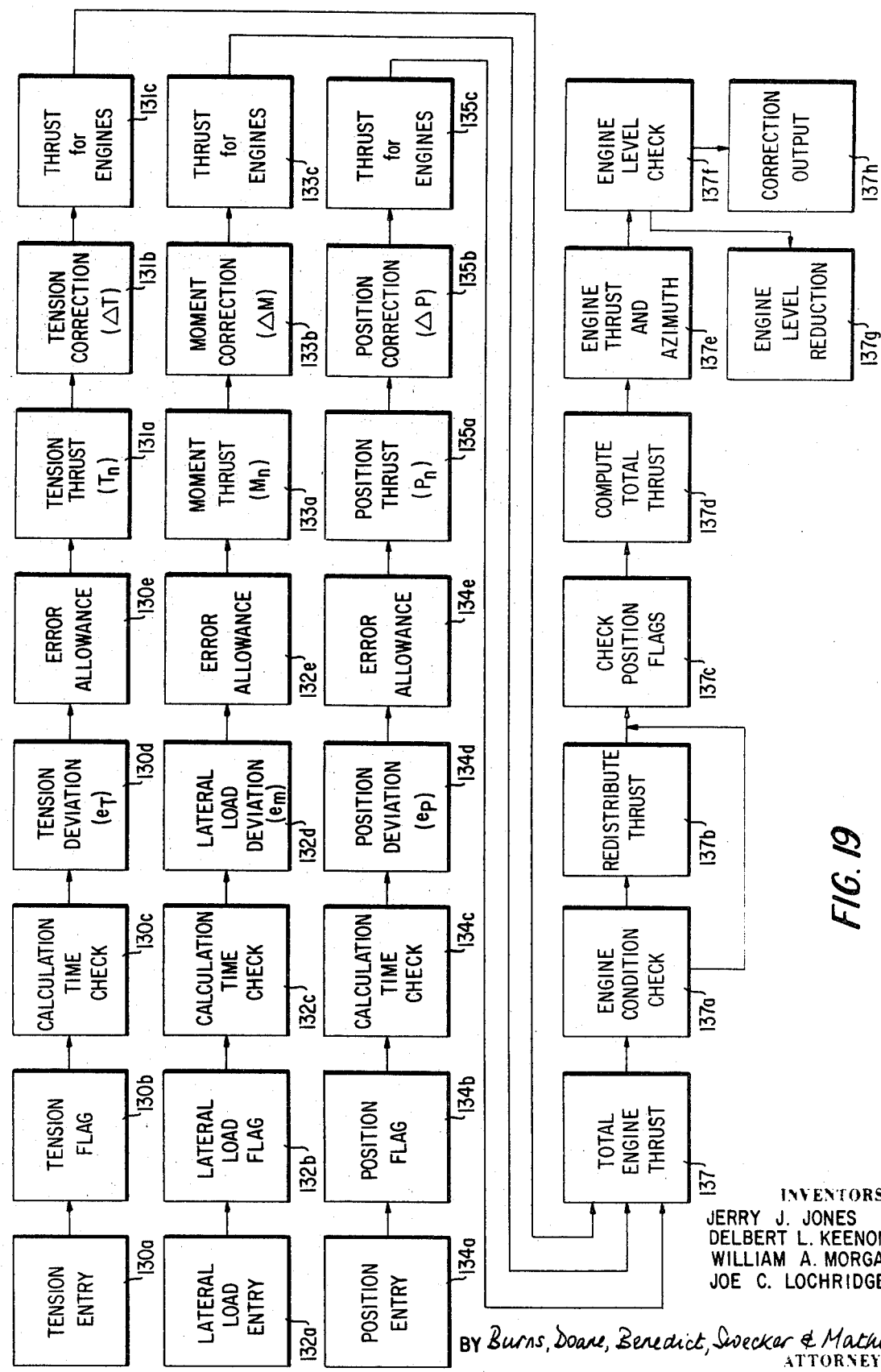
Figure 20:
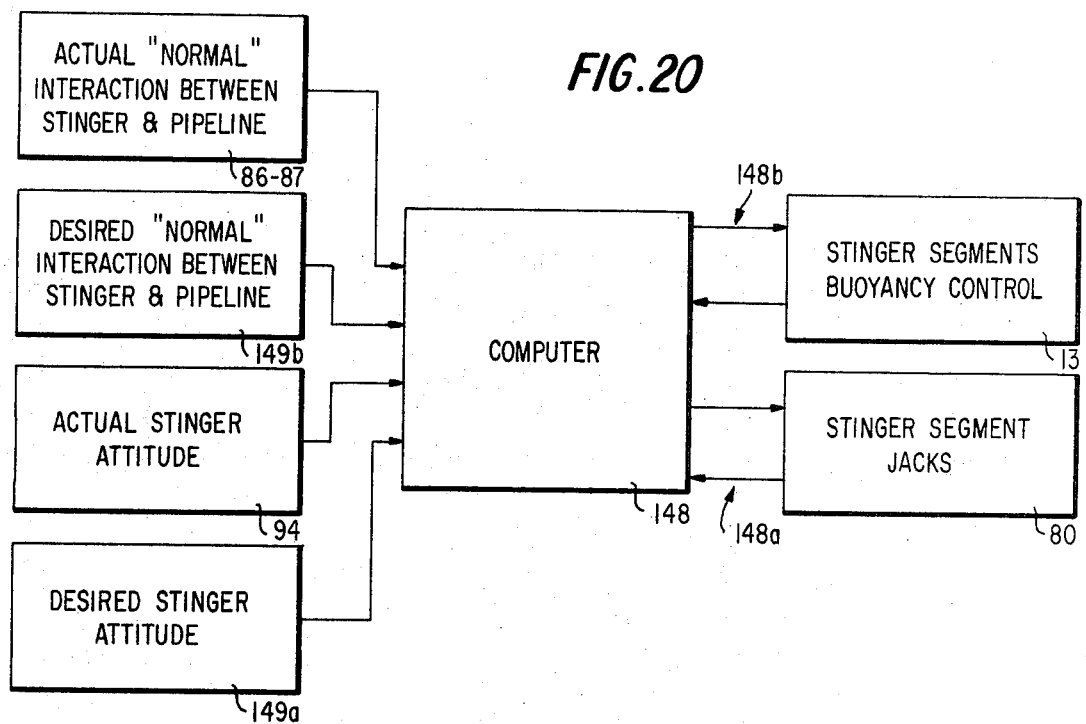
Figure 21:
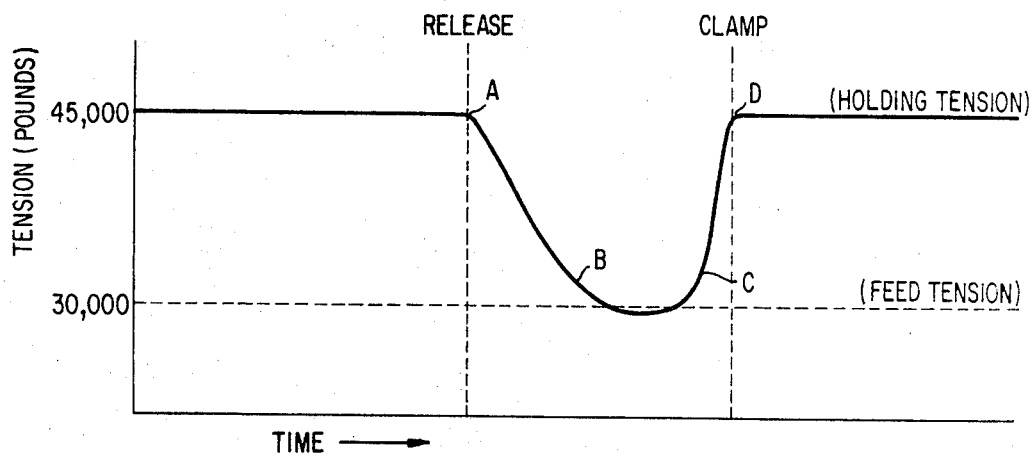
Figure 23:
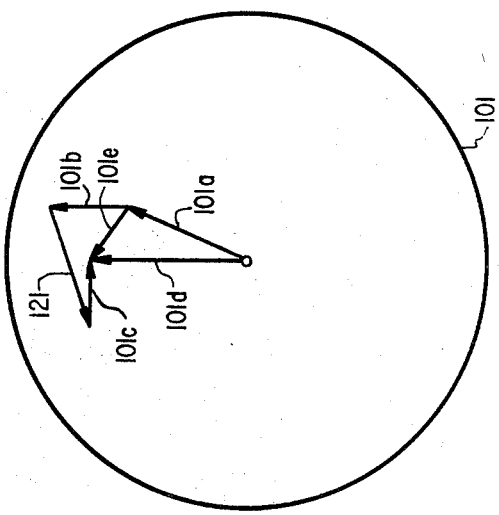
Figure 22:
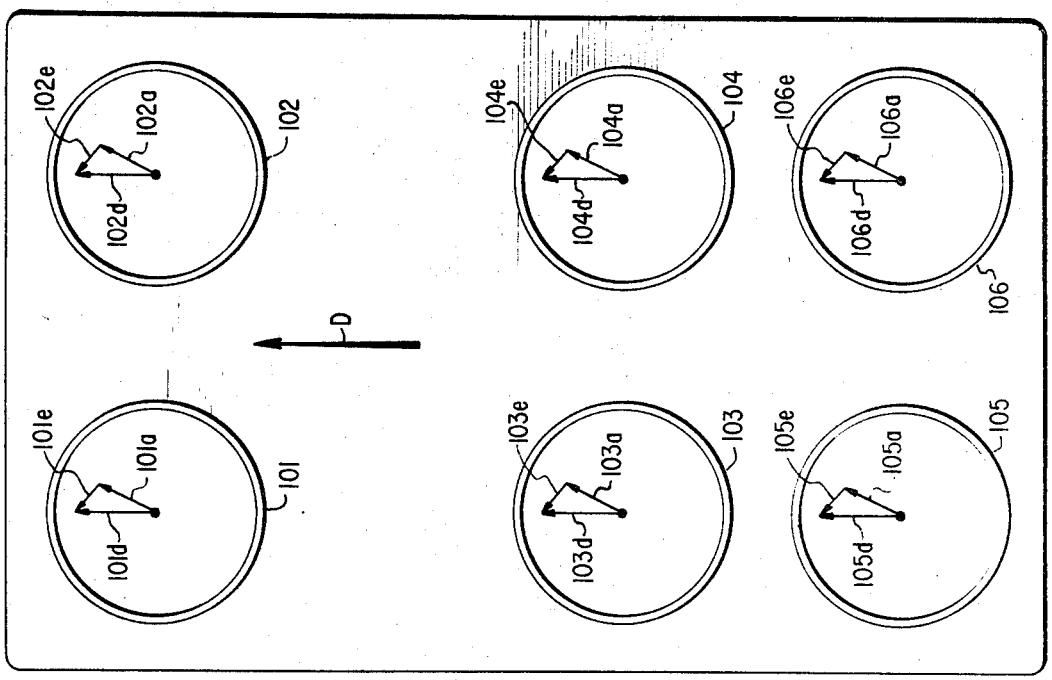

In the Drawings:

FIG. 1 provides a side elevational view of floating vessel means (including a pipelaying barge and a buoyant and articulated ramp or "stinger" which is pivotably connected to the barge and depends downwardly toward a submerged surface), a pipeline tensioning and pipeline clamping assembly mounted on the barge and operable to restrain the upper portion of the pipeline, and the pipeline itself extending from the barge down to the ocean floor or submerged surface;

FIG. 2 provides a detailed side elevation view of the pipe tensioning mechanism illustrated schematically in FIG. 1;

FIG. 3 provides a top plan view of the pipe tensioning mechanism shown in FIG. 2;

FIG. 4 provides a transverse sectional view of the FIG. 2 pipe tensioning mechanism, as viewed along the section line 4—4 of FIG. 3;

FIG. 5 provides a partially sectioned, side elevational view, as viewed along section line 5—5 of FIG. 6, looking toward the port side of the FIG. 1 assembly, of a pipe clamp which is incorporated on the deck of the pipelaying barge of FIG. 1, and positioned aft of the pipe tensioning mechanism illustrated in FIGS. 2 through 4;

FIG. 6 provides a partially sectioned, end elevational view of the FIG. 5 clamping mechanism, as viewed along the section line 6—6 of FIG. 5;

FIG. 7 provides a perspective "exploded-format" view of hitch components of the barge and upper end of the stinger, by means of which the stinger is pivotally attached to the stern of the barge;

FIG. 8 provides a perspective view of adjacent segments of the articulated stinger which are interconnected by hinge and jacking mechanisms for limited vertical articulation and locking;

FIG. 9 provides a side elevational view of the hinge and jacking mechanism interposed between the stinger segments, shown in fragmentary form in FIG. 8;

FIG. 10 provides a perspective view of the lower or outermost segment of the articulated stinger, illustrating the general disposition of sensing devices operable to detect both vertically and laterally directed interacting forces between the pipeline and the stinger portion of the pipelaying vessel means;

FIG. 11 provides a top plan, fragmentary view of the load sensing stinger segment shown in FIG. 10;

FIG. 12 provides a fragmentary, top plan view of a representative side load sensing unit incorporated in the port side of the outermost stinger segment of FIG. 10;

FIG. 13 provides a fragmentary, side elevational view of the representative, lateral load detecting unit shown in FIG. 12, viewing this load cell generally from the cradled or longitudinally centered location of the pipeline;

FIG. 14 provides a generally vertically sectioned, fragmentary view of a representative vertical load measuring cell incorporated in the outermost stinger segment of FIG. 10, as viewed generally along the section line 14—14 of FIG. 11;

FIG. 15 provides a schematic illustration of the hull of the FIG. 1 pipelaying barge, illustrating the general location of vessel propulsion units in relation to the barge hull and the articulated stinger, viewing these locations in a top plan view format;

FIG. 16 provides a schematic representation in top plan view format of the lay barge and stinger, illustrating the detected deviations in tension and lateral force and detected deviation in course position, and also illustrating the resultant forces which are to be applied to the lay barge to tend to eliminate such deviations;

FIG. 17 provides a diagrammatic representation of the manner in which parameters affecting the pipelaying operation are detected, and appropriate corrective action taken;

FIG. 18 provides a schematic illustration of a computerized, servocontrol system employed to effect adjustments in the thrust effect of the propulsion units of the FIG. 1 pipelaying barge, in response to the detection of deviations in pipeline stresses and in lay barge position;

FIG. 19 schematically represents the steps involved in a computerized control system intended to optimize the advantages of the invention;

FIG. 20 provides a diagrammatic representation, indicating the manner in which the normal force acting generally perpendicularly between the outermost stinger segment and the pipeline may be monitored and employed to insure the continued conforming or supporting engagement between the stinger and the pipeline;

FIG. 21 schematically illustrates the manner in which the tension vectors of the vessel propulsion units are adjusted in an effort to maintain pipeline stress within acceptable limits;

FIG. 22 depicts the manner in which the thrust and azimuth of the vessel propulsion units are adjusted in an effort to maintain the forces acting on the pipeline and the position of the lay barge within acceptable limits;

FIG. 23 illustrates the manner in which the thrust and azimuth of an individual vessel propulsion unit are adjusted in the FIG. 22 representative, showing corrective vectors applicable to offset tension, lateral interaction, and course deviations; and FIG. 24 graphically illustrates a control console which is intended to provide the operator of the lay barge with effective monitoring of the overall pipeline operation.

PRINCIPAL COMPONENTS OF THE PIPELAYING SYSTEM

FIG. 1 schematically illustrates a pipelaying operation, depicting the laying of a pipeline 1 on a submerged surface 2.

The pipeline 1 includes a lower, generally submerged portion 3 which extends upwardly from the ocean floor or submerged surface 2 to an upper portion 4 which is supported from floating vessel means 5. Vessel means 5 is provided with vessel propulsion means, comprising a plurality of individually controllable vessel propulsion units 6. Portions 3 and 4 of pipeline 1 are, for the purpose of this discussion, viewed as zones of the pipeline profile which translate along the pipeline as it is laid.

A portion 3a of the submerged pipeline portion 3 constitutes the portion already fully laid on the submerged surface 2. As illustrated, pipeline portion 3a may extend from an offshore tower or derrick-like installation 7. Installation 7 may comprise, for example, a collecting or tanker loading station or a well provided with a riser conduit 8. Riser conduit 8 extends from L-shaped junction 8a, where riser 8 and pipeline segment 3a are joined, to appropriate fluid handing means 9 supported by the tower or derrick 7 above the water surface or water line 10.

One manner in which the laying of the pipeline 3 may be initiated away from the installation 7 is generally described, for example, in a Broadway et al. U.S. Pat. No. 3,258,928, assigned to the assignee of the present invention. However, as will be appreciated, this invention commences from the point after the initial part of pipeline portion 3a has been positioned.

Floating vessel means 5 may be considered as comprising a pipelaying vessel 11 upon which the propulsion units 6 are mounted. Pipelaying vessel 11 is provided, on the underside of its hull, with a plurality of peripherally dispersed, engine propulsion units 6. It is contemplated, by way of example, that six such engine propulsion units may be provided, each being a right angle drive or "cycloidal" type unit adjustable both as to thrust azimuth and thrust level. It is contemplated that each unit may have a capacity at least on the order of 1,500 horsepower.

Floating vessel means 5 also comprises a buoyant ramp or "stinger" assembly 12. Stinger assembly 12 is attached to vessel 11 for vertical pivot movement and serves to provide support to the underside of the pipeline portion 3 during the initial portion of the descent of pipeline segments from the floating vessel means 5, downwardly toward the submerged surface 2.

While stinger 12 may assume a variety of forms, the present invention contemplates the use of a generally rigid, buoyant stinger which may be "articulated" or adjustable in profile, in a generally vertical direction, but which is more or less fixedly positioned with respect to the lay vessel 11 insofar as generally horizontal movement is concerned. With the stinger 12 more or less rigidly mounted on the vessel 11, insofar as horizontal movement is concerned, the stinger 12 and vessel 11 may be considered as unitary or horizontally non-articulated floating vessel means 5.

In the preferred embodiment, the articulated stinger 12 will comprise a plurality of buoyant segments 13. Adjacent buoyant segments 13 are pivotally interconnected by hinge means 14 having a generally horizontal pivot axis. The degree of inclination between adjacent segments 13 may be selectively adjusted and locked in place by mechanical or hydraulic jack units 15. Preferably these units are of the screw jack variety.

The operation of the jack means 15, for the purpose of adjusting and locking inclination between segments 13, may be effected remotely from the barge 11 or may be effected by divers at the location of each individual jack unit 15. Similarly, the buoyancy of each segment 13 may be adjusted remotely from the lay barge 11, or alternatively may be adjusted by divers operating flooding and air valves associated with each individual segment 13.

Structural details of the articulated stinger are generally described in the aforesaid Rochelle et al. U.S. Pat. No. 3,507,126, the disclosure of which is herein incorporated by reference.

Representative systems for adjusting the buoyancy of individual segments 13 are described in detail in the aforesaid Rochelle application. This Rochelle disclosure, with respect to buoyancy, embodies, in principal, the buoyancy control disclosures exemplified by the teachings of the aforesaid Lawrence U.S. Pat. No. 3,390,532 and an earlier Hauber et al. U.S. Pat. No. 3,280,571, also assigned to the assignee of the present invention and the disclosures of which are herein incorporated by reference.

The outermost stinger segment 13a, positioned at the lower stinger extremity, is provided with load cells for measuring the normal interaction, between the pipeline portion 3 and the portion of the floating vessel means 5 defined by the stinger 12, i.e. the interaction in a generally vertical, longitudinal median plane of the pipeline, directed generally perpendicular to the pipeline central axis at the load cell site. Segment 13a is also provided with load cell means for detecting the laterally interacting force between the portion of the vessel means 5 defined by the stinger 12 and the pipeline portion 3. This laterally interacting force is directed generally horizontally and transversely of the longitudinally extending and generally vertically extending, median plane P of the barge 11, shown, for example, in FIG. 15. This median plane P is parallel to the generally vertical, longitudinally extending median plane of the stinger 12. At this point, it will be recognized that the terms horizontal and vertical are used with reference to calm sea conditions where essentially no wave action is in evidence.

Load cells associated with the segment 13a for the purpose of detecting both vertically and laterally directed forces imposed on the pipeline portion 3 are described in detail in the aforesaid Rochelle et al. U.S. Pat. No. 3,507,126, the disclosure of which is incorporated herein by reference. Details of presently preferred and modified forms of these load cells will be subsequently described in this disclosure.

The stinger 12 is connected by a hitch unit 16 to the stern of the lay vessel 11. Hitch unit 16 connects the stinger 12 to the vessel 11 so as to permit generally vertical pivotal movement of the stinger 12 relative to the vessel 11 about a generally horizontally directed pivot axis. The hitch unit 16 connects the stinger 12 to the vessel 11 so that the stinger 12 defines a pipeline support, constituting a longitudinal continuation of a pipeline supporting ramp 17 formed on the starboard side of the vessel 11. Ramp 17 inclines, in an aft direction, toward water surface 10. obviously, ramp 17 and stinger 12 could be so aligned at locations other than a side of vessel means 5.

Structural details of the hitch 16, which will be subsequently briefly reviewed, are generally set forth in detail in the disclosure of Lochridge et al. U.S. Pat. No. 3,538,712, assigned to the assignee of the present invention. The disclosure of this Lochridge et al. application is herein incorporated by reference with respect to the hitch unit 16.

The manner in which the pipelaying ramp 17 and the stinger 12 are provided with pipe cradling rollers so as to provide a friction-easing and cradling support of the pipeline segments as they move from the upper portion 4 toward the portion 3b, suspended between the outer extremity of the stinger 12 and the ocean floor 2, is described in detail in the aforesaid Lawrence U.S. Pat. No. 3,390,532 as well as in the aforesaid Hauber et al. U.S. Pat. No. 3,280,571.

Lay barge 11 is provided with a yieldable, pipe tensioning or biasing unit 18. A periodically operable pipe clamping unit 19 is mounted on the lay barge 11 and may be located aft of the tensioning unit 18 and between the tensioning unit 18 and the stinger 12. It is also feasible for clamping unit 19 to be located forward of tensioner unit 18.

Tensioner 18 comprises a torqued-wheel type tensioner unit of the type described in detail in the aforesaid Lawrence U.S. Pat. No. 3,390,532, the disclosure of which is herein incorporated by reference. This tensioning unit is uniquely operable to impart continuous, tension inducing bias to the pipeline, with this tension remaining in effect regardless of vessel movements induced by environmental forces such as wave action. This wave action may cause the vessel 11 to undergo movement generally toward the submerged portion 3 or away from the portion 3. Even during such movement, and even while the vessel 11 is stationary at any particular location, the tensioning mechanism 18 continues to effectively bias the pipeline upper portion 4 so as to apply tension to the generally submerged portion 3. This tension, which may be varied to induce feeding of pipeline segments, is significant in that it prevents buckling of the suspended free zone 3b of the pipeline portion 3, extending from stinger 12 to surface 2, and may be adjusted to prevent undesired movement of the pipeline segments along the ramp 17 and stinger 12 toward the submerged surface 2.

The tensioning mechanism 18 serves to apply tension to the pipeline while the vessel means 5 is stationary, moving ahead or moving rearwardly along the pipelaying course. Thus, during the paying out or feeding of pipeline segments aft of the vessel means 5, continuous, albeit possibly varied, tension is maintained.

Intermittently or alternately with the paying out or feeding of segments of the pipeline, the pipeline upper portion 4 is more or less rigidly clamped by clamping mechanism 19, to be subsequently described. The clamping mechanism 19 generally fixedly secures the pipeline upper portion 4 relative to the lay barge 11 so as to prevent movement of the upper pipeline portion 4 relative to the deck and ramp 17 of the lay barge (except for the generally undiscernible movement permitted by tension load measuring means associated with unit 19). This immobilization of the pipeline relative to the lay barge enables the pipeline lengthening or welding operation to be conducted, unhampered by relative movement between the pipeline and the lay barge.

In a manner to be subsequently described in detail, the clamping mechanism 19 engages the pipeline portion 4 while it is being tensioned by the mechanism 18. Preferably before this engagement, the tensioning level of mechanism 18 is elevated. This elevation, or raising, of the tensioning level applied to the pipeline serves to stop the feeding of pipeline segments toward the submerged surface. This intensified or elevated tensioning level is applied at a level to accommodate, during the clamping of pipeline by gripping unit 19, for changes in tension which would result from wave action acting on the vessel means 5, and to permit subsequent feeding of pipeline segments by mechanism 18 when clamping unit 19 is disengaged from the pipeline. Thus, with the clamping mechanism 19 clamped to the pipeline portion 4, and with the higher level of tension being applied by either or both of units 18 and 19, movement of the lay vessel 11 generally toward the submerged portion 3 of the pipeline, as a result of wave action or other environmental forces, will not reduce the level of applied tension below a predetermined or acceptable level. Further, with unit 19 disengaged, pipeline segments may be fed toward surface 2 merely by reducing the tension level of unit 18.

Before proceeding with a discussion of the manner in which deviation in acceptable pipeline stress and deviation in lay vessel course position are detected and sought to be corrected, it is believed desirable to summarize certain structural aspects of the components of the pipelaying system heretofore outlined.

SUMMARY OF STRUCTURAL DETAILS OF TENSIONING MECHANISM

FIGS. 2, 3 and 4 illustrate structural details of the tensioning mechanism 18 which is mounted on the pipelaying ramp 17 of the lay barge 11.

As illustrated, mechanism 18 comprises first frame means 20 and second frame means 21. The second frame means 21 is fixedly mounted on the ramp 17. Columns 22 and 22a telescopingly receive and movably mount the first frame means 20 in relation to the second frame means 21 so as to permit vertical movement of frame means 20 relative to frame means 21.

A first series of wheel units 23 is mounted on the first frame means 20. Each wheel unit 23 preferably comprises a pair of dual-mounted, pneumatic tires 24 and 25.

The wheel means 23, which, as illustrated, comprise five dual mounted tire pairs, are mounted on the frame 20 so as to be engageable with a generally straight portion 4a of upper pipeline portion 4 ("generally straight," as here defined, encompasses the minor vertical curvature often encountered of the ramps of pipelaying vessels). The wheels mounted on frame 20 have generally radially peripheral portions which are operable to generally simultaneously engage longitudinally spaced portions of the pipeline portion 4a.

A second series of wheel units 26 are mounted on the frame 21 in a mirror image relationship with respect to, and positioned immediately beneath, the wheel units 23 carried by the upper frame 20.

First motor means, comprising hydraulically actuated, linearly reciprocable, piston and cylinder assemblies 27 and 28 serve to move the frame 20 toward and away from the frame 21 so as to induce separation or convergence of the wheel means 23 and 26. Convergence of the frames 20 and 21, with the pipeline portion 4a disposed between the wheel units 23 and 26, causes the wheel units to compressively engage generally opposite upper and lower sides of the pipeline portion 4a. The degree of compression exerted on pipeline portion 4a by the motor means 27 and 28 may be selectively varied and adjusted. As will here be appreciated, the ultimate degree of compression exerted on the pipeline by the wheel units 23 and 26, as a result of the operation of motor means 27 and 28, will be limited by the inflation pressure of wheel units 23 and 26.

As is recognized in the aforesaid Lawrence U.S. Pat. No. 3,390,532, this general mode of compressive engagement of wheel units on generally opposite sides of the pipeline may be effected with other arrangements, for example, an arrangement which would provide more or less triangularly oriented, cross-sectional support for the pipeline portion 4a. In this triangular arrangement, the frame 21 may support two horizontally displaced, and mirror image related, rows of inclined and mutually converging, wheel units, with the axis of rotation of the wheel units 26 in one row being parallel but inclined downwardly in one direction toward the vertical longitudinal median plane of the pipeline portion 4a, and with the wheel units 26 in the other row bearing a mirror image relationship to the wheel units of the one row.

An hydraulic motor 29 serves to impart torque, through a drive chain connection 29a, to a principal drive shaft 29b, carried by frame 20. A chain transmission network 30 serves to transmit torque from the shaft 29b, in series relationship, to the various wheel units 23 carried by the frame 20.

Similarly, an hydraulic motor 31 serves to transmit torque through a drive chain connection 32 to a drive shaft 33 which is carried by the frame 21. A drive chain network 34 serves to transmit torque, in series fashion, to the various wheel units 26.

As is described in detail in the aforesaid Lawrence patent, the circuitry of the hydraulic motors 29 and 31 in such as to permit the motors to "back-turn" while the pipeline is being paid out (or while the vessel is moving ahead relative to the submerged pipeline portion). During this "back-turning" of the motor units, the motors function as pumps but continue to bias or apply tension to the pipeline portion 4a.

As is also described in the aforesaid Lawrence U.S. Pat. No. 3,390,532, the hydraulic circuitry of the motor units 29 and 31 is such as to enable these units to impart torque to the wheel units 23 and 26 even while there is no relative movement between the lay barge 11 and the pipeline.

As will also be apparent, the longitudinal distribution of tension force may also be effected through an equivalent arrangement, wherein each individual pair of wheel units 23 and 26 is driven by a separate hydraulic motor. If desired, the motors associated with wheel units 23 may be connected in hydraulic series relation, as may be the motors associated with wheel units 26.

The torque level of the motor units 29 and 31 may be selectively adjusted so as to cause the wheel units 23 and 26 to apply the desired level of tension to the pipeline 4. As will be appreciated, this tension is transmitted to the pipelines by torquing the wheel units 23 and 26 in such a direction that the generally radially peripheral portions of the wheels and the units 23 and 26, which are engaged with the pipeline periphery, tend to move away from the submerged pipeline portion 3, i.e. generally forwardly in the direction of pipelaying.

As is also apparent, the wheel units 23 and 26 cooperates to define a generally straight pipeline support, extending generally longitudinally of the central axis X of the pipeline portion 4a.

As will be further appreciated with reference to FIG. 1, forward movement of the lay barge 11, and the paying out or feeding of the pipeline segments toward the submerged surface 2, may be effected without adjusting the thrust level of the propulsion units 6, by merely reducing the tension level of unit 18, with clamp 19 disengaged, to the point where the resultant force generated by the tensioner 18, directed longitudinally of the axis X in the direction of pipelaying, is of such a level or magnitude as to be less than the forward thrust of propulsion units 6. As is also apparent, feeding of pipeline segments might also less advantageously be effected by causing the thrust effect of propulsion units 6 to exceed the combined tensioning or holding effects of tensioning means 18–19, without reducing the tension level of unit 18.

The tension, (i.e. longitudinally directed force) exerted by the wheel-type tensioning mechanism 18 on the pipeline portion 4a will be a function of the pressure of hydraulic fluid operating the hydraulic motors 29 and 31. Thus, through conventional calibration techniques, the pressure of hydraulic fluid supplied to the hydraulic motors 29 and 31, in the manner generally indicated in the aforesaid Lawrence U.S. Pat. No. 3,390,532, will indicate the level of tension or longitudinal force transmitted from the lay vessel 11, through the mechanism 18, to the portion 4a of the pipeline 1.

Thus, as shown in FIG. 4, a conventional pressure measuring gauge 36a is incorporated in a supply line S which serves to feed pressurized, hydraulic fluid, in parallel, in each of the motor assemblies 29 and 31.

SUMMARY OF PRINCIPAL DETAILS OF CLAMPING MECHANISM

Structural details of the clamping mechanism 19 are generally illustrated in FIGS. 5 and 6.

As shown in FIG. 5, clamping mechanism 19 comprises a gripping assembly 35 which may be mounted for limited, indeed often visually undetectable, movement in a stress indicating direction, extending longitudinally of the pipeline portion 4a on the ramp 17. Gripping assembly 35 is connected to a load cell 36b unit, by a force-transmitting connecting link 36c. Load cell 36b is fixedly secured to the ramp 17, aft of assembly 35. This load cell may comprise, for example, an hydraulic-type, load transducer. Obviously, however, a variety of other pneumatic, hydraulic, electrical or mechanical load cells may be employed.

Clamping mechanism 35 may comprise an articulated clamping mechanism.

In the arrangement shown in FIG. 5, load cell unit 36b would include a housing fixedly connected with the ramp 17. This housing would support a load cell, possibly of the type above-described, disposed in generally longitudinal, force sensing alignment with the tension transmitting member 36c. This load cell may be interposed between the force transmitting member 36c and the load cell housing, in substantially the same manner in which a load cell 88 is interposed between a load cell housing bracket 89 and the force transmitting member 93 of the FIG. 14 structure, subsequently described.

With this arrangement, force is transmitted generally longitudinally from the assembly 35 to the load cell unit 36b, with member 36c functioning as a compression-type, force transmitting member.

It will be recognized that load cell unit 36b, like other load cell units subsequently described, may have to be appropriately calibrated to provide a desired indication of the force vector sought to be detected.

As will also be apparent, load cell unit 36b could be located forward of assembly 35, i.e. between mechanism 19 and mechanism 18, with the load cell being arranged to permit member 36c to function as a force transmitting member acting in tension.

As shown in FIGS. 5 and 6, clamping assembly 35 includes laterally bifurcated, stern and bow facing, framing units 37 and 38. Three, arcuate, pipe clamps 39a, 39b and 39c are supported by, and disposed longitudinally intermediate, framing units 37 and 38.

Uppermost segment 39a is connected by bracket means 39d to detachably mounted pins 40a and 40b. Pins 40a and 40b are mounted on opposite sides of the bifurcated framing units 37 and 38, as generally shown in FIG. 6.

Each of the mounting pins 40a and 40b is disposed in a vertically elongate slot for limited, vertical movement. Thus, mounting pin 40a is disposed in slot means 40c and 40d on the starboard side of framing units 37 and 38, respectively, while pin 40b io disposed in mirror image related slot means on the port side of frame units 37 and 38.

Brackets 39e and 39f serve to pivotally mount the upper ends of clamp segments 39b and 39c, respectively, on mounting pins 40a and 40b, as indicated generally in FIGS. 5 and 6.

As shown generally in FIG. 6, bifurcated brackets 39g and 39h depend downwardly from the lower, free extremities of clamp segments 39b and 39c, respectively.

A screw block 39i is journaled in bracket means 39g for pivotal movement about a horizontal axis extending generally parallel to the vertical median plane of pipeline portion 4a, by way of shaft means 39j and 39k. Shaft means 39j extends in an aft direction, to pass through a vertical, cam slot 39y in framing unit 37. Stub shaft 39k extends, in a forward direction, to intersect a vertical cam slot 39m carried by framing unit 38. Cam slots 39g and 39m are parallel and mirror image related.

A threaded, adjusting rod 41 includes a portion 41a which passes threadably through a threaded aperture 39n of screw block 39i. Adjusting rod 41 extends from an electric or hydraulic motor unit 42, mounted on unit 38.

As shown in FIG. 6, threaded rod 41 also includes a portion 41b which threadably intersects a screw block 39o carried by bracket means 39h. Screw block 39o is carried by bracket means 39h and includes shaft means 39p intersecting cam slot means 39q. Screw block 39o, like block 39i, is mounted for pivotal movement about a horizontal axis extending generally parallel to the vertical median plane of pipeline portion 4a.

Screw block 39o, slot means 39q, and shaft means 39p correspond in identical, but mirror image related, fashion to components 39i, 39y–39m, and 39k–39j, respectively, with reference to the longitudinal median plane of the assembly 35 and pipeline portion 4a. However, portions 41a and 41b of shaft 41 are oppositely threaded and disposed in threaded engagement with the screw blocks 39i and 39o, respectively. With this arrangement, rotation of the shaft 41, induced by operation of a motor 42 drivingly connected with shaft 41, will induce either convergence or separation of the block means 39i and 39o, depending upon the direction of shaft rotation.

Where the shaft 41 is rotated to induce separation of the screw blocks 39i and 39o, the configuration of the cam tracks 39y, 39m, and 39q is such as to cause separation inducing rotation of the segments 39b and 39c, and elevating movement of the pivot pins 40a and 40b. This elevating movement results through configuring the slot means 39y, 39m and 39q so as not to be concentric with the pivot axes of the pivot pins 40a and 40b. By disposing the axes of curvature of these cam slot means in a zone generally intermediate the vertical planes passing through the axes of the pivot shafts 40a and 40b, the aforesaid raising of the shafts 40a and 40b, in response to separating movement of the screw blocks 39i and 39o, will be effected. This raising of shafts 40a and 40b is permitted by the vertically elongate character of mirror image related slots 40d and 40c.

Thus, by separating the screw blocks 39i and 39o, each of the segments 39a, 39b, and 39c will be caused to move generally outwardly of, and disengage from, the outer periphery of the pipeline portion 4a in response to separation of the segments 39b and 39c. As a result, during the unclamped condition of the assembly 35, when the segments 39a, 39b and 39c are separated from the outer periphery of the pipeline portion 4a, there will be no frictional interaction or dragging between the pipeline and any of the clamped segments.

As will be appreciated, of course, convergence of the blocks 39i and 39o will serve to simultaneously direct the segments 39a, 39b and 39c into clamped engagement with the exterior of the pipeline portion 4a.

The segments 39a, 39b and 39c may be provided, respectively, with generally cylindrical faces 39r, 39s and 39t, which are generally segmentally cylindrical in character and coaxially oriented with respect to the outer periphery of the pipeline portion 4a when clamped thereto.

The pipeline engaging faces 39r, 39s and 39t may be detachably mounted on the clamp segments 39a, 39b and 39c, respectively. Further, each of the pipeline engaging faces 39r, 39s and 39t may be fabricated so as to be somewhat resilient in character.

The frame units 37 and 38 may be mounted upon a base unit 43. Base unit 43 may be provided with appropriate, and conventional, elevating means. Thus, as shown in FIGS. 5 and 6, base 43 may comprise superposed segments 43a and 43b, interconnected by a plurality of generally vertically extensible and contractible, mechanically, electrically, or fluid operated jack units 43c. By operating the various jack units 43c in unison, the elevation of uppermost base portion 43a may be selectively adjusted so as to appropriately locate the elevation of the clamping segments 39a, 39b and 39c.

Such elevating means will serve to adjust the elevation of the framing units 37 and 38 so as to ensure coaxial engagement between the clamping segments and a pipeline, as pipelines of different diameter are handled. As will be appreciated, pipelines of different diameters may require different elevational positions of the framing units 37 and 38, and different radii for the pipeline engaging faces 39r, 39s and 39t, in order to ensure coaxial engagement between these faces and the pipeline periphery when the pipeline portion 4a is gripped by the mechanism 19.

To ensure substantially unimpeded transmission of force between the floating vessel means and the assembly 35, so that the load cell 36b will correctly indicate tension imparted by the assembly 35 to the pipeline portion 4a, the base 43 of the assembly 35 may be mounted upon one or more rail means 44 extending generally longitudinally of the pipeline portion 4a. As illustrated in FIG. 5, such rail means 44 may be mounted on the ramp 17.

In certain instances, it may be desirable to pass a portion of the pipeline, having a T-fitting or other protuberance, through the assembly 35. The passing of such a protuberance through the assembly 35 may be accomplished, for example, by removing the pin 40b, so as to permit the pivoting of the segment 39a, about the remaining pin 40a, to a position clear of the zone between the bifurcated, port and starboard extremities of the frame units 37 and 38.

Thus, as shown, pin 40b may be detachably secured to guide collars 40e and 40f, which guide collars are mounted in vertical slots 40c and 40d, respectively. By telescopingly separating the pin means 40b from the collars 40e and 40f, the segment 39a is freed to pivot in a clockwise direction, viewing the apparatus as shown in FIG. 6. Similar structure may be provided in connection with pin 40a.

The removal of the pin 40b may be facilitated by fabricating this pin from axially separable, but threadably interconnected, components. Obviously, pin 40a may be similarly manipulated to permit pivotal movement of segment 39a to clear the gap between port and starboard frame portions.

It will be recognized, of course, that the function of mechanism 19 may be performed with a wide variety of clamping and load sensing devices, including arrangements of the type described in the aforesaid Lawrence U.S. Pat. No. 3,472,034. In this connection, it will be recognized that assembly 35 may be viewed as comprising a platform from which the upper portion of the pipeline is gripped, with this platform being movable, possibly to a virtually undiscernible degree, to the extent necessary to reflect changes in force acting on the pipeline at this gripping mechanism.

It will also be apparent that a wide variety of clamping arrangements may be employed. For example, vertically reciprocable clamps may be employed, in lieu of the pivotal clamping members illustrated in FIGS. 5 and 6. It will also be recognized that fluid actuated, packer-type gripping members may be employed, such as, for example, those contemplated in the disclosure of a Delaruelle et al. U.S. Pat. No. 3,273,346.

TENSION MONITORING

It will here be apparent that the clamping mechanism 19, in combination with the load cell 36b, and the tensioner 18 in combination with pressure sensor 36a provides a system for indicating the level of tension transmitted from the vessel propulsion units 6 to the pipeline.

The reading of pressure sensor 36a will indicate the general level of tension being applied to the lay barge 11 by the pipeline portion 4a, through the wheel-type tensioner 18. The reading of load cell 36b will indicate the general level of tension being applied by the barge 11, through the clamping mechanism 19, to this pipeline portion 4a.

Thus, the summation of the pipeline tension indications of sensor 36a and load cell 36b will indicate the total level of tension being imparted from the vessel 11 to the pipeline portion 4a.

The level of tensioning exerted by the mechanism 18 will essentially comprise a calibrated function of the pressure of fluids supplied to the torquing motors 31 and 29. By monitoring the pressure level of this fluid via pressure sensor 36a, and by observing changes in tension force reflected by the operation of the load cell 36b, and operator or control system will be able to effectively monitor the overall tension being applied to the pipeline.

As will be appreciated, the pressure readings of pressure sensor 36a and of the load cell 36b will be analog in nature, and may be both added and converted by conventional hydraulic-electrical transducer means to an appropriate electrical signal indicative of tension level or changes in tension acting on the pipeline portion 4a.

COMPOSITE MODE OF OPERATION OF WHEEL-TYPE TENSION MECHANISM 18 AND CLAMPING MECHANISM 19 FOR PIPE FEEDING OPERATION

It is contemplated that the wheel-type tensioner 18 and the clamping mechanism 19 may be employed in a unique, interacting fashion for the purpose of pipe feeding.

For example, assume that at a particular point in time the assembly 35 is clampingly engaged with the pipeline portion 4a. In his clamped mode, the mechanism 19 is transmitting a tension level, say on the order of 15,000 pounds, to the pipeline portion 4a, while the wheel-type tensioner 18 is transmitting tension, for example, on the order of 30,000 pounds, to the pipeline portion 4a. Thus, the mechanisms 18 and 19 are together imparting 45,000 pounds of tension to the pipeline portion 4a.

Under these circumstances, it is contemplated that the operator, or control system would increase the tension being imparted by the mechanism 18 to the pipeline portion 4a, to the total 45,000 pound level. This increase in tension imparted by the mechanism 18 would inherently reduce the level of tension being imparted by the clamping unit 19 to the pipeline to "zero," assuming, of course, that there was no change in thrust being imparted to the lay vessel 11 by the propulsion units 6 and no change in environmental conditions.

With the clamp tension reduced to "zero," the assembly 35 may be manipulated to separate the segments 39a, 39b and 39c from the periphery of the pipeline portion 4a, so as to effectively unclamp the pipeline. This unclamping, of course, would have no effect on the 45,000 pound tension being imparted by the wheel-type unit 18 to the pipeline portion 4a. With all of the tension load being carried by the wheel-type tensioning unit 18, the unclamping may be effected with safety and without fear of engendering dangerous pipeline releasing forces.

With the clamping mechanism 19 disposed in its unclamped mode, an operator or control system may then reduce the pressure of fluid being supplied to the motor units 29 and 31 so as to substantially reduce the tension imparted from the wheel-type unit 18 to the pipeline portion 4a. This reduction in pressure will serve to reduce the level of tension being imparted by the vessel 11, through the unit 18, to the pipeline portion 4a, to a substantially lower level, for example, on the order of 30,000 pounds. As a consequence of this reduction in tension, the pipeline 1 will "pay out," i.e. segments of the pipeline portion 4a will tend to slidably move relative to the vessel means 11, from the portion 4a toward the submerged and suspended portion 3b. It will be recalled here that the portions 4a, 3b and 3a are considered as pipeline zones which translate along the course of pipeline laying. In describing pipelaying in this fashion, it will be recognized that laying is effected by movement of pipeline segments from one "zone" to another.

The feeding of pipeline segments will, of course, be accompanied by forward movement of the vessel means 5, since the vessel propulsion units are maintaining the forward thrust applied to balance the high tension level applied while clamp 19 is grippingly engaged with the pipeline. However, such forward movement of the vessel means may lag somewhat behind the segment feeding due to vessel inertia.

Thus, with this technique, the "paying out" or feeding of pipeline segments may be effected smoothly and rapidly, without relying upon an increase in thrust effect by the vessel propulsion units associated with the lay vessel 11. Thus, the problems of erratic vessel movement and the impedance to vessel acceleration or movement because of vessel inertia are substantially avoided.

By observing the free end of the pipeline on the ramp 17, an operator or a control system can determine when sufficient pipeline paying out has occurred and raise the level of tension imparted from the tensioner unit 18 to the pipeline 4a, so as to stop relative movement between the pipeline segments and the ramp 17. Depending upon operating conditions, this increase in tension imparted by the unit 18 to the pipeline portion 4a, sufficient to stop the movement of pipeline segments, may be somewhat less than or even somewhat greater than the aforementioned, exemplary tension level of 45,000 pounds at which the overall system was in a condition of overall balance, i.e. with the tension system 18–19 balanced by the forward thrust effect of units 6 and generally no forward movement of vessel 11 relative to pipeline 1 occurring.

From a theoretical standpoint, it may be assumed that the stopping of movement of pipeline segments is effected by raising the tension level of the wheel-type tension unit 18 to 45,000 pounds. With the static tension level thus reachieved, the mechanism 19 is reclamped to the pipeline portion 4a, i.e. the segments 39a, 39b and 39c are again clampingly engaged with the periphery of the pipeline portion 4a.

After the mechanism 19 has again been clampingly engaged with the pipeline portion 4a, i.e. after the pipeline segment feeding step, the pressure of fluid supplied to the motor units 29 and 31 may be reduced, for example, to a lower level so as to reduce the tension imparted from the wheel unit 18, to the pipeline portion 4a, to a lower level, for example, on the order, again, of about 30,000 pounds. When the effective imparted tension of the wheel unit 18 is thus reduced, the clamping mechanism 19 will again increase its effectively imparted tension level to 15,000 pounds tension, so as to maintain the total tension imparted by the coacting units 18 and 19 at the 45,000 pound level.

By reducing the imparted tension level of the wheel unit 18, so as to provide a positive level of imparted tension attributable to the clamping mechanism 19, the operation of the load cell 36b is facilitated. With the clamp 19 applying a positive level of tension, a "single-acting" load cell 36b may be employed to indicate changes in total tension imparted to the pipeline portion 4a, i.e. both reductions and increase in tension imparted by the clamping unit 19 may be observed as positive pressure readings such that a negative, pressure sensing system in unit 36b need not be provided.

It is contemplated that in the previous example the total tension level of 45,000 pounds is balanced by the thrust effect of the vessel propulsion units associated with the barge 11 so as to provide an overall "static" condition, i.e. a condition where no relative movement is occurring between pipeline segments and the ramp 17, and where the vessel 11 is substantially stationary, i.e. moving neither forward nor rearward with respect to the previously laid pipeline portion 3a.

SUMMARY OF PRINCIPAL COMPONENTS OF HITCH MECHANISM

Principal components of the hitch mechanism 16 are illustrated in FIG. 7.

As shown in FIG. 7, the stern wall portion 45 of the lay barge 11 is provided with a pair of vertically extending and laterally spaced recesses or channels 46 and 47. These channels are defined by bulkheads or wall members of the vessel which extend substantially forward of the stern wall 45, into the interior of the vessel hull.

A vertically adjustable hitch assembly 48 is provided with a pair of vertically extending, and laterally spaced mounting webs 49 and 50 which extend longitudinally, and substantially entirely through the body of the unit 48. Mounting webs 49 and 50 are telescopingly received in the upper ends of the recesses 46 and 47. Downward movement of the web members 49 and 50 through the recesses 46 and 47 is controlled or guided by the constraining influence of laterally directed guide webs 51 and 52. These guide webs 51 and 52, carried by the unit 48, are slidably received in the trackways 53 and 54, respectively, mounted on the stern wall 45.

The unit 48 is moved downwardly relatively to the stern wall 45 until it is positioned at the desired elevation with respect to the recesses 46 and 47. Motor actuated locking pins (not shown in FIG. 7) mounted within the hull 55 of the lay barge 11, are then extended through aligned apertures 56 of web means 49 and apertures 57 of recesses 46. At the same time, other locking pins are projected through aligned aperture means 58 and 59 of web means 50 and recess 47, respectively, so as to secure the unit 48 at its desired elevational position.

With the hitch unit 48 thus secured, the uppermost extremity 60 of the stinger 12 may then be connected with the now stabilized hitch unit 48. This pivotal interconnection is effected by manipulating a cross bar 61, carried by the stinger segment 60, into cradled engagement with laterally spaced recesses 62 and 63 formed in the hitch unit 48. The manipulation of the upper end 60 of the stinger 12, as well as the manipulation of the hitch unit 48, may be effected by a crane unit carried or mounted on the deck of the lay vessel 11.

Relative pivotal movement between the stinger segment 60 and the pivotally united hitch 48 and barge hull 55 is facilitated by providing longitudinally extending slots 64 and 65 which receive web means 66 and 67, which web means 66 and 67 support the cross bar 61. These slots 64 and 65 accommodate arcuate movement of the webs 66 and 67 in a vertical plane, in response to pivoting of the stinger segment 60 relative to the hitch unit 48. Other web units 66a, 66b, 66c, and 66d, supporting the cross bar 61, are disposed in lateral stabilizing positions on opposite lateral sides of boss-means 68 and 69, which boss-means provide the slots 64 and 65.

The overall mode of engagement between an articulated stinger and pipelaying barge is described in detail in the aforesaid Lochridge et al. U.S. Pat. No. 3,538,712, the disclosure of which is herein included by reference. The general mode of engagement between the upper end of the stinger and the hitch unit 48 also corresponds in general to the arrangement described in the aforesaid Lawrence U.S. Pat. No. 3,390,532.

As is described in this Lawrence U.S. Pat. No. 3,390,532, hydraulically actuated hook means 70 may be provided in unit 48 to secure the stinger segment 60 in locked, but pivotal engagement, with the hitch unit 48. These securing hooks 70 are mounted for pivotal movement about a generally horizontal pivot axis so as to be able to pivot, toward the front of the pipelaying vessel, and "open" the cradle recesses 62 and 63. After the cross bar 61 has been received by these cradle recesses 62 and 63, the hook means 70 may be pivoted toward the stinger assembly 12, so as to be disposed in a locking position and extend over the tops of the cross bar 61, in the manner generally described in the aforesaid Lawrence U.S. Pat. No. 3,390,532.

With the hook means thus disposed in a stinger locking position, the stinger 12 is securely connected to the stern of the lay vessel 11 for pivotal movement, in a generally vertical direction, about a generally horizontal pivot axis. However, the cradling of the cross bar 61 by the hitch unit 48 substantially impedes or prevents lateral swinging movement of the stinger 12 in a horizontal direction relative to the lay vessel 11.

Thus, in a sense the stinger 12 may be considered as defining a vertically articulated extension of the lay vessel 11 which retains the lateral structural rigidity of the lay vessel, giving due consideration to the normal lateral flexibility of an elongate structure.

SUMMARY OF STRUCTURAL DETAILS OF STINGER AND CONNECTIONS BETWEEN STINGER SEGMENTS

FIGS. 8 and 9 illustrate the manner in which longitudinally contiguous segments 13 of the buoyant ramp, or pontoon-like stinger 12 are pivotally interconnected for selectively adjustable changes in mutual inclination.

Exemplary, longitudinally adjacent stinger segments 13b and 13c, shown in FIG. 8, are each fabricated in essentially the same way.

Each stinger segment comprises a pair of vertically superposed, and generally parallel pontoon segments 71 and 72 disposed on the starboard side of stinger 12 and another pair of superposed, parallel pontoon segments 73 and 74 disposed on the port side.

All of the segments 71 through 74 are generally cylindrical in character, are fully enclosed so as to define buoyancy chambers, and are disposed with their cylindrical axes more or less parallel. The upper and lower segments 71 and 72 are interconnected by cylindrical columns 75, while similar cylindrical columns 76 interconnect the pontoon segments 73 and 74. Horizontally extending cylindrical columns 77 interconnect the lower parallel pontoon segments 72 and 74, in fluid communication relation.

The buoyancy of each segment 13c and 13b, like the buoyancy of all the segments in the stinger 12, may be selectively adjustable. A valving system for controlling ballasting, and therefore buoyancy of each stinger segment, may correspond in general to the ballast control concepts described in the aforesaid Hauber et al. U.S. Pat. No. 3,280,571, the aforesaid Lawrence U.S. Pat. No. 3,390,532 and the aforesaid Rochelle et al. U.S. Pat. No. 3,507,126.

Several variations in ballasting control may be employed. For example, each segment 13 of the pontoon-like stinger 12 may be divided transversely to provide a plurality of longitudinally displaced compartments, each comprising a portion of pontoon segments 71, 72, 73 and 74, with these isolated portions of pontoon segments being interconnected by column means 75, 76 and 77. The buoyancy of each such isolated compartment may be adjusted by remote control means from the vessel 11 in the manner generally described in the aforesaid Rochelle et al. U.S. Pat. No. 3,507,126 and the aforesaid Lawrence and Hauber et al. U.S. Pat. Nos. 3,390,532 and 3,280,571. Alternatively, diver controlled valves may be employed for buoyancy control purposes. With either arrangement, cross-connecting conduits 77 provide buoyancy ballasting on the port and starboard stinger sides.

It would also be possible for buoyancy control to be confined for example to the lower pair of pontoon units 72 and 74, with the upper units 71 and 73 comprising floats of constant buoyancy.

Further, and generally consistent with the disclosures of the Lawrence U.S. Pat. No. 3,390,532 and Rochelle et al. U.S. Pat. No. 3,507,126, the buoyant pontoons 71 and 73 could be provided with a buoyancy control network independent of another buoyancy control network associated with the lower pontoons 72 and 74. It should be noted, however, that even with this arrangement the balancing of buoyancy on the port and starboard sides of the stinger 12 is effected by the communication provided between the lower pontoon segments 72 and 74 through the generally horizontally extending and pontoon-side-interconnecting, cylindrical strut members 77.

The buoyancy exerted by the various segments 13 of the stinger 12 is adjusted to ensure the desired lifting effect of the stinger 12, along the entire length of the pipeline portion which overlies and is supported by the stinger.

In this connection, it will be appreciated that proper conforming engagement between the pipeline and stinger, in the vicinity of the upper extremity of the stinger, is facilitated by appropriately adjusting the elevation of the hitch unit 48. As will also be recognized, this conforming engagement may be facilitated or altogether implemented by adjusting the elevation of pipeline supporting units on ramp 17, particularly in the stern of vessel 11, as generally described in the aforesaid Lawrence U.S. Pat. No. 3,390,532.

Obviously, the buoyancy of the various stinger segments should be such as to ensure the maintenance of the desired lifting or holding effect on the underside of the pipeline, recognizing that the vertical component of buoyancy along the stinger-supported part of the pipeline may be selectively varied in accordance with the configuration requirements of the pipeline being laid.

Articulation or vertical pivotal movement between adjacent stinger segments, such as the stinger segment 13c and 13b, is effected by hinge means 14 and jack means 15 which substantially correspond to generally equivalent units described in detail in the aforesaid Rochelle et al. U.S. Pat. No. 3,507,126.

One such hinge unit 78 of hinge means 14, interconnecting the port side of the segments 13b and 13c, is disposed between the upper and portside located pontoons 73 of the longitudinally adjacent stinger segments 13c and 13b. A horizontally displaced, and mirror image related, hinge unit 79 interconnects the starboard-side pontoons 71 of the segments 13b and 13c. The horizontal pivot axis of the hinge units 78 and 79 are coaxially aligned.

A screw jack means 80, defining jack means 15, is interposed between longitudinally adjacent lower end portions 77a and 77b of segments 13c and 13b, respectively. A pivot joint 81, having a horizontal pivotal axis, pivotally connects jack means 80 to end portion 77a, while another pivot unit 82 (FIG. 9), having a horizontal pivot axis parallel to the pivot axes of pivot joint 81 and hinges 78 and 79, pivotally interconnects the jack means 80 with the end portion 77b.

By selectively extending or contracting the jack means 80, the angle of inclination between the segments 13b and 13c may be adjusted. The mechanical nature of the screw jack means is such that once the inclination between the segments is adjusted, the segments will be substantially "locked" or fixed in a position of desired mutual inclination.

The operation of the screw jack means 80 may be effected, under water, by divers employing a conventional underwater tool 83. This tool would be engageable with a rotary operating shaft 84 of the screw jack means.

Underwater tools 83 suitable for imparting torque to the jack operating shaft 84 are exemplified by impact wrenches suitable for underwater use.

Alternatively, the jacks interposed between each pair of adjacent segments 13 of the stinger 12 may be operated remotely through hydraulic or pneumatic means controlled from the lay barge 11.

As shown in FIG. 8, the segments 13b and 13c are provided with screw jack means 80 comprising a pair of inclination adjusting jack assemblies 80a and 80b.

Jack assembly 80a is located on the starboard side of the stinger and is generally interposed between the pontoon segments 72 of the segments 13b and 13c. The port side located jack assembly 80b is located generally longitudinally between the pontoon segments 74 of the stinger segments 13b and 13c.

In order not to obstruct the illustration of structure of the pivot sections between the stinger segments and allocation of the jack assemblies, FIG. 8 is presented in a fragmentary format, deleting the pipeline supporting roller assemblies incorporated in the stinger in the manner generally contemplated in the aforementioned Rochelle et al. U.S. Pat. No. 3,507,126 in the aforesaid Lawrence U.S. Pat. No. 3,390,532, and in the aforesaid Hauber et al. U.S. Pat. No. 3,280,571.

As shown in FIG. 8, the jacking units 80a and 80b are mounted between the segments 13b and 13c so as to be at the same general elevation and so as to be disposed in a mirror image relationship with respect to the vertical longitudinal median plane of the segments 13b and 13c.

An operating shaft 80c and 80d of the jack units 80a and 80b, respectively, may be interconnected by a force transmitting drive shaft 80e. With this arrangement, the torque wrench 83 may be engaged with an externally projecting drive coupling 84 of either the jack assembly 80a or 80b and operated so as to induce simultaneous and parallel actuation of the two jack units 80a and 80b.

Because of the varied nature of pipelaying operations, adjacent stinger segments should be able to be hinged either upwardly or downwardly. In order to ensure a proper range of downward articulation, resulting from contraction of the screw jack 80, the pontoon segments 72 and 74 may be recessed longitudinally, with respect to the longitudinal extremities of the upper pontoon segments 71 and 73, as shown generally in FIG. 9.

As is shown in FIG. 10, the cross members 77 may serve to support longitudinally aligned and longitudinally spaced, pipe cradling roller assemblies 85. These roller assemblies are described, for example, in the aforesaid Rochelle et al. U.S. Pat. No. 3,507,126 and in the aforesaid Lawrence U.S. Pat. No. 3,390,532. These roller assemblies preferably support pipeline 1, with the pipeline centerline disposed beneath the center of buoyancy of segments 71 and 73.

The roller assemblies 85, along with pipe cradling roller assemblies mounted on the ramp 17 of lay barge 11, serve to support the underside of the pipeline, while imposing impedance to pipeline lateral movement, and while stabilizing the pipeline during the laying operation as pipe segments move downwardly from the lay barge, over the stinger 12, and toward the ocean surface 2.

Each jack unit shown in FIG. 8 may be provided with means for limiting the contracting movement jack means 80. Thus, as shown in FIG. 8, the starboard jack unit 80a comprises a housing 80g, enclosing a screw-type, shaft actuator. Housing 80g is connected by pivot means 81 to the stinger segment end 77a. A hollow sleeve 80h projects longitudinally from housing 80g, toward stinger segment end 77b. A collar or abutment 80i is mounted on the end of sleeve 80h. An operating shaft or rod 80j is telescoping mounted within sleeve 80h, and is reciprocably operated by the screw jack drive means within housing 80g. This screw jack drive means is conventional in nature and described, for example, in the aforesaid Rochelle et al. U.S. Pat. No. 3,507,126, the disclosure of which is herein incorporated by reference.

Shaft 80j is connected by pivot means 82 to stinger segment end 77b. As shown in FIG. 8, a stop collar or abutment 80k is mounted on shaft 80j generally adjacent the pivot means 82. With this arrangement, contractual operation of the jack 80a is limited, to the extend permitted by contraction of the shaft 80j, within sleeve 80h, sufficient to bring abutment 80k into engagement with abutment 80i. With this abutment arrangement, a diver can be assured that he has not incurred excessive pivotal movement between stinger segments so as to cause excessive pipeline flexure. In other words, collars 80i and 80k function to indicate the maximum permissible degree of stinger segment hinging.

This discussion with respect to the structure of each jack 80a is, of course, equally applicable with respect to the structure and mode of operation of each jack 80b of each jack means 80 and the overall jack means 15.

SUMMARY OF PRINCIPAL DETAILS OF STINGER LOAD SENSING SYSTEM

FIGS. 10 through 14 illustrate a representative system which may be employed to measure the forces interacting between the outermost (i.e. lowermost) stinger segment 13a and the pipeline portion 3.

VERTICAL INTERACTION

The segment 13a is provided with a plurality (in this case two) longitudinally displaced, vertical load sensing units 86 and 87 which are associated with longitudinally spaced pipe cradling, roller units 85a and 85b. The two vertical load sensing units 86 and 87 are substantially identical and illustrated in FIGS. 10, 11 and 14.

Thus, for example, as shown in FIG. 14, load cell unit 86 comprises a load cell or transducer 88 which is fixedly attached on the top of a cross member 77c of pontoon segment 13a by a mounting bracket 89. Obviously, however, other load transducers of an hydraulic, pneumatic, mechanical or electrical nature may be employed. In lieu of hydraulic load cells electronic type load cells may be employed, suitably modified for underwater use.

A force transmitting U-shaped, bracket 90 comprising legs 90a and 90b and an end member 90c is pivotally mounted on horizontally extending shaft means. Thus, shaft 91a connects leg 90a to a bracket 89a while shaft 91b connects leg 90b to a bracket 89b. Bracket means 89a and 89b are connected to, and extend aft from, cross member 77d.

Force-transmitting bracket 90 has its end portion 90c disposed beneath, and in supporting engagement with, a bracket 92 which in turn supports roller unit 85a.

A downwardly facing, force transmitting face 93 of bracket 92 is disposed in force transmitting engagement with load cell 88 and is located vertically between this load cell and roller unit 85a.

Bracket 90 will pivot downwardly about coaxial shafts 91a and 91b in accordance with the pipeline load imposed through roller assembly 85a on bracket 92 and thus transmit an indication of this load to the load cell 88. This indication of load may be then relayed to an appropriate, monitoring or control station on the lay vessel 11 as an hydraulic, pneumatic, electrical, or mechanical signal.

By monitoring the operation of the load cells 88 associated with the load cell stations 86 and 87, an operator or control system on the lay vessel 11 may readily determine the condition of vertical load interaction between the pipeline and the lower or outermost stinger extremity. The term "vertical," as here used, is employed in a general sense encompassing the generally vertical vector involved in the normal or perpendicular interaction between the pipeline and load cell stations 86 and 87, even though this normal interaction itself is inclined relative to a vertical direction.

Thus, for example, when the load cell 88 at the load station 86 indicates that no pipeline load is being transmitted to this station, the operator or control system knows that the tension exerted on the pipeline is such as to hold the pipeline out of supporting engagement with the roller station 85a or that the stinger has dropped. An operator or control system, upon detecting that the pipeline was no longer being supported by the roller station 85a, would be forewarned of impending excessive separation between the stinger 12 and the pipeline.

The position of vertical load sensing unit 87 at station 85b may be such as to provide a device for indicating to an operator or control system that excessive vertical separation between the pipeline and stinger extremity has actually occurred.

In other words, low load level readings, or a "zero" level reading from load cell 88 at station 86 would indicate the initiation of separation between the pipeline and stinger, while similar readings from the forward located load sensing station 87 may indicate that excessive separation has occurred. Conversely, abnormally high pressure readings from load cell units 86 and 87 would indicate that excessive vertical interaction is occurring between the stinger 12 and pipeline portion 3.

It is thus apparent that the level of interacting normal force detected by the load cells 88 at stations 86 and 87 may be employed to advise an operator or control system whether or not the outer extremity of the stinger is providing the desired level of buoyant support in relation to the pipeline. Indications of abnormally high normal force may indicate excessive stinger buoyancy while abnormally low force indications may indicate insufficient stinger buoyancy. Such abnormal indications may also indicate an incorrect, stinger profile, in the vertical longitudinal median plane of the stinger.

It will also be appreciated that the vertical load cell units 86 and 87 play a significant role in evaluating whether or not the tension applied to the pipeline portion 4a is at the proper level.

In the event that the initially estimated tension level should prove to be erroneous, or in the event that current acting on the submerged pipeline is tending to either move the pipeline longitudinally away from or toward the stinger 12, the initially estimated tension level may have to be adjusted so as to maintain the desired conforming engagement between the stinger 12 and the pipeline portion 3. The operation of the load cell units 86 and 87 thus enable the operator or control system to monitor the interaction between the stinger and the pipeline and evaluate whether or not an acceptable level of tension is being applied.

In this connection, of course, an operator would have to take into consideration various factors in evaluating the readings of the load cell units 86 and 87. While the load cell units might well dictate a change in pipeline tension, these readings of load cell units 86 and 87 might alternatively merely indicate incorrect stinger profile or incorrect or inadequate stinger buoyancy. The evaluation of the factors may be facilitated by utilizing an automated, stinger profile and pivot position control system and stinger buoyancy control system, as subsequently described.

The monitoring of vertical interaction between the stinger 12 and the pipeline portion 3b may also be facilitated through the use of conventional inclinometers mounted on the outermost stinger segment 13a, or for that matter, on all of the stinger segments. One such representative inclinometer 94, mounted on pontoon 73 of segment 13a, is schematically shown in FIG. 10.

In lieu of inclinometers 94, the orientation of each stinger segment could be monitored through the use of plural depth gauges, distributed longitudinally along each stinger segment.

Regardless of how stinger segment orientation is monitored, the surveillance of this orientation will enable an operator to know whether or not the correct stinger profile and pivotal position exists. With this information, an operator or control system can utilize the operation of load cell units 86 and 87 to evaluate the effectiveness, or adequacy, of the level of tension being imparted to the pipeline by the pipeline supporting units 18 and/or 19. One manner in which this evaluation may be made is subsequently described in connection with a Stinger Control Automation system. It is also apparent, that operator experience will greatly facilitate, and indeed often govern, this evaluation.

Lateral Interaction

Stinger segment 13a also supports a pair of laterally spaced, side-load detecting load cell units 95 and 96, illustrated in FIGS. 10 through 13. Load cell units 95 and 96 are mounted at the outermost extremity of segment 13a of the stinger 12, so as to detect the lateral interaction between the pipeline and stinger at the location where the pipeline leaves the stinger.

Units 95 and 96 are substantially identical in structure, but are fabricated and positioned as mirror image related units as generally shown in FIG. 11.

Thus, representative load cell unit 95 comprises a pipe-engaging roller assembly 97 mounted on a bracket 98. Bracket 98 is pivotally supported on a shaft 99. This shaft 99 has a pivot axis which is generally perpendicular to a longitudinally and transversely extending generally median plane of the segment 13a.

Load cell unit 95 includes a load cell 100, substantially the same as load cell 88 previously described. Load cell 100 is fixedly mounted on a bracket 100a which in turn is fixedly secured to an upright framing means 75a of stinger segment 13a. As shown in FIGS. 11 and 12, shaft 99 is mounted on framing means 75a.

Pivoted bracket 98 includes a force transmitting portion 98a disposed in force-transmitting engagement with the load cell 100.

Thus, when the pipeline portion 3 is displaced to port, out of centered and properly cradled engagement with the segment 13a, the pipeline will engage the roller 97 of the port sensing cell 95. This engagement between the roller 97 and the pipeline will induce pivoting of the bracket 98 so as to transmit a signal to the load cell 100, indicative of the level of laterally or horizontally directed force interaction between the pipeline and the stinger segment 13a. This indication of laterally transmitting load, yielded by the load cell 100, will provide an operator or control system with an indication of the degree of horizontally directed interaction between the vessel means 5 (lay vessel 11 and stinger 12) and the pipeline.

Obviously, lateral force interaction between the pipeline and stinger, if of a sufficient magnitude, will induce excessive lateral bending or stress in the pipeline and must be avoided.

Details and Variations in Interaction Monitoring

It will be recognized that composite force measuring assemblies may be employed in lieu of the separately functioning, vertical load cell units 86 and 87 and lateral load cell units 95 and 96.

It is apparent, for example, that the V-shaped roller assemblies 85, at the stations 86 and 87, may be provided with force monitoring load cells operable to resolve the force interacting between the pipeline and the roller assemblies into a lateral component extending generally horizontally and perpendicular to the longitudinal vertical median plane of the stinger and a normal or "vertical" component extending generally upwardly from the roller assembly, and perpendicular to the longitudinal or median axis of the pipeline portion supported by the stinger assembly 12. It will be here recognized that from the standpoint of this resolution, at the location of the roller assembly 85, the central pipeline axis may be considered as being substantially straight.

In order to prevent excessive pivotal movement of the pivotable brackets in the various load cell units, suitable restraining brackets or lugs may be employed to permit limited pivotal movement only of these brackets.

Overall condition monitoring may be further enhanced by providing vertical and lateral force detecting load cells on several, if not all, of the stinger segments 13.

Further, the lowermost stinger segment 13a may be provided with arcuate pipeline bending "shoes" disposed on each side of the pipeline and diverging laterally, in an aft direction. Such bending shoes would serve to constrain pipeline bending to arcs of controlled curvature, where the pipeline leaves the stinger lower end.

SUMMARY OF NATURE OF VESSEL PROPULSION SYSTEM

In order to facilitate the rotation of the lay vessel 11 about a vertical axis, in order to facilitate lateral movement of the lay vessel as desired, and in order to minimize the tendency for the lay vessel to "roll" when oriented transversely to the direction of waves, the vessel 11 may be designed so as to have a generally flat hull.

During offshore operations in deep waters where winch operated anchors are not effective as vessel propulsion means, it is necessary to provide thrust generating vessel propulsion units mounted on the hull.

FIG. 15 schematically illustrates a preferred disposition of engine units.

As shown in FIG. 15, the vessel hull 55 is provided, on its underside, with six individual vessel propulsion units 101, 102, 103, 104, 105, and 106.

Each of the six propulsion units 101 through 106 may comprise, for example, a 1,500 horsepower, right angle thruster unit of the type previously described. Each such thruster unit is mounted for rotary movement about a generally vertical axis, such as the axis 107 (FIG. 1) of the forward, starboard thrust unit 102. Thruster unit 102, as is schematically shown in FIG. 1, includes a thrust generating component 108, directed at right angles to the turning axis 107.

Thus, with this arrangement, the thrust effect of each individual propulsion unit may be adjusted both as to azimuth and thrust level. Similar changes in thrust effect, may be implemented where cycloidal-type propulsion units are employed.

The arrangement of engines schematically illustrated in FIG. 15 is believed to be particularly desirable. In this arrangement the forward, starboard and port engines 102 and 101, respectively, are disposed toward the bow of the lay vessel 11. The sternmost, starboard and port thruster units 106 and 105 are located quite close to the stern 45 of the lay vessel 11. Intermediate, starboard thruster unit 104 is disposed in fairly close proximity to thruster unit 106, generally intermediate the units 102 and 106. Intermediate, port thruster unit 103 is similarly disposed between thruster units 101 and 105.

In the engine layout arrangement shown in FIG. 15, port side located engines 101, 103 and 105 are generally aligned with the plane extending parallel to the median longitudinal plane of the lay vessel 11. However, as shown in FIG. 15 on the starboard bank of engines 102, 104 and 106, the engines 104 and 106 are somewhat closer to the median plane P than is the bow located engine 102. This "in-setting" of the stern engines 104 and 106 may be necessitated because of the position of the pipelaying ramp and the location of pipelaying equipment on the starboard side of the vessel 11, in the stern area of vessel 11.

Thruster units 101 and 102 are generally aligned with a vertical plane extending perpendicular to the longitudinal vertical median plane of the lay vessel 11. Similarly, thruster units 103 and 104 are disposed in general mirror image relationship with respect to this vertical longitudinal median plane, as are aft thruster units 105 and 106.

The "bunching" of thruster units 103, 104, 105 and 106 in the stern of the lay barge provides optimum thrusting capability in the area where movement of the lay barge is impeded by the apertaining stinger 12 and pipeline.

MONITORING OF VESSEL POSITION

FIG. 1 schematically depicts a navigation system which may be employed to monitor the position of the lay vessel 11 with unique accuracy.

A number of orbiting satellites are now available which may be used as reference points for navigation purposes. Thus, when an orbiting satellite 116 is disposed in proper proximity in relation to the lay vessel 11, a signal received from or reflected from the satellite 116 may be employed to relatively accurately "fix" or determine the absolute position of the lay vessel 11.

Satellite aided navigation systems are now well recognized and described for example in an operator's manual dated September 1968, entitled "Satellite Doppler Navigation System, Model 4007AB" and published by ITT Aerospace, 15151 Bledsoe Street, San Fernando, California. Other discussions and descriptions of satellite aided navigation concepts, including references to necessary equipment components and indicating available sources of such equipment, including a paper presented at the 24th Annual Meeting of the Institute of Navigation at the United States Naval Postgraduate School, Monterey, California, between 19 and 21 June, 1968, by Joseph Chernof and entitled "Application of Satellite Navigation Techniques to Marine and Air Navigation." Satellite navigation is also discussed in an article entitled "Commercial Navigation Enters Space Age" commencing at page 41 of the July 1068 issue of Offshore Magazine.

A United States Navy Navigation Satellite System which may be utilized consists of a constellation of four or more satellites, each in a polar orbit at an altitude of approximately 600 nautical miles. The period of each satellite is about 108 minutes. The four satellites will provide position "fixes" on the average of 79 minutes at the equator and 36 minutes at 60° latitude.

Position fixes are provided whenever the satellite is visible to the operator or within range of a receiver on the vessel 11. The satellite transmits a 2-minute data package simultaneously on 150 MHz and 400 MHz. Each 2-minute transmission by the satellite contains predicted ephemeris (table of satellite position data) which permits the operator, or control system to compute the position of the satellite. A minimum of three computed satellite positions, along with the accumulated doppler shift signals measured over the same three 2-minute intervals provides data for making a unique solution for the vessel location. The accuracy of this measurement is 0.1 of a mile. Accuracy can be improved by using the maximum number of measurements per pass. By utilizing digital averaging techniques, accuracy to ±250' can be obtained.

Alternating with, i.e. in between, the fixing of vessel position by reference to the orbiting satellite, the position of the vessel, previously determined by satellite fixes, may be carried forward or extrapolated by reference to a sonar beacon 117 which is fixedly positioned on the submerged surface 2 at any particular time. The beacon 117 should be positioned ahead of the lay barge 11 in the general vicinity of the desired pipelaying course by an auxiliary vessel such as a service boat or tug.

The Sonar Beacon Navigation System may consist of a single battery powered, bottom-anchored sonar transmitter 117 and two vessel mounted hydrophones, i.e. receivers located at receiving station 141, schematically shown in FIG. 1. This system will measure the time for transmission of a "ping" from the transmitter of the beacon to each i.e. of the receivers. These times are proportional to the slant ranges between the transmitter and receivers. The horizontal range and azimuth to the beacon can then be calculated from the slant ranges, the fixed distances between each receiver and the vessel centerline, and the water depth of the transmitter.

The transmitter 117 and each of the receivers at receiving station 141 is equipped with a precision oscillator timer. By synchronizing the transmitter and receiver oscillators the "-start" transmission time can be determined at the receiver.

With the beacon 117 located on the submerged surface 2, a sonar signal generated from the beacon may be detected from the lay barge 11 by the two, horizontally spaced, signal receivers at station 141. Variations in the nature of the signals received by the receivers will thus provide an indication of changes in vessel position relative to the fixedly positioned submerged buoy.

It will be appreciated, of course, that when the beacon 117 is first positioned, the first sensing of the beacon signal will be employed to determine the position of the beacon 117 in relation to the vessel 11.

Subsequent readings of the signals obtained from the sonar beacon 117 will be employed to extrapolate the position of the lay barge forward with reference to the thus determined position of the beacon 117.

Navigation predicated upon a submerged sonar beacon is a technique now well recognized in the navigation art and fully described, for example, with reference to appropriate equipment in a paper presented in the 24th Annual Meeting of the Institute of Navigation held at the United States Naval Postgraduate School, Monterey, California, between 19 and 21 June 1968, authored by Gilbert Fain and entitled "A Bench Mark Navigation System for Surface and Subsurface Vessels." The references cited in this paper further elaborate on well known aspects of this navigation aid.

As pipelaying proceeds between satellite fixes, a service boat or tug may reposition the sonar beacon 117 further along the desired pipelaying course so as to enable the continued extrapolation of vessel position.

The repositioning of the sonar beacon 117 may be facilitated by a floating marker buoy 118 which is attached to the sonar beacon 117 by an attachment cable or line 119.

The unique utilization of the fixedly positioned navigation station 117 in an offshore location to "carry forward" satellite determined vessel positions, provides a vessel extrapolation system of considerably greater accuracy than those hitherto contemplated which involve conventional navigation techniques.

As will be appreciated, further accuracy in vessel positioning may be obtained by averaging the positions determined by individual satellite fixes.

Thus, for example, the extrapolated position of the vessel 11, based on previous satellite fixes and navigation from the sonar beacon, may be compared with an individual position determined from an individual satellite reading. The extrapolated vessel position, and the single, satellite determined, vessel position may be averaged on a conventional "weighted average" basis, and employed for computation purposes with a view to averaging out navigation error. Such averaging, or course, would continue throughout the pipelaying operation.

As will also be appreciated, navigation by reference to the sonar station 117 should be conducted with a plurality of sonar beacons. That is to say, while one sonar beacon is fixed in position on the submerged surface and being employed for position extrapolation, another beacon may be being moved to a forward location by a service boat. When the forward located sonar beacon is used for navigation extrapolation, the rearmost beacon may be "leap-frogged" into a new forward position by the service boat.

Where the pipelaying vessel is operating offshore, out of range from land base navigation systems, the composite satellite and sonar beacon navigation approach is believed to be particularly advantageous. However, it will be recognized that other navigation control aids may be utilized, including automatic pilot systems. It will further be recognized that where the pipelaying barge is operating within the range of land based, or offshore, fixed structure, navigation control stations, such navigation aids may be effectively employed to monitor actual vessel position.

CONDITION SENSING PROGRAM

As was previously indicated, the pressure sensor 36a in tensioner 18 and load cell 36b associated with the clamping mechanism 19 provide, in combination, first detecting means for detecting the level of tension imparted through the pipeline support means, i.e. the clamp 19 and tensioner 18, to the pipeline 3. This tension, of course, is a function of the forward thrust effect of the vessel propulsion units 101–106.

Lateral, horizontally directed interaction between the pipeline and the vessel means 5 is detected by second detecting means comprising the side load cell units 95 and 96.

Deviations in vessel position are detected by third detecting means which may comprise a composite, satellite and sonar beacon responsive system of the type previously discussed.

The orientation of stinger segments is monitored through the transmission of the stinger segment inclination signals, derived from the devices 94, to remote control and display units on the lay vessel 11.

Normal force or interaction between the pipeline and the stinger is obtained from the operation of the load cell units 86 and 87.

Thus, with reference to FIG. 16, an approach is provided for detecting certain exemplary deviations in desired force imposed on the pipeline and in the course of the pipelaying vessel.

Moment or Lateral Force Monitoring

As shown in FIG. 16, lay vessel 11 is disposed with the pipeline portion 3 exerting lateral force against the side-load detecting unit 96.

In order to correct this undesired situation, i.e. deviation from a condition where no lateral force is imparted on the pipeline by the stinger 12, the level of force detected by the unit 96 may be considered as a vector 110, bearing at least an empirically evaluated relation to the lateral, generally horizontally directed interaction between the stinger 12 and pipeline portion 3.

This interaction may be offset by imparting a counterclockwise movement to vessel, which movement tends to restore the vessel to a condition where no lateral force is acting between the pipeline and the stinger while causing minimal or essentially no lateral or longitudinal vessel displacement.

Tension Monitoring

The summation of tension readings or indications obtained from sensor 36a and load cell 36b will indicate total pipeline tension at zone 4a. This total may be compared with a desired tension level to indicate any deviation from the desired range of tension to be imparted from the vessel 11 to portion 4 of pipeline 1.

The FIG. 16 representation assumes a deficiency in applied tension represented by the vector 112. As will be apparent, this tension vector is directed longitudinally of, parallel to, and generally coplanar with, the vertical median plane of the pipeline portion 4. In the disclosed embodiment, this vertical median plane is generally parallel to the vertical longitudinal median plane of the lay barge and parallel to the direction of forward movement of the lay barge.

By way of example, consistent with the foregoing pipeline tensioning concepts, and as is shown in FIG, 21, during the welding or pipe lengthening operation, while the clamping means 19 is securing the pipeline portion 4 against movement relative to the vessel 11, tension is maintained at a high level, depicted as 45,000 pounds. At this level, the pipeline's tension is essentially balanced by the forward thrust of the vessel propulsion units so that essentially no forward or rearward movement of vessel 11 takes place. At point A, when feeding of the pipeline is to be initiated, the clamp has been released and the pipeline tension exerted by tensioner 18 begins to drop to a lower level, depicted as 30,000 pounds at area B. While the tension level is being reduced by tensioner 18, with the forward thrust of the vessel propulsion units remaining steady or unchanged, segments of the pipeline are fed from vessel 11 toward surface 2. At point c, the tensioner 18 increases the tension level to zone D, i.e. to about the original 45,000 pound level where segment feeding stops. The clamping mechanism 19 is then re-engaged, and additional segment welding operations are conducted.

With the tension level maintained at 45,000 pounds, the operator can be reasonably assured that the tension will not drop below the minimum desired level of 30,000 pounds in response to wave action acting on the vessel 11.

By monitoring the readings from sensor 36a and load cell 36b, an operator or control system may implement this variable tension control program. However, with a "single direction," reading load cell such as unit 36b, this approach assumes that, while clamping mechanism 19 is grippingly engaged with the pipeline, the tensioning level of tensioner 18 will not be raised beyond the level which existed in unit 18 at the time that clamp 19 was so engaged. This caution is necessary since a "single direction" reading load cell would not detect such a tension increase, such that the combined readings of units 36a–36b would be in error. Of course, if load cell 36b is of the "double-acting" type, operable to indicate force changes in opposite longitudinal directions, this operational consideration does not apply.

It will here be appreciated that the tension monitoring is especially significant at points in time where pipeline tension is entirely dependent upon the thrust effect of the vessel propulsion units, i.e., when clamping mechanism 19 is engaged with the pipeline and when it is possible to correct for tension deviations by adjusting the operation of the vessel propulsion units.

During pipe feeding operations, while the wheel type tensioning mechanism 18 is determining vessel tension, the level of applied tension will be at a reduced level. The tension level at any point during this operational phase will be determined by the operating pressure of the hydraulic motors 29 and 31 and may be regulated by conventional fluid pressure adjusting means.

Position Deviation Monitoring

FIG. 16 illustrates the vessel 11 at a location 113. This actual position is perpendicularly displaced from the desired course 114 by a distance 115. Thus, in order to restore the vessel 11 to the desired course 114, a corrective thrust vector should be applied to the vessel 11 to offset and tend to eliminate, the displacement increment 115. The level and direction of this corrective thrust vector will be determined in accordance with the desired rate of course restoration.

The actual vessel position 113 is detected by the foregoing satellite and sonar beacon buoy system. In the FIG. 16 example, the distance increment 115 is shown as being measured perpendicular to the vertical longitudinal plane P of the lay barge 11.

It should also be here appreciated that the course deviation distance 115, in FIG. 16, corresponds to the displacement of the vessel 11 from the course 114, measured perpendicular to this course, where the heading of the vessel is parallel to the desired course 114

Where the vessel heading is inclined relative to the desired course 114, for certain computative purposes it may be appropriate to consider the course deviation as a distance measured between the vessel and the course line 114 perpendicular to the course line 114, but not necessarily perpendicular to the longitudinal axis of the vessel 11.

Where the course deviation distance is computed on this basis, i.e., where the deviation 115 is not perpendicular to the longitudinal axis of the vessel and not perpendicular to the tension deviation vector 112, the course deviation correcting vector may be determined on a basis such that it has a forward directed, vector component, or a rearward component.

At this point, it should be recognized that in correcting for course deviations, the important thing is to monitor lateral displacement of the vessel relative to the desired course and tend to restore the vessel laterally to the desired course. The rate of restoration will be variable, depending upon several factors including the nature of the pipeline, the overall rate of pipelaying, schedule conditions, weather conditions, pipe stresses, etc.

Course deviation 115, consistent with any of the foregoing approaches, may be measured in several manners. Thus, if course 114 is plotted with respect to the desired location of the pipeline, the distance 115 would be measured between the course 114 and the actual location of the pipeline on the ramp 17. Of course, where course 114 is plotted with respect to the center or median plane of the vessel 11, the distance 115 would be measured from the course 114 to this median vessel plane P.

In many instances, it is believed preferable to determine the distance 115 on a basis measured perpendicular to the desired course 114. This mode of measurement provides optimum stability with respect to course deviation 115 in that the measurement of the deviation 115 is affected, to a minimized extent, by turning, pitching and rolling movement of the vessel 11 caused by environmental conditions.

Stinger Profile and Pivot Condition Monitoring

By knowing or estimating water depth, pipeline tension, and pipeline unit weight, pipeline stiffness, and possibly other parameters, an operator would be able to compute the desired configuration of the pipeline portion 3 and thus the desired profile configuration of the stinger 12. The operator would also know the desired lifting effect to be imparted through the buoyancy of stinger 12 to the pipeline portion 3, relying possibly on general buoyancy criteria discussed, for example, in the Lawrence U.S. Pat. No. 3,390,532.

The inclination readings of the inclinometer units 94 may be displayed so as to indicate the overall configuration, in profile and pivotal position relative to hitch 16, of the stinger 12. Should this profile and pivotal position deviate from the desired stinger profile and pivotal position, appropriate adjustments in inclination and positioning of the stinger segments may be effected by the operation of the stinger segment jack units 80 and/or the stinger ballast system.

The readings of the load cell units 86 and 87 will indicate whether or not the extremity of the stinger is disposed in proper supporting engagement with the pipeline portion 3. In the event that such supporting engagement is not present, an operator may (1) adjust the inclination of the terminal stinger segment 13a relative to the remainder of the stinger, or (2) adjust the inclination of several stinger segments, (3) in addition to or instead of effecting adjustments in stinger segment inclination, adjust the buoyancy of some or all of the stinger segments, or (4) adjust pipeline tension. The particular correction (or corrections) to be made may, to a substantial degree, be governed by operator experience and judgment

Mode of Condition Monitoring

It is contemplated that the calculation of propulsion unit thrust corrections in response to the monitoring of the tension deviation vector 112, the lateral interaction vector 110, and the position deviation distance 115 may advantageously be conducted in response to such monitoring which occurs while the clamping mechanism 19 is gripping the pipeline portion 4a.

By monitoring deviation conditions while the upper pipeline portion 4a is thus gripped by the clamping mechanism 19, maximum stability in deviation measurements should be able to be effected.

The advantage of this stability notwithstanding, it may also be desirable to monitor tension deviation, lateral interaction between the stinger and pipeline, and the vessel position deviation when the clamping mechanism 19 is released, and pipeline segments are being paid out and/or the pipelaying vessel 11 is moving forward. Such monitoring during the time when relative movement between the vessel 11 and pipeline is occurring may provide an enhanced degree of control and minimize the development of deviations. Under some circumstances, it would be feasible to determine propulsion unit thrust corrections in response to such monitoring.

DETERMINING OF THRUST CORRECTIONS

Tension Deviation Calculation

In order to correct for the tension deviation vector 112, it is necessary to impart an offsetting thrust vector 120 to the lay barge, applied in a direction generally opposite to the vector 112 as indicated generally in FIG. 16.

While tension deviation correcting, thrust vector 120 should be applied in a direction opposite to vector 112, it need not, and indeed probably will not have the same magnitude as the vector 112.

Consistent with conventional control theory, it is contemplated that the correction vector 120 may be computed so as to take into consideration three factors. These factors include the tension deviation 112 itself (as determined by the summation of the tension indication provided by sensor 36a and load cell 36b, compared with a predetermined, "desired" tension level), the estimated environmental bias acting on the lay barge 11 so as to produce a tension deviation, and the rate of tension deviation at the time the correction vector 120 is being computed.

The magnitude of the tension correcting thrust vector 120 may be represented by the symbol $\Delta T$, with the magnitude of the tension deviation vector 112 being represented by the symbol $e_t$.

It will be here assumed, for purposes of following mathematical treatment, that $\Delta T$ is equal to $T_n - T_1$ where $T_n$ is the desired magnitude of the total tension thrust component required at the time of a calculation, i.e. the net forward thrust effect of the vessel propulsion units, and where $T_1$ represents this total tension thrust component at the time of the preceding calculation.

$T_n$ may be computed so as to take into consideration the three factor criteria previously discussed, as expressed in the following equation:

$$T_n = A_1 e_t + A_2 \int e_t \, dt + A_3 (de_t/dt)$$

In this formula the symbols $A_1$, $A_2$ and $A_3$ denote empirically determined constants. The second factor of the equation, i.e. $A_2 \int e_t \, dt$ is an "integral" figure, involving in conventional integral calculus concepts, the summation of the product of tension deviation $(e_t)$ times a time "increment" $(dt)$ "averaged" by the constant $A_2$, to reflect an average environmental biasing condition tending to produce a tension deviation. It will here be appreciated that this integral factor will be computed for a time span, preceding and including the time of tension deviation sensing, with the constant $A_2$ reflecting this time span and reducing the integral term to an average, but continuing, tension error inducing bias.

The derivative factor, included in the third term of the equation, reflects the rate of tension deviation, with respect to time at the time of condition monitoring.

Each of the terms $T_n$ and $T_1$ may be computed as indicated above in connection with $T_n$ so as to take into consideration the magnitude of detected tension deviation, the estimated environmental bias tending to produce tension deviation, and the rate at which deviation is occurring at the time of condition monitoring. The constants $A_1$, $A_2$ and $A_3$ are derived on an empirical basis, predicated, possibly, upon conventional, system simulation techniques.

This solution approach thus is dynamic in nature taking into account existing error, average environmental or system bias, and the rate at which tension error is occurring at the time of condition sensing.

As will be apparent, the more or less continuous monitoring of the reading of the pressure sensor 36a and load cell 36b, albeit possibly on a cyclic basis, would enable $e_t$ to be plotted against time so as to facilitate the manual or computerized determination of the integral and derivative terms of the foregoing equation.

With $\Delta T$, i.e. the magnitude of vector 120, determined in previously discussed fashion, the correction vector 120 may be allocated to the various vessel propulsion units in several ways.

Conceivably, the vector 120 could be divided by the number of operable vessel propulsion units and applied equally to the various thrust units.

Preferably, however, before tension correcting thrust vectors are applied to the various individual propulsion units, the level of operation or speed of the various propulsion units should be examined.

It would be desirable, for example, to maintain the engine speed of the various propulsion units within a predetermined deviation format. This format could involve an accepted deviation in engine speed or an accepted deviation in ratio of engine speeds.

Turning Moment or Lateral Interaction Calculation

After the vectors for offsetting the tension deviation vector 112 have been calculated with respect to the various vessel propulsion units 101 to 106, consideration may be given to computing a turning moment to offset lateral load cell readings.

The operation of the starboard load cell unit 96, as reflected by the reading of its load cell 100, will provide an indication of the degree of lateral force interacting between the pipeline portion 3 and the starboard side of stinger portion 12 of the floating vessel means 5. Similarly the operation of port load cell unit 95 as reflected by the reading of its load cell 100 will provide an indication of the lateral force interacting between the pipeline portion 3 and the port side of the stinger portion 12 of the floating vessel means 5.

It is desirable, of course, that the lateral interaction between the pipeline portion 3 and the stinger 12, in both port and starboard directions, be maintained at zero or at least at a sufficiently low level so as to avoid lateral bending of the pipeline caused by the lateral interaction between the lower extremity of the stinger and the pipeline.

It is also desirable that excessive lateral interaction between the pipeline portion 3 and the stinger 12 be offset in such a manner as not to significantly, adversely affect corrections introduced into the system to alleviate pipeline tension deviations and vessel position deviations.

These basic objectives may be accomplished by utilizing the lateral force interaction indications of either the load cell unit 95 or the load cell unit 96 as an empirical aid in calculating a turning moment to be applied to the vessel 11. This turning moment applied to the vessel 11 by the vessel propulsion units will, of course, be transmitted through hitch 16 to the stinger 12. The direction of the turning moment will be such as to relieve the excessive lateral force interacting between the pipeline portion 3 and the stinger 12, as indicated by either the load cell unit 96 or the load cell unit 95. This turning moment, designed to relieve lateral interaction between the pipeline and floating vessel means, may be calculated generally in accordance with the following mathematical approach.

It will be assumed that $e_m$ represents the deviation in lateral interaction between the pipeline portion 3 and the stinger 12, i.e. the deviation from the desired zero lateral loading as evidenced by the reading of the load cells 100 of the load cell units 95 or 96. The symbol $\Delta M$ will be used to represent the turning moment to be applied by the vessel propulsion units at the time of correction so as to relieve the undesired, lateral interaction condition. $\Delta M$ will be considered equal to $M_n$ minus $M_1$. In this formula $M_n$ represents the total moment required at the time of a particular calculation to relieve the degree of lateral interaction at the time of this calculation. $M_1$ represents this total moment, as calculated at the time of the preceding calculation.

Both $M_n$ and $M_1$ are calculated in a format designed to take into consideration three factors, namely: existing deviation in lateral interaction, the environmental or system bias tending to produce the lateral interaction deviation, and the time rate of lateral interaction deviation.

Thus, $M_n$ may be computed on the following empirical basis:

$$M_n = B_1 e_m + B_2 \int e_m dt + B_3 (d e_m/dt)$$

$M_1$, of course, would have been previously calculated, in general accordance with this same formula, where $e_m$ was the lateral load deviation at the time of the preceding measurement.

In this three factor correction approach, the first term of the equation provides a factor, modified by the empirical constant $B_1$, and reflecting the degree of lateral load deviation at the time of measurement. The second, "integral term" of the equation represents an integral summation, in conventional integral calculus format, of the product of deviation $e_m$ times a time "increment" of dt, for a preselected period of time preceding and including the time of deviation sensing. The constant $B_2$ takes into consideration this time period of integral summation, and serves to yield an empirically evaluated, average indication of bias in the system, including environmental factors, which bias tends to produce a continuing lateral load deviation.

The third, "derivative" term of the equation represents the time rate of deviation of lateral load, at the time of calculation, modified by the empirically determined constant $B_3$.

Thus, based upon detected lateral interaction deviation, a turning moment correction $\Delta M$ is developed which is designed to not only correct the deviation condition, but offset an estimated, continuous biasing condition in the system, if such exists, which tends to produce such a deviation. $\Delta M$ also takes into consideration the particular rate of deviation in lateral interaction at the time of measurement.

This solution approach thus is dynamic in nature taking into account existing error, average environmental or system bias, and the rate at which error is occurring at the time of condition sensing.

As will be apparent, the more or less continuous monitoring of the reading of the load cell units 95 and 96, albeit possibly on a cyclic basis, would enable $e_m$ to be plotted against time so as to facilitate the manual or computerized determination of the integral and derivative terms of the foregoing equation.

By employing the "moment" approach to relieve lateral interaction between the pipeline and stinger, lateral interaction is relieved while minimizing the tendency for the floating vessel means 5 to undergo translation. In thus minimizing translation, the lateral interaction deviation is corrected with minimum affect on the tension deviation and position deviation corrections and with minimum affect on existing pipeline tension and vessel position.

In implementing the "moment" approach, the $\Delta M$ correction is desirably applied in the form of "couples", i.e. allocated among the vessel propulsion units 101 through 106 so as to produce a zero summation in the direction of X and Y coordinates of the system.

This form of allocation may be effected, recognizing that each of the vessel propulsion units 101 through 106 may be assumed to have a moment arm extending from a center about which the barge 11 rotates.

However, those familiar with offshore pipeline laying operations will recognize that in many instances it may be awkward to determine the actual location of the center of rotation of the system. It will be further recognized that environmental changes, i.e. changes in wind, tide, waves, pipeline condition, etc. will tend to vary the position of the center of rotation of the system.

Because of this practical difficulty in determining the center of rotation, it is important to recognize that the use of equal and oppositely directed moment vectors, employed in the form of "couples," permits moment correction calculations to be make without knowing the actual location of the center of rotation.

Assume, for example, as shown in FIG. 15, that turning moment vectors 121–126, of equal magnitude, are to be applied in the form of couples, to propulsion units 101 through 106. For the purpose of this example, diametrically opposite engine units 101 and 106 may impart one "couple" to vessel means 5, engine units 102 and 105 may impart another couple, while engines 103 and 104 may impart a third couple.

In this instance, the thrust correction vectors 121 and 126 allocated to engine units 101 and 106, respectively, are equal in magnitude, mutually parallel, oppositely directed, and perpendicular to the horizontal distance 127 between the engine units 101 and 106. The product of the magnitude of either of the vectors 101 or 106, times the distance 127 between the engine units 101 and 106, will be equal to the moment provided by the vectors 121 and 126.

SImilarly, the moment produced by the pair of engines 102 and 105 would be equal to the distance 128 horizontally separating these engines, multiplied by either of the vectors 122 or 125, (recognizing, of course, that these vectors 122 and 125 are equal in magnitude) mutually parallel, directed perpendicular to the separating distance 128, and oppositely directed.

The moment produced by the engine units 103 and 104 would be equal to the horizontal distance 109 separating these engines, multiplied by either of the equal-in-magnitude, but oppositely directed, thrust vectors 123 or 124, with each of vectors 123 and 124 being perpendicular to the horizontal distance between engine units 103 and 104.

While the term "horizontal" has been used with reference to distances 127, 128, and 109 it will be apparent that this term is used in a general sense, with these distances actually being measured perpendicular to the parallel turning axes of the engine units in each, couple producing, engine pair. The summation of the three "couple" type turning moments produced by engine pairs 101–106, 102–105 and 103–104 will equal the total $\Delta M$ correction.

Thus, by using this "couple" approach, i.e. by selecting engine pairs and applying equal-in-magnitude and oppositely directed correction vectors to the engines in each pair in a generally "horizontal" direction perpendicular to the "-horizontal" line joining the engines, vectors may be assigned to the selected engine units so as to produce the $\Delta M$ correction. This computation and allocation may be made, of course, without ever having to determine the actual center of mass of the system or its turning center.

At this point, it will be recognized that all of the vectors 121 through 126 are directed in such a fashion as to produce the same direction of vessel turning. In the example shown in FIG. 15 these vectors are directed so as to tend to produce a counterclockwise turning moment, tending to relieve interaction between the pipeline portion 3 and the starboard sensing unit 96, i.e. so as to relieve the previously discussed exemplary deviation vector 110.

While in the example heretofore presented, the moment producing vectors have been allocated in pairs of equal magnitude, it will be apparent that the magnitude of the various vectors 121 through 126 may be unequal or diverse so long as the vector summation of the vectors 121 through 126 in the direction of X and Y coordinates is zero. By maintaining this criteria, tendencies for vessel translation will be obviated or minimized. However, to maintain the "couple" mode of moment application, the vectors of each engine pair must be equal in magnitude, parallel, and oppositely directed.

The manner in which the magnitude of the vectors 121 through 126 is allocated may be varied, depending upon the condition of the vessel propulsion units at the time the correction is to be made As in the case of the calculation of the tension correction, it may be desirable to apply the moment inducing vectors in such a manner as to maintain the engine speeds of the various propulsion units within a predetermined deviation format. Here again, this format could involve an accepted deviation in engine speed or an accepted deviation in ratio of engine speeds.

It will also be recognized that the allocation of turning moment vectors may be effected, taking into consideration those engines which may be paired to produce the largest "couple", based on the reserve thrust available from these engines and their distance of horizontal separation.

It is contemplated, for example, that in certain instances it may be desirable to effect moment corrections by employing a single engine pair, such as pair 101–106 or pair 102–105, or both of these pairs, because of the maximized distance of separation of the engines of these pairs.

For example, where a single pair of engines was available to effect moment corrections, which single pair had the best available combination of horizontal separation and reserve engine thrust, and the remainder of the vessel propulsion units or engines were operating substantially at capacity, it would be desirable to effect the moment correction through the use of such a single engine pair.

In general, it is contemplated that the engine units 101, 102, 105 and 106 would provide the best capability for effecting moment corrections because of the fact that their separation distances are longer than those associated with engines 103 and 104 in the vessel propulsion unit system. Thus, in some instances, the moment correction $\Delta M$ may be allocated only to these units. to the exclusion of units 103 and 104. However, it is recognized that in certain instances the engine reserve of vessel propulsion units 103 and 104 may be so excessive as to enable these two vessel propulsion units, in combination with other vessel propulsion units, to provide the best turning moments.

These factors may be taken into consideration, with an operator or control system selecting engine pairs for moment correction, based upon the best, overall moment inducing capability, and/or engine balancing criteria.

Position Deviation Calculation

As a matter of second priority, and depending upon propulsion unit reserve energy which may be left after tension and lateral force deviations have been calculated, corrective vectors will be calculated for allocation to the propulsion units to offset or correct for the course deviation 115.

The thrust correction to be applied by the vessel propulsion units, with a view to eliminating the course deviation 115, may be computed in various formats.

Ideally, however, it is contemplated that this position deviation correcting thrust calculation will be made, as in the case of the tension deviation and lateral interaction deviation corrections, so as to take into account three factors, namely existing course or position deviation, the average bias in the system tending to produce course deviation, and the rate of course deviation at the time of measurement.

Thus, in making the calculation it may be assumed that $e_p$ represents the deviation 115.

The thrust correction to be applied to alleviate the deviation $e_p$ may be represented by the symbol $\Delta P$, where $\Delta P$ is equal to $P_n$ minus $P_1$. In this formula $P_n$ represents the total thrust, at the time of the calculation, required to offset the deviation 115. In this formula $P_1$ indicates this total thrust requirement at the time of the preceding calculation.

$P_n$ may be computed in general accordance with the following equation:

$$P_n = C_1 e_p + C_2 \int e_p dt + C_3 (d e_p/dt)$$

$P_1$, of course, may be computed in accordance with the same general formula, where $e_p$ indicates the course deviation at the time of the preceding measurement.

In this three phase formula, as in the case of the similar mathematical approaches previously discussed, the first term of the equation represents detected course deviation modified by an empirical constant $C_1$ so as to yield an empirical thrust vector correlated with, and designed to offset, existing course deviation.

The second term of the equation includes an integral term, effecting a summation of course deviation over a selected period of time up to and including the time of calculation. This integral term summarizes, in conventional integral calculus format, the products of course deviation $e_p$ times the time "increment" $dt$. The empirical constant $C_2$ takes into consideration the time increment of the integral term, and reduces the integral term to an average value representing a thrust vector intended to offset an average condition bias tending to produce course deviation.

The third derivative term of this equation involves the rate of course deviation at the time of calculation. The empirical constant $C_3$ reduces this derivative term to a thrust vector designed to offset this rate of course deviation at the time of calculation.

This solution approach thus is dynamic in nature taking into account existing error, average environmental or system bias, and the rate at which error is occurring at the time of calculation.

As will be apparent, the more or less continuous monitoring of the vessel position albeit possibly on a cyclic basis, will enable $e_p$ to be plotted against time so as to facilitate the manual or automated determination of the integral and derivative terms of the position correction equation.

Based upon empirical factors and system simulation approaches, the resulting thrust vector $\Delta P$ will be applied by the vessel propulsion units 101 through 106 in an effort to offset the deviation 115 and restore the vessel to the desired course 114.

$\Delta P$, represented by vector 129 in FIG. 16, may be applied in various formats. For example, it may be applied in alignment with the detected course deviation 115. Where the course deviation 115 is measured perpendicular to the plane P, the thrust vector $\Delta P$ will not adversely effect the tension being imposed upon the pipeline or the calculated, tension deviation relieving thrust vector 120.

It is also possible, of course, that vector 129 may be applied in alignment with the deviation 115, and directed toward the course 114, where deviation 115 is measured perpendicular to the course 114 but where the deviation 115 is not necessarily perpendicular to the median plane P. Vector 129 might also be applied to have a forward directed thrust component. These modes of computation would produce a component of the course deviation correcting thrust vector $\Delta P$, in parallel alignment with the median plane P, so as to affect the pipeline tension. However, it is believed that the affect of such a component of the vector 129, aligned with the plane P, would be substantially minimal in nature. If desired, such a component of the vessel position deviation relieving thrust vector could be taken into account in the overall calculation affecting the tension correction. However, as is subsequently indicated, the effect of such a vector componant, in relation to pipeline tension, would be so transitory in nature that it may be ignored.

Thus, in summary, it will be recognized that the direction of the $\Delta P$, i.e. vector 129, may be empirically altered or adjusted to suit operational requirements. The direction of vector 129 in relation to course deviation may be varied during the pipelaying operation. Thus, the amount of pipe remaining to be laid and environmental conditions may dictate the degree of rapidity with which course deviation is to be alleviated. This will affect the direction in which the thrust vector $\Delta P$ should be applied in relation to the direction of measured deviation.

Here again, as in the case of the allocation of thrust in connection with the tension correcting vector 120, an effort should be made to attempt to maintain the operating loads of the vessel propulsion units within an established deviation format. This may be done, by attempting to apply to each propulsion unit a position correcting thrust vector parallel to the resultant vector 129 and at such a level so as to tend to bring all of the vessel propulsion units up to operating speeds so as to maintain the various operating speeds of the propulsion units within a given deviation range from an average engine speed or within a given absolute level of deviation between engine speeds. Alternatively, corrective thrust vectors could be applied to the vessel propulsion units, parallel to the correction vector 129, so as to tend to maintain the ratio of speeds of vessel propulsion units, i.e. engines within a given range. These engine balancing formats, in a general sense, are equally applicable in relation to the previously discussed apportioning of vector 120 and the turning moment to offset deviation vector 110.

INTERACTION OF CORRECTIONS MINIMIZED

Effect of Lateral Thrust, to Correct for Position Deviation, on Tension Correction It will here be appreciated that by applying the resultant thrust vector 129, through the vessel propulsion units, generally perpendicular to deviation vector 120, little or no adverse thrust affect will be created insofar as the tension applied to the pipeline is concerned. Vector 129, in this solution approach, will be substantially perpendicular to the direction of vector 120 and thus not affect the tension correcting vector 120.

It is also obvious that, where the lay barge 11 is off course, it may be desirable for the vector 129 to be inclined somewhat forwardly, on an empirically determined basis, so as to have components extending both transversely and longitudinally of the lay barge, i.e. transversely toward the desired course 114 and in a longitudinal direction forwardly of the vessel.

While any longitudinally directed component of the vector 129 would, of course, change the tension exerted on the pipeline as a result of correction vector 120, it is important to here appreciate that this altering of tension vector 120 will not be of enduring or serious consequence.

It is contemplated, for example, that any forward or even rearward, component of thrust vector 129 would in most instances be fairly small in relation to vector 120 because the degree of deviation of the lay barge 11 from the desired course 114 would ordinarily be of nominal magnitude.

Even if the course deviation is substantial, such that the forward, or rearward, component of vector 129 would be of significant magnitude in relation to corrective vector 120, the modifying influence of the forward component of vector 129 on vector 120 would be transitory in character.

This would result from the manner in which tension, turning moment, and vessel position are sampled.

It is contemplated, for example, that the tension being exerted on the pipeline will be scanned or monitored through the operation of a computer and the sensor means 36a and 36b on the order of once every 3 seconds.

It is contemplated that moment deviation, i.e. the vector 110, will be scanned or monitored by the combined interaction of this computer and the sensors 95–96 on the order of once every fifteen seconds.

It is also contemplated that the position 113 of the vessel will be determined by the computer, on the order of once every 30 seconds Thus, when a vector 129 is first determined which has a forward component, the system will effect an overall adjustment, affecting the vector component 120. However, on the succeeding computation, i.e. at the end of the next 3 seconds, the computer-stored, former position computation and vector 129 would be relied upon and the tension correction vector re-evaluated. At this point in time, the correction vector 120 would be appropriately readjusted, in view of existing engine thrust level and direction conditions.

Effect of Turning Moment on Lateral Interaction and Tension Deviation

It will also be here appreciated that the application of a turning moment to the vessel, tending to turn the vessel about the center of rotation of the system so as to relieve lateral interaction between the pipeline and stinger, will not, in a theoretical sense, significantly, adversely affect either the forward thrust applied to the vessel to correct for tension deviation or the lateral thrust applied in alignment with the direction 115 to correct for position deviation.

In other words, moment corrections, while possibly entailing vectors having forward and laterally directed components, may be substantially neutralized from a translation standpoint by employing thrust units in pairs. By applying equal, but oppositely directed vectors to the engines of these pairs in the form of "couples," so as to produce a turning moment offsetting the vector 110, the longitudinally or laterally directed resultant thrust vectors acting on the vessel 11 will not significantly, if at all, be affected.

Where a vessel turning moment is asymmetrically applied, or where true "couples" are not utilized, vessel turning may be effected which would induce vessel translation in a forward and/or lateral direction. However, it is considered that this translation would, in general, be of minimal consequence and could be substantially ignored in view of the overall approximations required in handling a complex problem of this nature.

Effect of Tension and Position Deviation Corrections on Turning Moment

Because of the asymmetric character of the interconnected vessel 11 and stinger 12, it will be recognized that the tension correction vector 120, as well as the position deviation correction vector 129, may impart some turning moment to the floating vessel means 5.

By and large, the turning moments thus produced may be considered to be more or less negligible, in view of the various approximations which are required to be made in the overall technique of correction calculations.

However, in the interest of improved accuracy, it may be desirable to introduce compensating factors in the moment equation previously presented, which compensating factors would be designed to offset turning moments estimated to be produced by the tension correcting vector 120 and the position deviation correction vector 129.

Where a symmetric vessel, stinger, and vessel propulsion system is employed, these considerations may not apply. Such a symmetric arrangement may be approached, for example, by employing a pipelaying ramp and/or stinger which are generally longitudinally and laterally centered in relation to the pipelaying vessel. A "through-the-hull" pipelaying system as described in the aforesaid Lawrence U.S. Pat. No. 3,472,034 may be so arranged.

SUMMARY OF OVERALL CONTROL CONCEPT

With the overall approach to correction logic having been discussed, it now becomes appropriate to review, in an overall format, the manner in which deviations in pipeline stresses and vessel position are monitored and corrective action taken.

Thus, the overall control concepts of the present invention, involving both pipeline stress control and the maintenance of control over the position of the pipelaying vessel, will not be summarized with reference to a flow diagram format, shown in FIG. 17.

As will be appreciated, in each instance, the resultant, correction vector $\Delta T$, i.e. vector 120, the resultant correction vector $\Delta P$, i.e. vector 129, and the moment $\Delta M$ will be of such a magnitude as to at least induce some movement of the vessel means 5 in an appropriate direction, tending to alleviate the detected deviation condition.

Through the operation of pressure monitor 36a and load cell 36b, and by knowing a desired pipeline tension level, an indication of the tension deviation vector 112 is obtained. The determination or calculation of tension deviation vector 112 is exemplified by block 130 in FIG. 17. After tension deviation vector 112 is determined, the tension correcting vector 120 is calculated consistent with the foregoing discussion, as a step denoted by block 131 in FIG. 17.

In the step represented by block 131, the resultant tension correcting vector 120 may be computed for allocation to the various vessel propulsion units 101 through 106, so as to tend to maintain a desired condition of engine load balancing. In this calculation step, the tension correcting vector assigned to each individual propulsion unit may be resolved into appropriate X and Y coordinates. To facilitate the coordination of overall corrective action, the X coordinate as here and subsequently employed may be considered to be aligned with an east-west direction, with the Y coordinate being aligned with a north-south direction. Obviously, however, other coordinate frameworks may be utilized, including a framework based on the vessel 11 itself.

The operation of side load (i.e., units 96 and 95 provides an indication of lateral displacement of the pipeline relative to the vessel means, represented in the foregoing examples, by load cell detected vector 110 acting on the vessel 11. The determination of this lateral displacement inducing vector 110, i.e. lateral load deviation, is represented by block 132 in FIG. 17.

The turning moment inducing vectors (i.e., for example, some or all of vectors 121 through 126) discussed in connection with FIG. 15, which are intended to offset the lateral loading influence of vector 110, are calculated in a step represented by block 133 of FIG. 17 and may be computed so as to maintain a desired format of engine speed balance and best moment format.

To facilitate computations, those of the vectors 121 through 126 which are computed in step 133 for assignment to the vessel propulsion units 101 through 106 may also be resolved along the aforesaid X and Y coordinates.

Navigation data received from the satellite 116 and the sonar beacon 117 are employed, in well-known navigation computations, to determine the actual position of the vessel 11 at any particular time. This computation of actual vessel position is represented by block 134 of FIG. 17. This information, of course, provides an indication of the extent of deviation 115 in relation to the desired course 114.

Knowing this deviation, the course deviation correcting vector 129 is computed in the step represented by block 135, in a manner consistent with the foregoing discussion. Resultant vector 129 may be allocated among the various vessel propulsion units 101 to 106 so as to maintain a desired condition of engine load, or propulsion unit balancing.

In step 135, the position correcting vectors assigned to each individual vessel propulsion unit (i.e. a fractional part of vector 129) may be resolved along the aforesaid X and Y coordinates.

Through conventional engine condition monitoring equipment, the effective vector of each propulsion unit, i.e. the magnitude of engine thrust (i.e. RPM) and its direction, is indicated. These engine vectors may be resolved, with respect to each engine, along the aforesaid X and Y coordinates, as indicated by a step illustrated as block 136 in FIG. 17.

The data from blocks 131, 133, 135 and 136 is then employed, in a step exemplified by block 137 of FIG. 17, to determine the total correction to be allocated to each individual vessel propulsion unit, with a resolution by X and Y coordinates facilitating vector addition.

The allocation of corrections may be effected, with due consideration being given to the priority concepts heretofore outlined.

Thus, as a first priority the tension correction will be sought to be made. As a part of this first priority, the thrust effect of the vessel propulsion units will be adjusted to relieve the lateral vector 110. Assuming that further engine capability exists, the resultant thrust vectors of the various vessel propulsion units will be adjusted in an effort to provide the resultant, course correcting vector 129.

In the event that insufficient engine reserve is available to fully correct for deviation 115 at the desired rate, the magnitude of the vector 129 will be reduced to the level which may be handled by the capability of the vessel propulsion units.

Thus, as shown schematically in a vector analysis format in FIG. 22, the various vessel propulsion units 101 through 106, represented by circles, are operating at a particular point in time when corrections are to be made with respect to engine thrust vectors 101a through 106a. Each of these engine thrust vectors extends from a center of its respective engine circle which has a radius indicative of the maximum thrust level which may be derived from the engine. The direction of each of these thrust vectors 101a through 106a is indicated with respect to the hull 55 of lay barge 11.

In a vector addition format FIG. 23 illustrates a forward directed thrust vector 101b which is allocated to the vessel propulsion unit 101 with a view to providing the fractional portion of vector 120.

The moment inducing thrust vector 121 allocated to engine 101, is indicated in vector addition format in FIG. 23.

FIG. 23 also illustrates, in a vector addition format, the corrective vector 101c which is allocated to the engine 101 as a part of the effort to provide the position deviation correcting vector 129.

Through conventional vector addition technique, shown graphically in FIG. 23, the correction vectors heretofore described produce a new engine thrust vector 101d in relation to engine 101.

As is apparent by reference to FIG. 23 the overall correction which must be applied to engine 101, to convert original vector 101a to the new, compositely corrective vector 101d, is represented by engine adjusting vector 101e. FIG. 22 shows equivalent adjusting vectors 102e–106e which are allocated to engines 102–106 to produce new engine vectors 102d–106d. These new engine vectors, of course, are designed to correct for tension deviation, lateral interaction deviation, and course deviation, in a manner generally consistent with the foregoing discussion of the vectoral adjustment of engine 101.

The schematic vector representation of FIG. 22 has assumed an equal allocation of tension, lateral displacement, and position correcting thrust vectors to each of the various vessel propulsion units. These corrections have been shown as correction vectors rather than in the form of the individual X–Y components of the vector changes.

It will be understood, however, that in actual practice the engine balancing and priority considerations heretofore discussed would be employed.

The preceding program may be implemented with continuous incremental condition monitoring. Such continuous monitoring contemplates the detecting of conditioned deviations on a continuous, but possibly intermittent basis, regardless of whether or not the clamping mechanism 19 is grippingly engaged with the pipeline portion 4a. With such monitoring, correction may be sought to be applied on a continuous, albeit cyclic, basis, during both gripped and ungripped pipeline conditions.

Preferably, however, tension deviation, lateral interaction between the pipeline and stinger and vessel position deviation are corrected only during the clamped condition of the mechanism 19, so as to obtain the advantages of a uniquely stabilized system condition. Thus, it may be appropriate to adjust the condition monitoring and correction calculation schedule so that the monitoring and calculation operations are performed only during spaced time increments, more or less coinciding with the periods of time during which the clamping mechanism 19 is gripping the pipeline portion 4a. Even where such intermittent condition deviation and correction calculation operations are performed, it is contemplated that both condition deviations and correction calculations may be effected on a cyclic basis during the condition monitoring and correction calculation increments of time.

At this point it may be noted that, in a presently preferred embodiment, the tension deviation vector 120 may be updated at 3-second intervals to permit a recalculation of tension correction at 3-second intervals. The lateral deviation vector 110 may be updated at 15-second intervals to permit the calculation of a resultant vessel turning moment at 15-second intervals. The position deviation 115 may be updated at 30-second intervals to permit the calculation of the position restoring vector 129 at 30-second intervals.

With this arrangement, i.e. where tension, moment, and position correction factors are calculated at different frequencies, but with the frequencies being in even multiples of each other, it is possible to apply multiple corrections at the same time, assuming, of course, that the calculation frequencies all have the same "zero" or starting point in time.

The ability to apply multiple corrections at the same time is believed to be significant from the standpoint of providing a more efficient, and rapidly responding correction system.

It should be recognized, however, that the particular condition sensing and correction calculation frequency herein discussed in connection with the preferred embodiment may be modified, depending upon particular operating conditions. It is contemplated, for example, that the condition monitoring and correction calculation frequencies may be substantially slower than those described, by way of example, and that in certain instances, deviation conditions may be monitored so that all correction calculations made at the same frequency.

In particular, it is recognized that a correction schedule may be adapted which would enable deviations to be detected, and appropriate corrections calculated, allocated, and completed, before the initiation of a succeeding correction cycle. With this approach, the inertia factors of the system would be taken into account and corrections implemented before further deviations would be detected and sought to be corrected.

COMPUTERIZED SYSTEM FOR EFFECTING TENSION, LATERAL INTERACTION, AND VESSEL POSITION CORRECTIONS

The determination of new engine thrust vectors 101d through 106d could be determined by manual computation on board the lay vessel 11 if sufficient time and personnel were available. The axial orientation and thrust level of each individual vessel propulsion unit could then be manually adjusted in accordance with these computations.

Preferably, however, the computation and application of corrections to the vessel propulsion unit should be handled under fully automatic, computerized control, as shown generally in FIG. 18.

Computer Control Format

Thus, the pipe tension sensing, motor fluid pressure responsive, unit 36a and the clamp load responsive load cell 36b, provide analog signals which may be converted to digital pipeline tension signals by conventional, analog-digital converter units 138a and 138b. Analog-digital converters suitable to perform the functions of units 138a and 138b may comprise, for example, a Model 251 converter in association with a Model 251-1, plug-in module, both manufactured by United Systems Corporation, 918 Woodley Road, Dayton, Ohio.

These digital signals, provided by units 138a and 138b which are indicative of pipeline tension, are fed to, and may be added within, a conventional all-purpose digital computer 139. General purpose high speed digital computers, generally suitable to perform the function of computer 139, may comprise a Model 2116B computer manufactured by Hewlett-Packard 1101 Embarcadero Road Palo Alto, California, or a computer Model PDP-8, supplied by Digital Equipment of Maynard, Massachusetts.

Thus, as is shown in FIG. 18, pressure sensors 36a and load cell 36b, may be transmitted through analog-digital transducer means 138a and 138b to the computer 139.

The tension indications provided by the sensors 36a and 36b may be added within the computer 139. Alternatively, these signals may be added, through a conventional signal adding mechanism, externally of the computer 139 and transmitted to the computer 139 as an already totalled, tension function.

Similarly, the lateral load sensing units 95-96 provide analog signals indicative of lateral force interacting between the vessel means 5 and the pipeline. The port side, analog signal from unit 95 may be fed to a conventional, analog-digital converter 140a, such as units 138a–138b above-noted, and supplied as a digital signal to the computer 139.

Similarly, the starboard analogue signal from unit 96 may be fed to a conventional, analog-digital converter 140b, such as units 138a–138b, above-noted, and supplied as a digital signal to the computer 139.

Programming data relating, for example, to desired pipeline tension, allowable lateral loading on the pipeline at stinger segment 13a, as well as desired vessel position, at any particular time during the pipelaying operation, is supplied to the computer 139 as a manual input, indicated schematically by block 142 in FIG. 18.

A data-receiving station 141, on lay vessel 11, includes receiver 141a, which receives navigation or position information from the satellite 116. This information is transmitted from unit 141a as a digital signal to the digital computer 139 and in his computer converted to an indication of actual vessel position at any given time.

Data receiving station 141 also includes receiver means 141b which receives navigation or position information from each of the alternately operable sonar beacons 117 This information is transmitted from receiver means 141b as a digital signal to the computer 139.

The receiving means 141a and 141b are described, in a commercially available format, in the publications previously noted in connection with conventional satellite responsive and sonar beacon responsive navigation systems.

Digital computer 139, through appropriate programming, effects the computations previously discussed in connection with blocks 130–137 of the flow diagram of FIG. 17. Computer 139 determines the new engine vectors 101d through 106d. This determination may be made in the form of the new engine vectors 101d through 106d, or consistent with the previously discussed computations, in the form of overall correction vectors 101e through 106e which, when added to the existing engine vectors 101a through 106a, will yield the new desired engine vectors 101d through 106d.

The engine vector correction data is transmitted through a conventional control signal transmission means to conventional, engine control means 145. It is contemplated that transmission means 144 may convert the digital correction information supplied by computer 139 to analogue control signals.

The conventional vessel control means 145, which may be analogue signal responsive, is operable to control the thrust level and direction of the propulsion units 101 through 106.

Transmission means 144 and control means 145 may comprise well known commercially available components. Representative components of this nature are described in detail, for example, in U.S. Shatto, Jr. et al. U.S. Pat. No. 3,187,704, Hayes U.S. Pat. No. 3,105,453, Berne U.S. Pat. No. 3,311,079, Wanzer U.S. Pat. No. 2,987,027, and in the general body of now well recognized art dealing broadly with dynamic vessel positioning systems, which include transmission and control systems for adjusting the thrust and azimuth of vessel propulsion units in accordance with appropriate control signals.

The sensing of engine thrust level and direction, exemplified by block 136 of FIG. 17, and identified by sensing means 146 in FIG. 18, provides a "feedback signal" indicative of the attainment of desired correction. Such a sensing means is exemplified by conventional units providing RPM to voltage conversion for thrust sensing and precision rotary potentiometers for direction sensing. Units 146 thus may correspond, in general, to engine condition sensing and "feedback" systems of well-known commercially available types or correspond to types discussed in literature such as the foregoing patents.

The "feedback" signals from unit 146, if analog in nature, may be transmitted from the sensor means 146 to computer 139 through a conventional analog-digital converter 147, which may correspond to components provided in conjunction with converters 138a and 138b, as earlier discussed.

Thus, the computer 139, in combination with the vessel propulsion units and the components 144 through 147, provides a servo-type control loop.

It will be appreciated, of course, that in instances where the sensors 36a, 36b, 95 and 96, the control means 145, and the sensors 146 are digital in nature, it will be possible to dispense with the converter units, 138a 138b, 140a, 140b, 144, and 147.

As indicated, the signal from sensor 36a may be transmitted through a separate analog-digital converter 138a, to the computer 139, with the signal from load cell 36b being transmitted through another analog-digital converter 138b, to the computer 139. Similarly, the reading of lateral load cell 95 may be transmitted through a separate analog-digital converter 140a, to computer 139, with the signal from the other load cell 96 being transmitted through a separate analog-digital converter 140b, to the computer 139. However, those familiar with computer control systems will recognize that the analog-digital conversion functions of such separate analog-digital converter units 138a, 138b, 140a, 140b and 147 may be effected with a single analog-digital converter of the type previously discussed in connection with units 138a and/or 138b.

Computer Program Philosophy

The preceding sections have detailed with particularity the manner in which condition deviations are monitored and appropriate vessel propulsion unit thrust vectors calculated and allocated.

The overall philosophy of the control system has been described with reference to FIG. 17. The complexity of this system has made it abundantly clear that the computer control approach to dynamic vessel positioning described with reference to FIG. 18 is of enormous significance, in providing a rapidly responsive and effective control technique. With this computerized approach to dynamic vessel position, as it applies to a pipeline laying operation, rapid response to condition deviation is assured, and the necessity of maintaining a large crew of personnel for effecting manual computations is avoided. Further, the propensity for error involved in manual computation, under the trying and demanding conditions of actual pipeline laying operations, is minimized or avoided.

With the value of the computerized approach having been demonstrated, it becomes appropriate at this stage to consider the nature of the programming which should be employed to implement and control the FIG. 18 system.

A programming concept deemed particularly desirable is schematically illustrated in FIG. 19.

FIG. 19 illustrates a series of steps in the computer program operation, with each step being designated by a separate block.

Step 130a initiates the program and represents an input into the computer system, at 3-second intervals, and during the clamped mode of mechanism 19, of the total pipeline tension measurement resulting from the combined readings, converted to tension, of the pressure monitoring unit 36a and the load cell 36b.

Proceeding in sequence from step 130a, at step 130b, the computer 139 is "flagged" to indicate that a tension reading has been input into the computer system.

At the next step 130c, the computer determines whether or not a tension deviation calculation has been made in the last 3 seconds. It no such tension deviation calculation has been made in the preceding 3 seconds, the program proceeds to step 130d. At step 130d the pipeline tension at this point is compared with the desired level of pipeline tension, provided by manual input 142, so as to yield the tension deviation factor $e_t$.

Proceeding to the next step 130e, the computer determines whether or not the deviation $e_t$ is excessive or tolerable. For example, a deviation factor $e_t$ might be tolerated if it does not exceed a certain percentage, say on the order of 3 percent, of the desired tension.

At this point, it will be recognized that the steps 130a through 130e are all implemented in the block designated 130 in FIG. 17.

Assuming that $e_t$, as evaluated at step 130e, exceeds a permissible deviation level, the program proceeds to step 131a. At step 131a, the computer determines the tension thrust vector $T_n$ in accordance with the three-factor equation previously discussed.

Proceeding to step 131b, the computer, at this step, compares $T_n$ with the $T_1$ factor determined during a preceding tension computation, so as to yield the tension deviation alleviating thrust vector $\Delta T$.

At step 131c, $\Delta T$ is calculated for apportionment amongst all of the vessel propulsion units 101 through 106, with the component of $\Delta T$ assigned to each vessel propulsion unit being resolved on the basis of X and Y coordinates of the coordinate grid of the system.

At this stage, it will be recognized that steps 131a through 131c are implemented in the block designated 131 in FIG. 17.

The information derived at step 131c is stored by the computer as the program enters a phase or step represented by block 137 of the computer program.

Phase 137 corresponds to block 137 of FIG. 17, and involves the addition of all correction vectors and the allocation of the summation of the correction vectors to the various vessel propulsion units.

As shown in FIG. 19, step 137 involves various substeps, the first of which involves an engine operating condition appraisal step 137a. In this operational step, the computer, by monitoring inputs from engine monitoring equipment represented by block 136 in FIG. 17, determines whether or not any vessel propulsion units have become nonoperational If, at step 137a, the computer determines that all engines 101–106 are operational, the program bypasses step 137b and proceeds to step 137c.

However, if, at step 137a, it is determined by computer 139 that certain of the vessel propulsion units have been shut down or become non-operational, the computer step 131c will be repeated at step 137b so as to allocate $\Delta T$ only to those engines which are actually in operating condition.

The program then proceeds from step 137b to a program check point step 137c. At step 137c, the computer determines, as a program progressing necessity, whether or not the program has proceeded through an evaluation of all of the tension, moment, and position calculations. At this stage, of course, on the basis of the present example, it is clear that the program has proceeded only through the tension calculation.

With only the tension calculation having been made, the program returns to step 130a. The program then reproceeds from step 130a to step 130c. Since a tension calculation was made in the preceding 3 seconds, the program diverts from step 130c to a first step 132a in the moment calculation.

At step 132a, lateral load interaction, as indicated by the readings of load cell units 95 or 96, are input into the computer system at the rate of every 15 seconds.

With a lateral load reading having been input into the system, the program proceeds to step 132b, where the computer is flagged to indicate that a moment evaluation or lateral load deviation condition has been treated.

The program then proceeds to step 132c, where the computer determines whether or not a moment calculation has been made in the preceding 15-second interval. For the purpose of this example, it will be assumed that no such calculation has been made. The program then proceeds to step 132d. At step 132d the lateral load cell readings are compared to an allowable lateral load reading, which may be "zero," and thus converted to the deviation factor $e_m$.

At the succeeding step 132e, the computer determines whether or not the deviation factor $e_m$ exceeds a permissible level of deviation. For example, if $e_m$ exceeds an allowable lateral load interaction by a factor of, say 3 percent, it may be considered that a turning moment need be applied to offset this lateral load indication.

At this point, it will be recognized that steps 132a through 132e correspond to the steps implemented in block 132 of FIG. 17.

Assuming that $e_m$ has been determined as being excessive so as to require correction, the program proceeds to step 133a. At step 133a the factor $M_n$ is determined in accordance with the three-factor equation earlier discussed.

At the succeeding step 133b, the computer compares $M_n$ to the factor $M_1$, determined in the preceding moment correction computation, so as to yield the correcting thrust vector $\Delta M$.

At the next step 133c, $\Delta M$ is computed for allocation amongst the various propulsion units, possibly in accordance with a pre-programmed and desired format of engine balancing criteria, and, also possibly, in accordance with a pre-programmed approach for utilizing engine pairs to provide a "couple" type turning moment to offset lateral interaction between the stinger 12 and the pipeline portion 3.

Thus, at step 133c, $\Delta M$ may be resolved into X and Y components, for allocation to the engines of preselected engine pairs, consistent with the moment calculation approaches previously discussed.

It is possible at this stage that the program may be such as to compute an allocation of $\Delta M$ to engine pairs, predicated upon engine pairs having the best potential with respect to developing turning moments. This may be accomplished in a format consistent with the desire to maintain a general condition of engine load balancing.

Steps 133a through 133c are implemented in block 133 of FIG. 17.

The program now proceeds from step 133c to phase 137. Returning again to step 137a of phase 137, as shown in FIG. 19, the computer again determines whether or not there are engines in a nonoperational condition. If it is determined that engines are in a non-operational condition, the computation proceeds to step 137b. At step 137b the computation of 133c is repeated, this time predicated upon the engine units actually available to receive components of the $\Delta M$ correction.

If, at step 137a, all of the engines are determined to be operational, the program bypasses step 137b and proceeds directly to step 137c.

At step 137c, the computer again determines whether or not there has been an input of each of the tension, moment, and position computations. Since, at this stage of the example, only tension and moment computations have been made, the program again recycles, commencing with step 130a.

The program reproceeds, from step 130a to step 130c. Since, again at step 130c, the computer determines that a tension calculation has been made in the preceding three seconds, the program is diverted to step 132a.

The program proceeds from step 132a to step 132c where the computer determines that a moment calculation has been made in the preceding 15 seconds. Such being the case, the program is now diverted to step 134a.

Step 134a represents the input into the computer system, at 30-second intervals, of actual position measurements as determined by the combined operation of the satellite navigation aid 116 and the position extrapolating sonar beacon 117.

The program now proceeds to step 134b, where the computer is flagged to indicate that a position measurement has been made.

Proceeding to step 134c, the computer determines whether or not a position calculation has been made in the preceding 30 seconds. For the purpose of this example, it will be assumed that no such calculation has been made. Such being the case, the program proceeds to step 134d.

At step 134d the position deviation $e_p$, i.e. displacement 115, is determined in accordance with the analysis previously presented.

At step 134e, the computer determines whether or not the deviation factor $e_p$ is within acceptable limits, or exceeds an allowable position deviation. If $e_p$ exceeds a particular deviation increment, considered acceptable, the program proceeds for the purpose of making a position deviation correction. At this stage, it should be recognized that steps 134a through 134e are accomplished in block 134 of FIG. 17.

Proceeding from step 134e, the program is carried forward to step 135a. At step 135a, the position deviation relieving thrust $P_n$ is calculated in accordance with the three-factor equation previously discussed.

In the succeeding step 135b, the computer compares $P_n$ with the factor $P_1$, as determined in the preceding position deviation correcting computation, so as to yield the previously noted, position deviation correcting thrust ΔP.

At the next step 135c, ΔP is computed for allocation among the vessel propulsion units 101 through 106, in accordance with the desired format of engine balancing. This allocation may be made on the basis of X and Y coordinates for the component of the correction. ΔP assigned to each individual vessel propulsion unit. Once this phase is completed, the program again proceeds to phase 137.

At phase 137, the program again cycles through step 137a to determine whether or not there are any engines in a nonoperational condition. If it is determined at step 137a that all engines are not operational, the program proceeds to step 137b, where, in effect, step 135c is repeated so as to allocate ΔP amongst the actually available engines. If at step 137a the computer, based upon the operation of the engine monitoring system 146, determines that all engines are operational, the program bypasses step 137b and again proceeds to the monitoring step 137c.

At this time in the example, the computer 139, at step 137c, recognizes, based upon steps 130b, 132b and 134b, that the program cycle has been flagged to indicate an input of each of the tension, moment, and position computations.

With this complete flagging condition existing, the program now proceeds to step 137d. At step 137d the computer vectorally and possibly on an X and Y grid basis, sums the components of ΔM, ΔP and ΔT assigned to each engine.

At step 137e, these vectoral sums are converted to desired engine thrust or rpm levels, and engine azimuth conditions.

At the next step 137f, the computer compares the information output from step 137e to see if this information would cause an overloading of any engine. If the computer determines that overloading would exist, the program proceeds to step 137g. At step 137g the program is returned, in essence, to step 135c, where ΔP is reduced by a fixed increment, say, for example, a factor of 5 percent. The program then proceeds, as before, from step 135c.

Assuming that, at step 137f, it is determined that no engine overloading condition will result, the program proceeds to step 137h. At step 137h the information output from step 137e is allocated through transmission path 144 and engine control units 145 to the operational vessel propulsion units.

The program is then recycled at 3-second intervals, during the time periods while clamp 19 is engaged with pipeline portion 4a, in general accordance with the format of this exemplary cycle.

At this stage, it will be appreciated that each individual program cycle is effected in milliseconds so as to have little or no effect on the condition monitoring rates of steps 130a, 132a and 134a in relation to phase 137h. In other words, the allocation step 137h will be implemented essentially as though there was no time lag between steps 130a, 132a, 134a and step 137h.

Thus, with the input information at steps 130a, 132a and 134a being supplied respectively at 3, 15 and 30-second intervals, the program is able to simultaneously apply ΔT, ΔM and ΔP corrections at 30-second intervals, and simultaneously apply ΔT and ΔM corrections at 15-second intervals. In the intervening 3-second intervals, ΔT corrections only are applied by the system.

By maintaining the input frequencies in even multiples, i.e. 3 being divisible into 15 and 30 on an even basis, and 15 being divisible into 30 on an even basis, the program is able to effect corrections in this simultaneous fashion so as to simplify and compact the correction operation, reduce "hunting," and provide an overall, more efficient correction system.

Some minor points should be clarified at this stage. For example, the computer may cycle through step 130c and determine that a tension calculation has been made in the preceding 3 seconds. Similarly, the program may cycle through step 130e and determine that $e_t$ is not of such a magnitude as to require correction. In either of these events, the program would proceed immediately to step 132a.

Similarly, at step 132c the computer may determine that a moment calculation has been made in the preceding 15 seconds. The computer at step 132e may determine that $e_m$ is not of sufficient magnitude as to require correction. In either of these events, the program would be diverted to step 134a.

At step 134c the computer may determine that a position calculation has been made in the preceding 30 seconds. At step 134e the computer may determine that $e_p$ is not of such a magnitude as to require correction. In either of these events, the computer would divert the program to phase 137.

As will be appreciated by those familiar with the computer programming art, computer 139 could be programmed in a compiler language such as FORTRAN IV, in a symbolic assembler language suited to the specific computer, or in a machine code suited to the specific computer. Indeed, the programming may involve combinations of these techniques.

Returning again to FIG. 19, it has been indicated, with respect to step 137a, that the condition of the vessel propulsion units may be checked to determine if all of the engines are available to receive appropriate thrust corrections. As will be apparent, this engine check could alternatively be made at other times in the program. For example, engine checks could be made between steps 131b and 131c, between steps 133b and steps 133c, and between steps 135b and 135c. With the engine checks being made at these points in the program, ΔT, ΔM and ΔP would be initially allocated at steps 131c, 133c and 135c, respectively, on the basis of engines available to receive thrust changes. In this connection, it will be recognized that the computer 139 may be programmed so that, at step 133c, ΔM will be allocated only on an "engine pair" or "couple" basis, even if an odd number of engines was operational.

The computer could also be programmed, or adjusted by manual input, so that in response to the detection of one or more engine failures, the total thrust of an "off-line" engine or "off-line" engines would be immediately reassigned on an equal or engine balancing format on the "on-line" engines in order to prevent the development of thrust deviation as a result of engine loss.

STINGER CONTROL AUTOMATION

Deviations in vertical interaction between the stinger 12 and the pipeline may be able to be detected on an automated basis, as generally shown schematically in FIG. 20.

As shown schematically in FIG. 20, inclinometers 94, associated with many, if not all stinger segments, provide an indication of stinger segment orientation, preferably in connection with each individual stringer segment. This inclinometer monitoring information may be supplied to a stinger articulation, control computer 148. This inclination information may be converted within a conventional analog computer 148 into a representation of the attitude of the stinger 12, i.e. a representation of both shape, in side elevation, and pivotal relative to hitch unit 16.

Load cells 86 and 87 provide an indication of the degree of vertical engagement between the stinger and the pipeline, which information may also be transmitted to the computer 148. The information thus transmitted from load cells 86 and 87 provides an indication of another actual stinger condition, i.e. degree of generally "vertical," i.e. normal, interaction between the pipeline and stinger.

Pipeline profile estimating means 149a may provide an indication of the theoretical or apparently desired profile of pipeline portion 3. This profile estimating means 149a may comprise a conventional, manual input operable to feed to computer 148 an estimated computation of the desired profile of pipeline portion 3, based on available information concerning water depth, pipeline tension, pipeline unit weight and, pipeline stiffness, etc. The portion of this apparently desired profile of the pipeline portion 3, extending upwardly from extended portion 3b of the pipeline profile, would generally correspond to the profile and pivotal position of the stinger 12.

Another conventional, manual input unit 149b may provide the computer 148 with an indication of apparently desired interaction between stinger 12 and pipeline portion 3 at the sites of load cell units 86 and 87. These apparently desired, interaction force levels may be estimated in general accordance with the stinger buoyancy criteria described in the Lawrence U.S. Pat. No. 3,390,532 or in accordance with any desired mode of stinger support in relation to pipeline portion 3.

By appropriately programming computer 148, the deviations between actual and desired stinger profile, and pivotal position as supplied from sources 94 and 149a, and the deviations between actual and desired vertical interaction between the stinger 12 and pipeline portion 3 may be determined.

In response to the computer determined deviation in stinger profile and pivotal position an appropriate servo-control signal may be transmitted from the computer 148 through a conventional servo-control loop 148a to motors associated with the various jack units 80. In response to this signal, such motors may be controlled remotely from vessel 11 and caused to restore the stinger 12 to a desired profile and pivotal position.

In response to the computer determined deviation in vertical interaction, servo-correcting signals may also be supplied through another conventional servo-control loop 148b to the buoyancy control means controlled remotely from vessel 11 and individually associated with each segment 13. In response to such signals, the buoyancy will impart adjusted buoyancy to the stinger 12, necessary to adequately lift or support the pipeline and cause the stinger to have such buoyancy as to tend to assume what is believed to be a desired pivotal position and exert the desired lift in the pipeline portion 3.

If, after both the buoyancy and profile of the stinger 12 have been sought to be brought into alignment with desired conditions, improper readings of either load cell units 86 and 87 or inclinometers 94 persist, this may indicate that the pipeline tension level is incorrect and needs adjustment. Such an adjustment in theoretically desirable tension may be required to offset difficult to estimate environmental forces, such as those resulting from strong subsea currents acting longitudinally and/or transversely on pipeline portion 3. Such environmental forces, of course, could well cause an initial tension level estimate to be erroneous.

In short, a failure of the mutually independent control loops 148a and 148b to both achieve a stable or "no deviation" condition may well indicate that the initial assumption as to proper pipeline tension (involved in the input of unit 149a) was erroneous.

To facilitate an evaluation of the operation of the control system shown in FIG. 20, it may be appropriate for the servo-control loops 148a and 148b to be alternately operated to see if each loop can be stabilized, without adversely effecting the other loop.

As will be recognized, the desired stinger attitude input to computer 148, represented by block 149a in FIG. 20, may be provided in conjunction with a continuous indication of desired pipeline tension. Such a continuous indication of desired tension may be provided by a desired tension indicating arrangement similar to that subsequently described in connection with the FIG. 18 control system and its manual input station 142. In this connection, it will be assumed that the operation of the control system shown in FIG. 18 will produce an actual tension condition substantially equal to the apparently desired tension condition.

VESSEL AND PIPELINE SURVEILLANCE AND MANUAL CONTROL

Anticipating possible exigencies or operational emergencies, the computerized system previously described should be supplemented with means which will enable an operator to visually observe, and/or audibly detect, indications of pipeline and vessel condition. In addition, the vessel 11 should be provided with a manually operable system, operable to supersede the computerized control system in the event that the computer system fails or in the event that conditions develop during a pipeline laying operation which are not able to adequately be handled by the computer program.

Vessel Surveillance

FIG. 24 illustrates a console arrangement by means of which an operator may visibly and audibly monitor the pipelaying operation.

As shown in FIG. 24, the lay vessel may be provided with a console assembly 150. This console 150 preferably will be located at a control station on the lay vessel 11. This station may be disposed at an elevated location, generally as described in the Lawrence U.S. Pat. No. 3,390,532 in order to facilitate overall control and monitoring of vessel position and orientation, engine condition, and the condition of pipeline stresses.

Thus, as shown in FIG. 24, the console may include a display area 151 indicative of the condition of the vessel propulsion units 101 through 106.

Display area 151 includes cathode ray tube display units 151a through 151f. These cathode ray display tubes are individually responsive to vessel propulsion units, i.e. for example, cathode ray tube 151a provides a display indicative of the operating condition of engine 101, cathode ray tube 151b provides an indication of the operating condition of vessel propulsion unit 102, cathode ray tube 151c provides a display indicative of the operating condition of engine 104, cathode ray tube 151d provides a display indicative of the operation of engine 104, cathode ray tube 151e provides a display indicative of the operation of engine 105, and cathode ray tube 151f provides a display indicative of the operation of engine 106.

The cathode ray tube display may be effected with conventional, and now well recognized, display techniques utilizing, for example, cathode ray tube display units such as a Model 550 X–Y monitor available through Measurement Control Devices, 2445 Emerald Street, Philadelphia, Pennsylvania. Such cathode ray tube display devices, in conjunction with conventional circuitry, may be employed to convert engine azimuth and thrust to a vector display, in relation to each vessel propulsion unit in the display zone 151 of the console 150.

As shown in FIG. 24, the cathode ray tube units are displayed so that, with an operator facing in a forward direction relative to vessel 11, the cathode ray tubes appear to more or less correspond to the positioning of the vessel propulsion units 101 through 106 on the vessel hull.

Each cathode ray tube displays a line generally representing an engine thrust vector, such as vectors 101a–106a, previously discussed. Thus, in connection with display tube 151a, the cathode ray tube displays a line 152 which extends radially from the center of the cathode ray tube, with the length of the line 152 providing a measurement of engine speed or thrust. The face of the cathode ray tube 151a may be radially calibrated so that an operator can readily correlate the length of the line 152 with a particular level of engine thrust.

The direction of line 152 is indicative of the azimuth of the engine thrust, i.e. the rotational position of the vessel propulsion unit. In the display area 151, the generally upward direction D of the console display area 151 will correspond to the forward longitudinal direction of the lay barge.

As is shown in FIG. 24, the remaining cathode ray tubes in display 151 each display a vector indicative of the thrust vector of their associated vessel propulsion unit, at any particular time.

Console 150 may also include a display area 153 designed to visually display indications of a variety of engine operation conditions. For example, area 153 may include individual display units 153a through 153f, correlating individually with vessel propulsion units 101 through 106, respectively. Each of the display units 153a through 153f may, through conventional condition monitoring and signal display means, provide indications of engine speed, engine azimuth, oil pressure, engine temperature, etc. Each of these units may also be provided with annunciators, alarms, signal lights, etc. to indicate whether or not the vessel propulsion unit or engine is operating, shut down, etc.

Another schematically indicated display area 154 of console 150 may provide visual indications of the condition of the pipeline.

In area 154, a conventional display unit 155 may provide a visual indication of the readings of the various inclinometers associated, preferably, with each of the articulated segments 13 of the stinger 12.

Another conventional display unit 156 may operate in response to pressure sensor 36a, associated with tensioner 18, and thus provide a visual indication of the tension imparted to pipeline portion 4 by the tensioner 18. Another conventional display unit 157, operating in response to load cell 36b, may provide a visual indication of tension imparted to the pipeline portion 4 through the clamping mechanism 19. If desired, an additional display may be provided, comprising a conventional signal adding device, or operating in response to computer 139, to visually indicate total tension applied by units 18 and 19 to pipeline portion 4.

A conventional display unit 158 may operate in response to the port located, lateral load cell 95 so as to visually indicate the lateral interaction between the stinger 13 and pipeline on the port side of the stinger. Another conventional display unit 159 may operate in response to the starboard side located, lateral load cell 96 so as to provide a visual indication of lateral interaction between the stinger 12 and pipeline on the starboard side of the stinger.

Another conventional display unit 160, operating in response to the lowermost vertical load cell unit 86, may provide a visual indication of generally vertical or normal interaction between the pipeline and stinger 12, generally at the lowermost stinger extremity. An equivalent display unit 161, operating in response to load cell unit 87, may provide a visual indication of generally vertical or normal interaction between the pipeline and the stinger at the location of the load cell 87.

The various units 155 through 161 may all be provided or correlated with annunciators or alarms which supplement visual displays, so as to audibly or visually indicate to an operator that improper or excessive stinger conditions or pipeline stress conditions exist.

Still another display area 162 of console 150 may be provided with a conventional, graph-type plotter 163 which operates in response to desired course and vessel position information supplied to the computer 139. It is contemplated that unit 163 may provide a continuous display of either a segment, or all, of the desired vessel course, as well as actual vessel course. With this display, a visual indication of course deviation will be provided.

Display area 162 may also be provided with a conventional unit 164 operable to indicate the heading of the vessel 11. Display area 162 may also include conventional, digital-type display devices operable to visually indicate the latitude and longitude of the vessel 11 at any particular time.

Console 150 may also be provided with a variety of additional indicating, annuciating, and/or alarm devices operable to indicate such additional factors as computer failure, etc. As will be apparent, the particular arrangement of the display areas may vary, depending upon operator experience and requirements.

Console 150 may also contain the manual "input" station 142 which is operable to impart information to the computer 139 on an adjustable basis.

In this connection, it will be recognized that during various phases of the pipelaying operation it may be desirable to modify information supplied to the computer 139, through the conventional, manual input means 142. Such manual input means are well known and may comprise conventional, digital-type, information supply means.

For example, if tension is monitored and sought to be corrected during the periods of time while the clamping mechanism 19 is disengaged, it will be necessary to advise the computer 139, through input unit 142, that the desired tension level has been, or is being, reduced to permit the feeding of pipeline segments. This change in desired tension level may be imparted manually to the computer through input means 142. Alternatively, the change in desired tension level may be automatically supplied to the computer, possibly in conjunction with the manual input 142. This could be accomplished, for example, through conventional signal transmission means, associated with conventional pressure regulating means in line S of FIG. 4. When this pressure regulating means is manually adjusted to adjust the pressure in the supply line S of FIG. 4, the manipulation in the conventional pressure regulator means could generate a signal to be transmitted as a changed, desired tension level signal to the computer 139. Such a signal generating device could be conventional and synchronous in nature.

Thus, an operator, with the benefit of the control console 150, would be able to effectively monitor the overall pipelaying operation and determine whether or not the automated control system was performing satisfactorily.

This console display is uniquely significant in the event that a failure in the computerized control system should occur or in the event that environmental conditions should dictate the intervention of manual control in the system.

It thus is contemplated, that suitable, manually operable vessel control means would be integrated with the automated control system so as to enable an operator at any particular time to supersede the automatic control signals and control the pipelaying operation on a manual basis. Such a manual control unit will now be described.

Manual Control

In the event that manual control should become necessary, one "joy-stick" 165 may be provided on console 150. This joy-stick 165 is operable to simultaneously adjust the azimuth and thrust levels of the port side located, propulsion units 101, 103 and 105. Another such joy-stick control unit 166 may be provided on console 150 in relation to the starboard side located, propulsion units 102, 104 and 106. Joy-stick control mechanisms of this nature, operable to manually override an automated, dynamic vessel position control system, are now well known and described for example in such publications as the Hayes U.S. Pat. No. 3,105,453 and the Shatto, Jr. et al. U.S. Pat. No. 3,187,704.

It is here contemplated that the manually operable, vessel propulsion unit controlling, joy-sticks 165 and 166 may be disengaged from their associated vessel propulsion units while the computer 139 is controlling the pipelaying operation.

When it becomes necessary to manually override the computer system, conventional transmission control mechanisms may be actuated by an operator to operably connect the joy-sticks 165 and 166 with their respective banks of vessel propulsion units. Before, or when these mechanisms are operated, the computerized, propulsion unit control system would be divorced from controlling cooperation with the vessel propulsion units. This isolation of computer 139 from the vessel propulsion units may be accomplished with conventional circuitry.

By monitoring the display of engine operating vectors provided by the cathode ray tube units in display area 151, an operator may cause the operable or engaging action of the joy-sticks to be effected, in relation to each engine bank, with each joy-stick being oriented into approximate alignment with a visually estimated, average vector condition. Based upon his visual observation of area 151, the operator, prior to joy-stick actuation, may manipulate each joy-stick to a position generally consistent with the estimated average thrust vector attributable to the bank of engines associated with the joy-stick. With the joy-sticks thus positioned, the transmission mechanisms may be actuated to operably couple the joy-sticks with their associated engine banks.

In this manner, when it becomes necessary to manually override the computer, the joy-sticks are brought into operating position, generally aligned with actual engine conditions for each engine bank. With the joy-sticks thus being brought into operation, an operator can manipulate the joy-sticks, in accordance with conventional joy-stick manipulation techniques, so as to tend to relieve detected deviation conditions. In this instance, joy-stick manipulations are facilitated, since each joy-stick will have been operably connected to its engine bank so that its position is generally indicative of the average operating condition of its associated engine bank. Condition annunciators, alarms, or indication lights may further facilitate these manipulations.

In certain instances, of course, it may be desirable for the azimuth displays of each engine bank to be averaged and presented on the console 150 in the form of a single vector, indicative of the average vector of the entire engine bank. This would facilitate an operator's being able to manipulate the joy-stick associated with each engine bank in general positional conformity with the average azimuth associated with that engine bank.

It is also obvious that the joy stick associated with each engine bank might be coupled to the control system for the engine bank so as to be, at all times, in general positional conformance with the average engine condition of its associated engine bank.

SUMMARY OF PRINCIPAL ADVANTAGES AND OVERALL SCOPE OF INVENTION

The principal advantage of the invention resides in the development of a technique for automating a "stop and go" pipelaying operation in such a manner as to properly maintain acceptable pipeline stresses and vessel course. Obviously however, this advantage is significant even in relation to "continuous" pipelaying operation where a lay barge undergoes generally continuous forward motion.

The combination utilization of the clamping mechanism and wheel tensioner provides a particularly unique system for maintaining constantly effective tension, while at the same time accommodating for variations in tension which might result from wave action or other environmental forces while the pipeline is fixedly gripped by the clamping mechanism.

A particular advantage of the invention is attributable to the manner in which the tensioning system, instead of the vessel propulsion units, is employed to effect the feeding of pipeline segments from the ramp of the vessel toward the submerged surface. This feeding concept is uniquely advantageous in that it provides rapid and smooth pipeline segment feeding, substantially independent of the problems of inertia and vessel control which would be involved if pipe segment feeding was dependent upon the operation of vessel propulsion units.

In connection with the tensioning system, it is significant to note that the clamping mechanism 19 is engaged with and disengaged from the pipeline portion 4a so as to substantially avoid the generation of immediately effective, tension transmitting force between the clamping mechanism 19 and the pipeline portion 4a. This engaging and disengaging technique is thus advantageous in that it avoids the rapid generation of dangerous forces at the clamping station during the clamping and unclamping operations.

The computer program previously described, where tension deviation, lateral load between the pipeline and stinger, and course deviations are determined at time frequencies which are even multiples of each other, is significant in that it permits of the simultaneous implementation of deviation relieving corrections. This simultaneous application of corrections is believed to be significant insofar as it promotes a smoother, more reliable, and possibly more rapid correction system.

As heretofore noted, the digital computer processing of the tension, lateral interaction, and course deviation information effectively enables a "priority" correction approach to be employed and enables a manual input of information relating to these factors during the pipeline laying operation itself.

The described, three-factor approach, in developing corrective thrust vectors is also noteworthy. By employing this mode of determining corrective action, corrective thrust vectors are applied which are "predictive" in nature, i.e. designed to offset existing error as well as enduring bias in the system tending to produce error. These thrust vectors are further conditioned, in accordance with existing rates of condition deviation.

Another principal advantage of the invention resides in the concept of effecting corrections on a priority basis, with first priority being assigned to the correction of pipeline stress deviations and secondary priority being assigned to the correction of course deviations.

In describing a preferred cycle for correcting condition deviations, the term "priority" has often been employed. In this connection it will be recognized that "priority" is here being used in a sense to indicate a preferential allocation of engine thrust, rather than to indicate a sequence of correction. In other words, tension deviation and lateral interaction deviation will be sought to be corrected within the framework of available engine thrust. Position deviation will be sought to be corrected, assuming that the available engine thrust is sufficient to enable all three corrections to be made, i.e. corrections for tension deviation, lateral interaction deviation, and position deviation. As earlier indicated, if sufficient reserve power is not available to make all three corrections, the computed correction designed to relieve position deviation will be reduced to a level able to be handled by the vessel propulsion units. This "priority" consideration notwithstanding, it is believed desirable for all of these deviation conditions to be simultaneously corrected, in the manner described in connection with the computer program discussed in relation to FIG. 19.

Another principal advantage of the invention, in relation to operations conducted out of contact with land based navigation control station, resides in the utilization of the composite, satellite and beacon system for periodically determining and extrapolating the position of the lay barge with unusual accuracy.

Other advantages of the invention reside in the effective overall monitoring of vessel, stinger and pipeline conditions so as to provide maximum versatility with respect to the correction of condition deviations.

The use of the articulated stinger, in combination with stinger buoyancy and profile adjusting capabilities, the use of the ruggedized hitch, previously described, and the utilization of the clamping mechanism and wheel-type tensioner, provide optimum control throughout the entire pipe handling operation.

The displaying of monitored information, as previously described, enables an operator to effectively override the computerized control system under emergency conditions and maintain necessary operator surveillance and control.

The described arrangement of buoyant pontoon compartments in the stinger affords unique buoyancy capabilities, while enabling the pipeline to be substantially cradled and buoyantly stabilized within the confines of the stinger. As shown in FIG. 10, it is contemplated that the stinger rollers will support the pipeline with its longitudinal center line contained within the periphery of the stinger as defined by the pontoon segments 71, 72, 73 and 74, so as to both laterally shield and buoyantly stabilize the pipeline. The buoyancy balancing effected by the struts 77, with respect to the sides of the stinger, also contributes to optimum stinger stabilization.

In describing the invention, reference has been made to preferred embodiments. However, those skilled in the pipelaying art and familiar with the disclosure will recognize that the overall concepts of the invention are applicable to pipelaying systems including both fixed and articulated stingers, systems where a stinger is not employed, and systems where tensioning and clamping devices other than those described are utilized.

The present invention is thus conceptually broad in nature and may be implemented with a wide variety of vessels, vessel propulsion units, computers and control systems. As will also be apparent, the various items of equipment described for the purpose of monitoring or determining condition deviations are exemplary in nature, and a wide variety of condition deviation monitoring or detecting equipment could be employed. As is equally apparent, tensioning devices, clamping mechanisms, and stinger devices considerably different from those disclosed may be employed, depending upon particular operational requirements.

Because of these possible, various modes of implementing the invention, it is not necessary, for its understanding and complete disclosure, to indicate specific details of now well known and conventional components. However, as the invention is practiced, components may be developed which will entail unique advantages and structure such that newly developed components would preferably be employed in lieu of earlier developed and conventional units.

Reference has been made to adjusting the attitude of the articulated stinger 12. This adjusting in attitude entails, of course, the adjusting of inclination between stinger segments. In order to permit such adjusting, it is obvious that air lines, control lines, etc., associated with the condition monitoring system and the buoyancy control system should be flexible, at least in the pivot zones between stinger segments so as to enable the segments to be pivoted without rupturing or damaging control lines, signal lines, or air lines.

Where it is necessary to adjust the elevational position of the stinger 12, this may be accomplished by vertically adjusting the position of pivot unit 48. Alternatively, a desired modification in elevation of the pipeline in the transition zone between the vessel 11 and the stinger 12 could be effected by selectively adjusting the elevation of pipe cradling roller units on the ramp 17, in the manner generally described in the aforesaid Lawrence U.S. Pat. No. 3,390,532. The vertical adjustment of the pipeline in this transition zone may also entail the adjustment of elevation of the hitch unit 48, as well as adjustments in elevation of one or more pipe supporting cradles on the ramp 17.

For the purpose of this disclosure, reference has been made to vertical load sensing means and lateral load sensing means located on the outermost stinger segment. It is contemplated, however, that such sensing means may be incorporated on several, or all, of the stinger segments.

If a unitary stinger is employed, such as that described in the aforesaid Lawrence U.S. Pat. No. 3,390,532, such vertical and lateral load sensing means may be distributed longitudinally along the unitary stinger.

By providing sensing means of this nature, distributed entirely or substantially along a stinger, enhanced operator control is provided. With this arrangement, an operator may be able to anticipate serious deviations in vertical and lateral pipeline forces. Further, with such multiple condition sensing stations an operator, through monitoring of all of the stations, might be better able to selectively adjust the intensity and/or rate of condition correcting thrust vectors.

Where a series of longitudinally displaced, lateral load cell units is provided, these load cell units could be positioned so as to define an aft directed, laterally diverging path, the peripheries of which are disposed on opposite lateral sides of the pipeline buoyantly supported by the stinger. With this arrangement, the spaced lateral load cell units on each side of the pipeline would generally define an allowable bending arc, so as to yield correction indicating signals only when lateral bending in excess of the allowable was developed.

In the described embodiment, deviations with respect to tension and lateral interaction have been detected directly in the form of monitored force deviations. However, indications of force deviation may also be detected by monitoring the positioning of the pipeline relative to the floating vessel means.

As will also be apparent, vessel hull shapes other than that described might be employed in practicing the invention. It is also feasible that tension motivating systems other than hydraulic systems might be employed.

Although separate and diverse computers 139 and 148 have been described, it is entirely feasible that a single computer, either digital or analog in nature, might be employed to control the overall system and itself perform the functions of the two separately described computer units 139 and 148.

The computer may be programmed to compute corrections in accordance with criteria differing from the three-factor correction approaches previously described. Further, the computer may be programmed to allocate correction functions to certain vessel propulsion units to the exclusion of others. As will also be apparent, from the foregoing discussion, the control computers may be programmed to effect moment corrections in response to the scanning of propulsion unit operating conditions so that turning moment thrusts would be applied on an optimized basis consistent with operating conditions at any particular time.

With respect to the display console, most, if not all, of the display annunciator and alarm information could be diverted from the control computer. Alternatively, of course, this information could be supplied directly to the console so as to bypass the control computer.

In the discussion of course deviation, the desired pipeline course was presented as a segment of a straight line. The term "course" as used in this discussion applies to the desired route of the pipeline along the submerged surface. Clearly, this route or course may be straight, curved or of compound configuration in both lateral and vertical directions.

At this point, it will be appreciated that in describing various deviation measurements and correction computations, reference has been made to certain exemplary vectors. In this connection, comments made with respect to the lateral load cell 96 are equally applicable to the load cell 95. It is also apparent that the directions and magnitudes of vectors may vary substantially from those shown by way of example, and be opposite in direction, or of different indication and magnitude than those shown, by way of example, depending upon deviation conditions.

It will also be apparent that while particular advantages are attributable to the concurrent allocation of $\Delta T$, $\Delta M$, and $\Delta P$ to the various vessel propulsion units, so as to achieve a predetermined format or condition of engine balancing, substantial advantages of the invention may be realized even by allocating these correction factors equally amongst all of the engines of the system, arbitrarily selecting certain engines to handle certain or all of these correction factors, or even in some instances by allocating $\Delta T$, $\Delta M$, and $\Delta P$ corrections in sequence or in a partially concurrent format.

It will also be obvious that, in each instance, the remedial factor discussed in connection with a particular deviation condition is intended to be determined so as to have a magnitude capable, at least to some degree, of offsetting its associated deviation condition. However, there need not be a precise mathematical relationship between the deviation condition and the mode of correction. In this connection, an empirical, or system simulation, approach will probably govern and determine the level of corrections to be applied in response to any monitored deviation condition. Indeed, substantial benefits of the invention may be realized even where the "three factor" correction approach is not employed.

It is also contemplated that while the pipelaying barge 11 is underway, i.e. moving to or from a pipelaying operation, but not engaged in pipelaying as such, automated vessel heading and course maintaining systems may be employed. For this purpose, automatic pilot units may be employed, or the computerized control system previously discussed may be utilized in conjunction with navigation aids such as land base navigation stations, satellite navigation aids, etc.

The main aspects of the invention may be utilized in conjunction with a wide variety of vessel position detecting systems. Representative systems of this nature are delineated in an article entitled, "Ship Position Determining Systems,"

authored by I. G. Raudsep, and appearing at page 45 of the March-April 1969 issue of *Oceanology International*, published by Industrial Research Publication Company, of Beverley Shores, Indiana.

Principal aspects of the invention may be effectively utilized in connection with means for supporting a submerged portion of a pipeline, which means entails a substantial degree of vertical, lateral or even torsional flexibility. Where such a flexible pipeline support or stinger is employed, the arrangement of the various sensing means would be varied and could be positioned, for example, on the lay vessel itself. It will also be recognized that, in certain instances, the invention may be able to be effectively practiced where the stinger segments 13 are freely articulated, i.e. with control jack means 80 omitted, so as to enable free pivoting movement between the stinger segments.

Engine propulsion systems other than that described may be employed, including a propulsion system characterized by as few as a single propulsion device. In this connection, it will be recognized that the terms vessel "propulsion unit" and "engine" have been used in this discussion as synonyms. Each of these terms applies to a thrust generating unit in itself, and not its power source which may be located remotely from the thrust generating sites.

Even though the invention, in its overall aspects, is of particular utility where pipeline laying operations are being conducted in deep water, it is possible for substantial advantages of the invention to be realized in waters substantially shallower than 200 fathoms in depth.

Other modifications, additions, substitutions and deletions may well be recognized which would fall within the purview of the invention.

We claim:

1. A method of effecting the laying of a pipeline on a submerged surface from vessel means including vessel propulsion means, said method comprising:

supporting a pipeline from said floating vessel means so that
an upper portion is supported from said floating vessel means, and
a generally submerged portion, connected with said upper portion, extends downwardly to said submerged surface;
at least periodically, detecting at least an indication of a vector component of tension exerted on said pipeline from said floating vessel means;
at least periodically, detecting at least an indication of a vector component of force interacting laterally between said floating vessel means and said pipeline and directed generally transversely of said pipeline;
at least periodically, detecting at least an indication of the position of said floating vessel means relative to a desired course of movement of said floating vessel means; and
digitally processing said
indication of tension exerted on said pipeline from said floating vessel means,
indication of force interacting laterally between said floating vessel means and said pipeline, and
indication of the position of said floating vessel means relative to a desired course of movement
in accordance with a predetermined digital computer program;
in response to said digital processing of said indications of tension and interacting laterally directed force and said detecting of said indication of floating vessel means position,
adjusting the thrust effect of said vessel propulsion units to tend to maintain tension exerted on said pipeline generally within a predetermined tension range,
adjusting the thrust effect of said vessel propulsion units to effect a movement of said floating vessel means tending to maintain said interacting laterally directed force generally within a predetermined force range, and
adjusting the thrust effect of said vessel propulsion units to tend to maintain the position of said floating vessel means generally on a desired course;
effecting said adjusting of the thrust effect of said vessel propulsion units to
effect a movement of said floating vessel means tending to maintain said interacting laterally directed force within a predetermined force range
as a matter of first priority in relation to thrust available from said vessel propulsion units;
effecting said adjusting of the thrust effect of said vessel propulsion units to
tend to maintain the position of said floating vessel means on said desired course
as a matter of second priority in relation to, and to the extent permitted by, thrust available from said vessel propulsion units;
at least at times, simultaneously effecting all of said adjustings of the thrust effects of said vessel propulsion units so as to tend to simultaneously
maintain tension exerted on said pipeline generally within said predetermined tension range,
maintain said interacting laterally directed force generally within said predetermined force range, and
maintain the position of said floating vessel means generally on said desired course;
inducing said adjustings of the thrust effects of said vessel propulsion units at values derived at least in part from
a magnitude of deviation, and a bias tending to produce said deviation
in relation to each of predetermined values of tension in said pipeline, force interacting laterally between said pipeline and said floating vessel means, and floating vessel means position; and
during said laying of said pipeline, maintaining said digital computer program operable to receive digital processing data which is independent of said detected indications of tension, interacting laterally directed force, and position of said floating vessel means, and which relates to at least one of
said predetermined tension range,
said predetermined range of interacting laterally directed force, and
said desired course of movement of said floating vessel means.

2. A method of effecting the laying of a pipeline on a submerged surface from vessel means including a plurality of vessel propulsion units, said method comprising:

supporting a pipeline from said floating vessel means so that,
an upper portion is supported from said floating vessel means, and
a generally submerged portion, connected with said upper portion, extends downwardly to said submerged surface;
said supporting of said upper portion of said pipeline being effected by
periodically gripping said upper portion of said pipeline so as to substantially prevent a segment of said upper portion from moving downwardly toward said generally submerged portion,
periodically and alternately with said gripping of said upper portion of said pipeline, feeding segments of said upper portion of said pipeline generally toward submerged portion of said pipeline
during said gripping accommodating deviations in pipeline tension resulting from environmental forces acting on said floating vessel means without substantially deviating from a predetermined pipeline tension range;
intermittently with said gripping, reducing the tension imparted to said pipeline to thereby cause said feeding of segments;

at least periodically, detecting at least an indication of a vector component of tension exerted on said submerged portion of said pipeline from said floating vessel means;

at least periodically, detecting at least an indication of a vector component of generally horizontally directed force interacting laterally between said floating vessel means and said submerged portion of said pipeline and directed generally transversely of said pipeline;

at least periodically, detecting at least an indication of the position of said floating vessel means relative to a desired course of movement of said floating vessel means, said detecting being effected by periodically determining the location of said floating vessel means with reference to an orbiting satellite orbiting the earth, between the periodic determining of floating vessel means position with reference to said orbiting satellite, extrapolating the position of said floating vessel means with reference to a generally fixedly positioned and submerged navigation station, and periodically repositioning said submerged navigation station along said course of movement of said vessel means in response to said detecting of said indications of tension and interacting laterally directed force and said detecting of said indication of floating vessel means position as a matter of first priority, adjusting the thrust effect of said vessel propulsion units to tend to maintain tension exerted on said generally submerged portion of said pipeline generally within a predetermined tension range, and adjusting the thrust effect of said vessel propulsion units to effect a turning movement of said floating vessel means tending to maintain said interacting laterally directed force within a predetermined force range, and as a matter of second priority adjusting the thrust effect of said vessel propulsion units to tend to maintain the position of said floating vessel means on a desired course;

effecting said adjusting of the thrust effect of said vessel propulsion units, tending to maintain the tension exerted on said submerged portion of said pipeline generally within a predetermined tension range, so as to tend to maintain the deviation in thrust level between said vessel propulsion units within a predetermined condition of balance;

effecting said adjusting of the thrust effect of said vessel propulsion units, tending to maintain interacting lateral force between said floating vessel means and said submerged portion of said pipeline generally within a predetermined force range, by adjusting the thrust effect of pairs of vessel propulsion units so as to tend to minimize translation of said floating vessel means and so as to tend to maintain the deviation in thrust level between said vessel propulsion units within said predetermined condition of balance; and effecting said adjusting of the thrust effect of said vessel propulsion units, tending to maintain said floating vessel means generally on a desired course, so as to tend to maintain the deviation in thrust level between said vessel propulsion units within said predetermined condition of balance.

3. A method of effecting the laying of a pipeline on a submerged surface from vessel means including a plurality of vessel propulsion units, said method comprising:

supporting a pipeline from said floating vessel means so that, an upper portion is supported from said floating vessel means, and a generally submerged portion, connected with said upper portion, extends downwardly to said submerged surface;

said supporting of said upper portion of said pipeline being effected by periodically gripping said upper portion of said pipeline so as to substantially prevent a segment of said upper portion from moving downwardly toward said generally submerged portion, periodically and alternately with said gripping of said upper portion of said pipeline, feeding segments of said upper portion of said pipeline generally toward said generally submerged portion of said pipeline while concurrently imparting a series of longitudinally spaced tensioning forces to said upper portion of said pipeline operable to continuously bias said upper portion of said pipeline in a direction tending to impart tension to said generally submerged portion of said pipeline with said biasing being imparted by pneumatically inflated rotary tires and remaining continuously in effect, substantially independent of the rate of floating vessel means movement and substantially independent of the direction of relative generally submerged portion of said pipeline, movement between said floating vessel means and said generally submerged portion of said pipeline, concurrently with said gripping, cradling said upper portion of said pipeline with said rotary tires to prevent lateral displacement thereof, during said gripping of said upper portion of said pipeline, adding pipeline segments to said upper portion and providing a level of tension imparted from said floating vessel means to said generally submerged portion of said pipeline at a tension level substantially above that maintained during said feeding of pipeline segments so as to tend to maintain the level of tension imparted to said generally submerged portion of said pipeline during said gripping generally within a tension range which accommodates deviations in tension resulting from environmental forces acting on said floating vessel means without substantially deviating from a predetermined tension range; and intermittently with said gripping, causing said rotary tires to reduce said tensioning level and thereby cause said feeding of pipeline segments;

at least periodically at a first detection frequency and concurrent with said gripping, detecting at least an indication of a vector component of tension exerted on said submerged portion of said pipeline from said floating vessel means; at least periodically at a second detection frequency equal to or less than said first detection frequency, and concurrent with said gripping, detecting at least an indication of a vector component of generally horizontally directed force interacting laterally between said floating vessel means and said submerged portion of said pipeline and directed generally transversely of said pipeline;

at least periodically at a third detection frequency equal to or less than said second detection frequency, and concurrent with said gripping detecting at least an indication of the position of said floating vessel means relative to a desired course of movement of said floating vessel means, said detecting being effected by periodically determining the location of said floating vessel means with reference to an orbiting satellite, between the periodic determining of floating vessel means position with reference to said orbiting satellite and concurrent with said gripping, determining the position of said floating vessel means with reference to a generally fixedly positioned and submerged sonar beacon means, and periodically repositioning said submerged navigation station means along said course of movement of said vessel means and extrapolating the position of said floating vessel means with reference to said sonar beacon means;

in response to said detecting of said indications of tension and interacting laterally directed force and said detecting of said indication of floating vessel means position, as a matter of first priority, adjusting the thrust effect of said vessel propulsion units to tend to maintain tension exerted on said generally submerged portion of said pipeline generally within a predetermined tension range; and adjusting the thrust effect of said vessel propulsion units to effect a turning movement of said floating vessel means tending to maintain said interacting laterally directed force within a predetermined force range, and as a matter of second priority, adjusting the thrust effect of said vessel propulsion units to tend to maintain the position of said floating vessel means on a desired course;

effecting said adjusting of the thrust effect of said vessel propulsion units, tending to maintain the tension exerted on said submerged portion of said pipeline generally within a predetermined tension range, so as to tend to maintain the deviation in thrust level between said vessel propulsion units within a predetermined condition of balance;

effecting said adjusting of the thrust effect of said vessel propulsion units, tending to maintain interacting lateral force between said floating vessel means and said submerged portion of said pipeline generally within a predetermined force range, by adjusting the thrust effect of pairs of vessel propulsion units so as to tend to minimize translation of said floating vessel means and so as to tend to maintain the deviation in thrust level between said vessel propulsion units within said predetermined condition of balance;

effecting said adjusting of the thrust effect of said vessel propulsion units, tending to maintain said floating vessel means generally on a desired course, so as to tend to maintain the deviation in thrust level between said vessel propulsion units within said predetermined condition of balance; and effecting said adjusting of said thrust effects of said vessel propulsion units tending to maintain the tension exerted on said submerged portion of said pipeline generally with a predetermined range, tending to maintain interacting lateral force between said floating vessel means and said submerged portion of said pipeline generally within a predetermined force range, and tending to maintain said floating vessel means generally on a desired course, so that at least on a cyclic basis, a plurality of said thrust effects are generally simultaneously adjusted.

4. A method of effecting the laying of a pipeline on a submerged surface from vessel means including vessel propulsion means, said method comprising:

supporting a pipeline from said floating vessel means so that, an upper portion is supported from said floating vessel means, and a generally submerged portion, connected with said upper portion, extends downwardly to said submerged surface;

said supporting of said upper portion of said pipeline being effected by:

periodically gripping said upper portion of said pipeline with clamping means so as to substantially prevent a segment of said upper portion from moving downwardly toward said generally submerged portion, and periodically and alternately with said gripping of said upper portion of said pipeline, utilizing tensioning means to feed segments of said upper portion of said pipeline generally toward submerged portion of said pipeline;

during said feeding of pipeline segments imparting yieldable tension with said tensioning means to side means of said upper portion of said pipeline on said floating vessel means;

initiating said feeding of pipeline segments by reducing the level of tension imparted to said side means of said upper portion of said pipeline by said tensioning means, substantially independent of force exerted on said vessel means by said vessel propulsion means, with said reducing of tension being operable to cause feeding of a segment of said pipeline from said upper portion generally toward said generally submerged portion; and during said feeding of pipeline segments, increasing the level of tension imparted to said side means of said upper portion of said pipeline by said tensioning means, substantially independent of force exerted on said vessel means by said vessel propulsion means, with said increasing of tension being operable to substantially prevent the feeding of further segments of said pipeline from said upper portion of said pipeline generally toward said generally submerged portion;

during said gripping of said upper portion of said pipeline with clamping means, adding pipeline segments to said upper portion of said pipeline and providing a level of tension imparted from said floating vessel means through said support means to said generally submerged portion of said pipeline at a tension level substantially above that maintained during said feeding of pipeline segments so as to tend to maintain the level of tension imparted to said generally submerged portion of said pipeline during said gripping generally within a tension range which accommodates deviations in tension resulting from environmental forces, including wave action, acting on said floating vessel means without deviating from a predetermined tension range.

5. A method of effecting the laying of a pipeline on a submerged surface from vessel means including vessel propulsion means, said method comprising:

supporting a pipeline from said floating vessel means so that, an upper portion is supported from said floating vessel means, and a generally submerged portion, connected with said upper portion, extends downwardly to said submerged surface;

detecting a deviation in the condition of said pipeline;

digitally processing said indication of a deviation in the condition of said pipeline in accordance with a predetermined digital computer program;

in response to said digital processing, adjusting the thrust effect of said vessel propulsion means in an effort to tend to relieve said detected deviation, with said adjustment in thrust effect including a first component which is related directly to and tends to offset said detected condition of deviation, a second component which tends to offset a bias condition tending to produce said deviation, and a third component which tends to offset the rate at which said deviation occurred;

effecting said adjusting of the thrust effect of said vessel propulsion means to tend to relieve said detected deviation in the condition of said pipeline as a matter of first priority in relation to thrust available from said vessel propulsion means;

effecting an adjusting of the thrust effect of said vessel propulsion means to tend to maintain the position of said floating vessel means on a desired course as a matter of second priority in relation to, and to the extent permitted by, thrust available from said vessel propulsion means; and during said laying of said pipeline, maintaining said digital computer program operable to receive digital processing data which is independent of said detected deviation in the condition of said pipeline and which relates to said pipeline condition.

6. A method of effecting the laying of a pipeline on a submerged surface from vessel means including vessel propulsion means, said method comprising:

supporting a pipeline from said floating vessel means so that
an upper portion is supported from said floating vessel means, and
a generally submerged portion, connected with said upper portion, extends downwardly to said submerged surface;
at least periodically, detecting at least an indication of a vector component of tension exerted on said pipeline from said floating vessel means;
at least periodically, detecting at least an indication of a vector component of generally horizontally directed force interacting laterally between said floating vessel means and said pipeline and directed generally transversely of said pipeline;
at least periodically, detecting at least an indication of the position of said floating vessel means relative to a desired course of movement of said floating vessel means;
in response to said detecting of said indications of tension and interacting laterally directed force and said detecting of said indication of floating vessel means position,
adjusting the thrust effect of said vessel propulsion units to tend to maintain tension exerted on said pipeline generally within a predetermined tension range,
adjusting the thrust effect of said vessel propulsion units to effect a turning movement of said floating vessel means tending to maintain said interacting laterally directed force generally within a predetermined force range, and
adjusting the thrust effect of said vessel propulsion units to tend to maintain the position of said floating vessel means generally on a desired course;
displaying, on floating vessel means, a visual representation of thrust azimuth means of said vessel propulsion means; and
operating said vessel propulsion means with joy stick means.

7. A method of effecting the laying of a pipeline on a submerged surface from vessel means including vessel propulsion means, said method comprising:

supporting a pipeline from said floating vessel means so that,
an upper portion is supported from said floating vessel means, and
a generally submerged portion, connected with said upper portion, extends downwardly to said submerged surface;
at least periodically, detecting at least an indication of a vector component of tension exerted on said pipeline from said floating vessel means;
supporting a portion of said generally submerged portion of said pipeline with generally submerged buoyant pontoon means;
detecting a side elevational profile defined by said buoyant pontoon means;
detecting generally vertical interaction between said buoyant pontoon means and said generally submerged portion of said pipeline;
detecting generally lateral interaction between said buoyant pontoon means and said generally submerged portion of said pipeline, and
adjusting a positional relationship between said buoyant pontoon means and said generally submerged portion of said pipeline in response to said detecting.

8. Apparatus for effecting the laying of a pipeline on a submerged surface from vessel means including vessel propulsion means, said apparatus comprising:

support means operable to support a pipeline from aid floating vessel means, said support means including,
means operable to support an upper portion of said pipeline from said floating vessel means, with a generally submerged portion of said pipeline, connected with said upper portion, extending downwardly to said submerged surface;
first detecting means operable, at least periodically, to detect at least an indication of a vector component of tension exerted on said pipeline from said floating vessel means;
second detecting means operable, at least periodically, to detect at least an indication of a vector component of force interacting laterally between said floating vessel means and said pipeline and directed generally transversely of said pipeline;
third detecting means operable, at least periodically, to detect at least an indication of the position of said floating vessel means relative to a desired course of movement of said floating vessel means;
digital processing means operable to digitally process said
indication of tension exerted on said pipeline from said floating vessel means,
indication of force interacting laterally between said floating vessel means and said pipeline, and
indication of the position of said floating vessel means relative to a desired course of movement
in accordance with a predetermined digital computer program;
vessel propulsion unit control means operable, in response to said digital processing of said indications of tension and interacting laterally directed force and said detecting of said indication of floating vessel means position, to
adjust the thrust effect of said vessel propulsion units to tend to maintain tension exerted on said pipeline generally within a predetermined tension range,
adjust the thrust effect of said vessel propulsion units to effect a movement of said floating vessel means tending to maintain said interacting laterally directed force generally within a predetermined force range, and
adjust the thrust effect of said vessel propulsion units to tend to maintain the position of said floating vessel means generally on a desired course;
means including and responsive to said digital processing means operable to effect said adjusting of the thrust effect of said vessel propulsion units to
effect a movement of said floating vessel means tending to maintain said interacting laterally directed force within a predetermined force range
as a matter of first priority in relation to thrust available from said vessel propulsion units;
means including and responsive to said digital processing means operable to effect said adjusting of the thrust effect of said vessel propulsion units to
tend to maintain the position of said floating vessel means on said desired course
as a matter of second priority in relation to, and to the extent permitted by, thrust available from said vessel propulsion units; and
manual input means operable during said laying of said pipeline to incorporate in said digital computer program digital processing data which is independent of said detected indications of tension, interacting laterally directed force, and position of said floating vessel means, and which relates to at least one of
said predetermined tension range,
said predetermined range of interacting laterally directed force, and
said desired course of movement of said floating vessel means.

9. An apparatus, as described in claim 8, for effecting the laying of a pipeline on a submerged surface from vessel means including vessel propulsion means, wherein said support means includes:

clamping means operable, periodically, to grip said upper portion of said pipeline so as to substantially prevent a segment of said upper portion from moving downwardly toward said generally submerged portion;

yieldable, tensioning means, operable periodically and alternately with said clamping means, to feed segments of said upper portion of said pipeline generally toward said generally submerged portion of said pipeline while concurrently imparting a series of longitudinally spaced tensioning forces to said upper portion of said pipeline, which forces are operable to continuously bias said upper portion of said pipeline in a direction tending to impart tension to said generally submerged portion of said pipeline;

said tensioning means including pneumatically inflated, rotary tires operable to remain continuously in biasing engagement with said pipeline substantially independent of the rate of floating vessel means movement and substantially independent of the direction of relative movement between said floating vessel means and said generally submerged portion of said pipeline;

said rotary tires being operable to cradle said upper portion of said pipeline to prevent lateral displacement thereof;

means operable during said gripping of said upper portion by said clamping means to impart a level of tension from said floating vessel means, through said support means, and to said generally submerged portion of said pipeline at a tension level substantially above that maintained during said feeding of pipeline segments so as to tend to maintain the level of tension imparted to said generally submerged portion of said pipeline during said gripping generally within a tension range which accommodates deviations in tension resulting from environmental forces acting on said floating vessel means without deviating from a predetermined tension range; and means operable, with said clamping means disengaged from gripping engagement with said pipeline, to cause said tensioning means to reduce said tension level and thereby cause said feeding of pipeline segments.

10. An apparatus, as described in claim 8, for effecting the laying of a pipeline on a submerged surface from vessel means including vessel propulsion means wherein said third detecting means which is operable, at least periodically, to detect at least an indication of the position of said floating vessel means relative to a desired course of movement of said floating vessel means, includes:

satellite responsive navigation means operable to at least periodically determine the location of said floating vessel means with reference to an orbiting satellite orbiting the earth; and sonar beacon responsive navigation means operable, at least between the periodic determining of floating vessel means position with reference to said orbiting satellite, to extrapolate the position of said floating vessel means with reference to a generally fixedly positioned and submerged navigation station.

11. Apparatus for effecting the laying of a pipeline on a submerged surface from vessel means including a plurality of vessel propulsion units, said apparatus comprising:

support means operable to support a pipeline from said floating vessel means, said support means including, means operable to support an upper portion of said pipeline from said floating vessel means, with a generally submerged portion of said pipeline, connected with said upper portion, extending downwardly to said submerged surface;

said support means including, clamping means operable, periodically, to grip said upper portion of said pipeline so as to substantially prevent a segment of said upper portion from moving downwardly toward said generally submerged portion, yieldable tensioning means, operable periodically and alternately with said clamping means, to feed segments to said upper portion of said pipeline generally toward submerged portion of said pipeline, said clamping means being operable, during said gripping of said pipeline, to accommodate deviations in pipeline tension resulting from environmental forces acting on said floating vessel means without causing said pipeline tension to substantially deviate from a predetermined tension range;

said tensioning means being operable, with said clamping means disengaged from gripping engagement with said pipeline, to reduce tension imparted to said pipeline and thereby cause said feeding of segments;

first detecting means operable, at least periodically, to detect at least an indication of a vector component of tension exerted on said submerged portion of said pipeline from said floating vessel means;

second detecting means operable, at least periodically, to detect at least an indication of a vector component of generally horizontally directed force interacting laterally between said floating vessel means and said submerged portion of said pipeline and directed generally transversely of said pipeline;

third detecting means operable, at least periodically, to detect at least an indication of the position of said floating vessel means relative to a desired course of movement of said floating vessel means, said third detecting means including, satellite responsive navigation means operable to at least periodically determine the location of said floating vessel means with reference to an orbiting satellite orbiting the earth, and sonar beacon responsive navigation means operable, at least between the periodic determining of floating vessel means position with reference to said orbiting satellite, to extrapolate the position of said floating vessel means with reference to a generally fixedly positioned and submerged navigation station; vessel propulsion unit control means operable, in response to said detecting of said indications of tension and interacting laterally directed force and said detecting of said indication of floating vessel means position, as a matter of first priority, to adjust the thrust effect of said vessel propulsion units to tend to maintain tension exerted on said generally submerged portion of said pipeline generally within a predetermined tension range, and to adjust the thrust effect of said vessel propulsion units to effect a turning movement of said floating vessel means tending to maintain said interacting laterally directed force within a predetermined force range, and as a matter of second priority, to adjust the thrust effect of said vessel propulsion units to tend to maintain the position of said floating vessel means on a desired course; and vessel propulsion unit thrust allocation means included in said control means and operable to effect said adjusting of the thrust effect of said vessel propulsion units, tending to maintain the tension exerted on said submerged portion of said pipeline generally within a predetermined tension range, so as to tend to maintain the deviation in thrust level between said vessel propulsion units within a predetermined condition of balance, effect said adjusting of the thrust effect of said vessel propulsion units, tending to maintain interacting lateral force between said floating vessel means and said submerged portion of said pipeline generally within a predetermined force range, by adjusting the thrust effect of pairs of vessel propulsion units so as to tend to minimize translation of said floating vessel means and so as to tend to maintain the deviation in thrust level between said vessel propulsion units within said predetermined condition of balance, and effect said adjusting of the thrust effect of said vessel propulsion units, tending to maintain said floating vessel means generally on a desired course, so as to tend to maintain the deviation in thrust level between said vessel propulsion units within said predetermined condition of balance.

12. Apparatus for effecting the laying of a pipeline on a submerged surface from vessel means including a plurality of vessel propulsion units, said apparatus comprising:

support means operable to support a pipeline from said floating vessel means, said support means including, means operable to support an upper portion of said pipeline from said floating vessel means, with a generally submerged portion of said pipeline connected with said upper portion, extending downwardly to said submerged surface;

said support means including, clamping means operable, periodically, to grip said upper portion of said pipeline so as to substantially prevent a segment of said upper portion from moving downwardly toward said generally submerged portion, yieldable, tensioning means, operable periodically and alternately with said clamping means, to feed segments of said upper portion of said pipeline generally toward said generally submerged portion of said pipeline while concurrently imparting a series of longitudinally spaced tensioning forces to said upper portion of said pipeline, which forces are operable to continuously bias said upper portion of said pipeline in a direction tending to impart tension to said generally submerged portion of said pipeline, said tensioning means including pneumatically inflated, rotary tires operable to remain continuously in biasing engagement with said pipeline substantially independent of the rate of floating vessel means movement and substantially independent of the direction of relative movement between said floating vessel means and said generally submerged portion of said pipeline, said rotary tires being operable to cradle said upper portion of said pipeline to prevent lateral displacement thereof, means operable during said gripping of said upper portion by said clamping means to impart a level of tension from said floating vessel means, through said support means, and to said generally submerged portion of said pipeline at a tension level substantially above that maintained during said feeding of pipeline segments so as to tend to maintain the level of tension imparted to said generally submerged portion of said pipeline during said gripping generally within a tension range which accommodates deviations in tension resulting from environmental forces acting on said floating vessel means without substantially deviating from a predetermined tension range, and means operable, with said clamping means disengaged from gripping engagement with said pipeline to cause said tensioning means to reduce said tension level and thereby cause said feeding of pipeline segments;

first detecting means operable, at least periodically, at a first detection frequency, and concurrently with said gripping, to detect at least an indication of a vector component of tension exerted on said submerged portion of said pipeline from said floating vessel means;

second detecting means operable, at least periodically, at a second detection frequency equal to or less than said first detection frequency, and concurrently with said gripping, to detect at least an indication of a vector component of generally horizontally directed force interacting laterally between said floating vessel means and said submerged portion of said pipeline and directed generally transversely of said pipeline;

third detecting means operable, at least periodically, at a third detection frequency equal to or less than said second detection frequency, and concurrently with said gripping, to detect at least an indication of the position of said floating vessel means relative to a desired course of movement of said floating vessel means, said third detecting means including, satellite responsive navigation means operable to at least periodically determine the location of said floating vessel means with reference to an orbiting satellite orbiting the earth, sonar beacon responsive navigation means operable, at least between the periodic determining of floating vessel means position with reference to said orbiting satellite and concurrent with said gripping, to determine the position of said floating vessel means with reference to a generally fixedly positioned and submerged sonar beacon means, and means operable, with general reference to said periodically determined locations of said floating vessel means, to extrapolate the position of said floating vessel means with reference to said sonar beacon means, vessel propulsion unit control means operable, in response to said detecting of said indications of tension and interacting laterally directed force and said detecting of said indication of floating vessel means position, as a matter of first priority priority;

to adjust the thrust effect of said vessel propulsion units to tend to maintain tension exerted on said generally submerged portion of said pipeline generally within a predetermined tension range, and to adjust the thrust effect of said vessel propulsion units to effect a turning movement of said floating vessel means tending to maintain said interacting laterally directed force within a predetermined force range, and as a matter of second priority, to adjust the thrust effect of said vessel propulsion units to tend to maintain the position of said floating vessel means on a desired course;

vessel propulsion unit thrust allocation means included in said control means and operable to effect said adjusting of the thrust effect of said vessel propulsion units, tending to maintain the tension exerted on said submerged portion of said pipeline generally within a predetermined tension range, so as to tend to maintain the deviation in thrust level between said vessel propulsion units within a predetermined condition of balance, effect said adjusting of the thrust effect of said vessel propulsion units, tending to maintain interacting lateral force between said floating vessel means and said submerged portion of said pipeline generally within a predetermined force range, by adjusting the thrust effect of pairs of vessel propulsion units so as to tend to minimize translation of said floating vessel means and so as to tend to maintain the deviation in thrust level between said vessel propulsion units within said predetermined condition of balance, and effect said adjusting of the thrust effect of said vessel propulsion units, tending to maintain said floating vessel means generally on a desired course, so as to tend to maintain the deviation in thrust level between said vessel propulsion units within said predetermined condition of balance; and said vessel propulsion unit control means further including thrust variation scheduling means operable to effect said adjusting of said thrust effects of said vessel propulsion units tending to maintain the tension exerted on said submerged portion of said pipeline generally with a predetermined range, tending to maintain interacting lateral force between said floating vessel means and said submerged portion of said pipeline generally within a predetermined force range, and tending to maintain said floating vessel means generally on a desired course, so that at least on a cyclic basis, a plurality of said thrust effects are generally simultaneously adjusted.

13. Apparatus for effecting the laying of a pipeline on a submerged surface from vessel means including vessel propulsion means, said apparatus comprising:
  support means operable to support a pipeline from said floating vessel means, said support means including,
    means operable to support an upper portion of said pipeline from said floating vessel means, with a generally submerged portion of said pipeline, connected with said upper portion, extending downwardly to said submerged surface;
  said means operable to support an upper portion of said pipeline including
    clamping means operable, periodically, to grip said upper portion of said pipeline so as to substantially prevent a segment of said upper portion from moving downwardly toward said generally submerged portion, and
    yieldable tensioning means, operable periodically and alternately with said clamping means, to feed segments of said upper portion of said pipeline generally toward submerged portion of said pipeline;
  said yieldable tensioning means being operable to impart yieldable tension to side means of said upper portion of said pipeline on said floating vessel means;
  said yieldable tensioning means including tension adjusting means operable to reduce the level of tension imparted to said side means of said upper portion of said pipeline, substantially independent of force exerted on said vessel means by said vessel propulsion means, with said reducing of tension being operable to cause feeding of a segment of said pipeline from said upper portion generally toward said generally submerged portion;
  said tension adjusting means being further operable to increase the level of tension imparted to said side means of said upper portion of said pipeline, substantially independent of force exerted on said vessel means by said vessel propulsion means, with said increasing of tension being operable to substantially prevent the feeding of further segments of said pipeline from said upper portion of said pipeline generally toward said generally submerged portion; and
  means operable during said gripping of said upper portion by said clamping means to impart a level of tension from said floating vessel means, through said support means, and to said generally submerged portion of said pipeline at a tension level substantially above that maintained during said feeding of pipeline segments so as to tend to maintain the level of tension imparted to said generally submerged portion of said pipeline during said gripping generally within a tension range which accommodates deviations in tension resulting from environmental forces, including wave action, acting on said floating vessel means without deviating from a predetermined tension range.

14. Apparatus for effecting the laying of a pipeline on a submerged surface from vessel means including vessel propulsion means, said apparatus comprising:
  support means operable to support a pipeline from said floating vessel means, said support means including,
    means operable to support an upper portion of said pipeline from said floating vessel means, with a generally submerged portion of said pipeline, connected with said upper portion, extending downwardly to said submerged surface;
  detecting means operable to detect a deviation in the condition of said pipeline; and
  digital processing means operable to digitally process said indication of a deviation in the condition of said pipeline in accordance with a predetermined digital computer program;
  control means operable in response to said digital processing to adjust the thrust effect of said vessel propulsion means in an effort to tend to relieve said detected deviation, with said adjustment in thrust effect including
    a first component which is related directly to and tends to offset, said detected condition of deviation,
    a second component which tends to offset a bias condition tending to produce said deviation, and
    a third component which tends to offset the rate at which said deviation occurred;
  means including and responsive to said digital processing means operable to effect said adjusting of the thrust effect of said vessel propulsion means to
    tend to relieve said detected deviation in the condition of said pipeline
    as a matter of first priority in relation to thrust available from said vessel propulsion means;
  means including and responsive to said digital processing means operable to effect an adjusting of the thrust effect of said vessel propulsion units to
    tend to maintain the position of said floating vessel means on a desired course
    as a matter of second priority in relation to, and to the extent permitted by, thrust available from said vessel propulsion means; and
  manual input means operable during said laying of said pipeline to incorporate in said digital computer program digital processing data which is independent of said detected deviation in the condition of said pipeline and which relates to said pipeline condition.

15. Apparatus for effecting the laying of a pipeline on a submerged surface from vessel means including vessel propulsion means, said apparatus comprising:
  support means operable to support a pipeline from said floating vessel means, said support means including,
    means operable to support an upper portion of said pipeline from said floating vessel means, with a generally submerged portion of said pipeline, connected with said upper portion, extending downwardly to said submerged surface;
  first detecting means operable, at least periodically, to detect at least an indication of a vector component of tension exerted on said pipeline from said floating vessel means;
  second detecting means operable, at least periodically, to detect at least an indication of a vector component of generally horizontally directed force interacting laterally between said floating vessel means and said pipeline and directed generally transversely of said pipeline;
  third detecting means operable, at least periodically, to detect at least an indication of the position of said floating vessel means relative to a desired course of movement of said floating vessel means;
  vessel propulsion unit control means operable, in response to said detecting of indications of tension and interacting laterally directed force and said detecting of said indication of floating vessel means position, to
    adjust the thrust effect of said vessel propulsion units to tend to maintain tension exerted on said pipeline generally within a predetermined tension range,
    adjust the thrust effect of said vessel propulsion units to effect a turning movement of said floating vessel means tending to maintain said interacting laterally directed force generally within a predetermined force range, and
    adjust the thrust effect of said vessel propulsion units to tend to maintain the position of said floating vessel means generally on a desired course;
  display means operable to display, on said vessel means, a visual representation of thrust azimuth means of said vessel propulsion means; and
  joy-stick means operable to operate said vessel propulsion means.

16. An apparatus for effecting the laying of a pipeline on a submerged surface from vessel means including vessel propulsion means, said apparatus comprising:
  support means operable to support a pipeline from said floating vessel means, said support means including, means operable to support an upper portion of said pipeline from said floating vessel means, with a generally submerged portion of said pipeline, connected with said upper portion, extending downwardly to said submerged surface;

tension detecting means operable, at least periodically, to detect at least an indication of a vector component of tension exerted on said pipeline from said floating vessel means;

said support means including buoyant and generally submerged pontoon means operable to support a portion of said generally submerged portion of said pipeline;

attitude detecting means operable to detect a side elevational profile defined by said buoyant pontoon means;

generally vertical load detecting means operable to detect generally vertical interaction between said buoyant pontoon means and said generally submerged portion of said pipeline;

lateral load detecting means operable to detect generally lateral interaction between said buoyant pontoon means and said generally submerged portion of said pipeline; and control means operable to adjust a positional relationship between said buoyant pontoon means and said generally submerged portion of said pipeline in response to said detecting.

17. A method of effecting the laying of a pipeline on a submerged surface from vessel means including vessel propulsion means, said method comprising:

supporting a pipeline from said floating vessel means so that an upper portion is supported from said floating vessel means, and a generally submerged portion, connected with said upper portion, extends downwardly to said submerged surface;

said supporting of said upper portion of said pipeline being effected by:

periodically gripping said upper portion of said pipeline so as to substantially prevent a segment of said upper portion from moving downwardly toward said generally submerged portion, periodically and alternately with said gripping of said upper portion of said pipeline, feeding segments of said upper portion of said pipeline generally toward said generally submerged portion of said pipeline while concurrently imparting tensioning force to said upper portion of said pipeline operable to continuously bias said upper portion of said pipeline in a direction tending to impart tension to said generally submerged portion of said pipeline, with said biasing remaining continuously in effect, substantially independent of the rate of floating vessel means movement and substantially independent of the direction of relative movement between said floating vessel means and said generally submerged portion of said pipeline, concurrently with said gripping, cradling said upper portion of said pipeline to prevent lateral displacement thereof;

during said gripping of said upper portion of said pipeline, adding pipeline segments to said upper portion and providing a level of tension imparted from said floating vessel means to said generally submerged portion of said pipeline at a tension level substantially above that maintained during said feeding of pipeline segments so as to tend to maintain the level of tension imparted to said generally submerged portion of said pipeline during said gripping generally within a tension range which accommodates deviations in tension resulting from environmental forces acting on said floating vessel means without deviating from a predetermined tension range;

intermittently with said gripping, reducing tension level and thereby cause said feeding of pipeline segments;

at least periodically detecting at least an indication of a vector component of tension exerted on said pipeline from said floating vessel means;

at least periodically detecting at least an indication of a vector component of generally horizontally directed force interacting laterally between said floating vessel means and said pipeline and directed generally transversely of said pipeline;

at least periodically, detecting at least an indication of the position of said floating vessel means relative to a desired course of movement of said floating vessel means; and in response to said detecting of said indications of tension and interacting laterally directed force and said detecting of said indication of floating vessel means position, adjusting the thrust effect of said vessel propulsion units to tend to maintain tension exerted on said pipeline generally within a predetermined tension range, adjusting the thrust effect of said vessel propulsion units to effect a turning movement of said floating vessel means tending to maintain said interacting laterally directed force generally within a predetermined force range, and adjusting the thrust effect of said vessel propulsion units to tend to maintain the position of said floating vessel means generally on a desired course.

18. A method of effecting the laying of a pipeline on a submerged surface from vessel means including vessel propulsion means, said method comprising:

supporting a pipeline from said floating vessel means so that an upper portion is supported from said floating vessel means, and a generally submerged portion, connected with said upper portion, extends downwardly to said submerged surface;

at least periodically, detecting at least an indication of a vector component of tension exerted on said pipeline from said floating vessel means, at least periodically, detecting at least in indication of a vector component of generally horizontally directed force interacting laterally between said floating vessel means and said pipeline and directed generally transversely of said pipeline;

at least periodically, detecting at least an indication of the position of said floating vessel means relative to a desired course of movement of said floating vessel means; and said detecting of at least an indication of the position of said floating vessel means relative to a desired course of movement of said floating vessel means being effected by periodically determining the location of said floating vessel means with reference to an orbiting satellite orbiting about the earth, between the periodic determining of floating vessel means position with reference to said orbiting satellite, extrapolating the position of said floating vessel means with reference to a generally fixedly positioned and submerged navigation station, and periodically repositioning said submerged navigation station along said course of movement of said vessel means;

in response to said detecting of said indications of tension and interacting laterally directed force and said detecting of said indication of floating vessel means position, adjusting the thrust effect of said vessel propulsion units to tend to maintain tension exerted on said pipeline generally within a predetermined tension range, adjusting the thrust effect of said vessel propulsion units to effect a turning movement of said floating vessel means tending to maintain said interacting laterally directed force generally within a predetermined force range, and adjusting the thrust effect of said vessel propulsion units to tend to maintain the position of said floating vessel means generally on a desired course.

19. An apparatus as described in claim 8 for effecting the laying of a pipeline on a submerged surface from vessel means including vessel propulsion means, said apparatus further comprising:
- means operable, at least at times, to simultaneously effect all of said adjustings of the thrust effects of said vessel propulsion units so as to tend to simultaneously
  - maintain tension exerted on said pipeline generally within said predetermined tension range,
  - maintain said interacting laterally directed force generally within said predetermined force range, and
  - maintain the position of said floating vessel means generally on said desired course; and
- means operable to induce said adjustings of the thrust effects of said vessel propulsion units at values derived at least in part from
  - a magnitude of deviation, and
  - a bias tending to produce said deviation
  in relation to each of predetermined values of tension in said pipeline, force interacting laterally between said pipeline and said floating vessel means, and floating vessel means position.

20. A method, as described in claim 1, for effecting the laying of a pipeline on a submerged surface from vessel means including vessel propulsion means, wherein:
- said supporting of said upper portion of said pipeline is effected by
  - periodically gripping said upper portion of said pipeline with clamping means so as to substantially prevent a segment of said upper portion from moving downwardly toward said generally submerged portion, and
  - periodically and alternately with said gripping of said upper portion of said pipeline, utilizing tensioning means to feed segments of said upper portion of said pipeline generally toward submerged portion of said pipeline;
- during said feeding of pipeline segments yieldable tension is imparted with said tensioning means to side means of said upper portion of said pipeline on said floating vessel means;
- feeding of pipeline segments is initiated by reducing the level of tension imparted to said side means of said upper portion of said pipeline by said tensioning means, substantially independent of force exerted on said vessel means by said vessel propulsion means, with said reducing of tension being operable to cause feeding of a segment of said pipeline from said upper portion generally toward said generally submerged portion; and
- the level of tension imparted to said side means of said upper portion of said pipeline by said tensioning means is increased during said feeding of pipeline segments, substantially independent of force exerted on said vessel means by said vessel propulsion means, with said increasing of tension being operable to substantially prevent the feeding of further segments of said pipeline from said upper portion of said pipeline generally toward said generally submerged portion; and
- during said gripping of said upper portion of said pipeline with clamping means, pipeline segments are added to said upper portion of said pipeline and a level of tension is imparted from said floating vessel means through said support means to said generally submerged portion of said pipeline at a tension level substantially above that maintained during said feeding of pipeline segments so as to tend to maintain the level of tension imparted to said generally submerged portion of said pipeline during said gripping generally within a tension range which accommodates deviations in tension resulting from environmental forces, including wave action, acting on said floating vessel means without deviating from a predetermined tension range.

21. An apparatus as described in claim 8 for effecting the laying of a pipeline on a submerged surface from vessel means including vessel propulsion means wherein:
- said support means includes
  - clamping means operable, periodically, to grip said upper portion of said pipeline so as to substantially prevent a segment of said upper portion from moving downwardly toward said generally submerged portion, and
  - yieldable tensioning means, operable periodically and alternately with said clamping means, to feed segments of said upper portion of said pipeline generally toward submerged portion of said pipeline;
- said yieldable tensioning means is operable to impart yieldable tension to side means of said upper portion of said pipeline on said floating vessel means;
- said yieldable tensioning means includes tension adjusting means operable to reduce the level of tension imparted to said side means of said upper portion of said pipeline, substantially independent of force exerted on said vessel means by said vessel propulsion means, with said reducing of tension being operable to cause feeding of a segment of said pipeline from said upper portion generally toward said generally submerged portion;
- said tension adjusting means is further operable to increase the level of tension imparted to said side means of said upper portion of said pipeline, substantially independent of force exerted on said vessel means by said vessel propulsion means, with said increasing of tension being operable to substantially prevent the feeding of further segments of said pipeline from said upper portion of said pipeline generally toward said generally submerged portion; and
- said support means further includes means operable during said gripping of said upper portion by said clamping means to impart a level of tension from said floating vessel means, through said support means, and to said generally submerged portion of said pipeline at a tension level substantially above that maintained during said feeding of pipeline segments so as to tend to maintain the level of tension imparted to said generally submerged portion of said pipeline during said gripping generally within a tension range which accommodates deviations in tension resulting from environmental forces, including wave action, acting on said floating vessel means without deviating from a predetermined tension range.

* * * * *